US011472706B2

(12) United States Patent
Delplanche et al.

(10) Patent No.: US 11,472,706 B2
(45) Date of Patent: Oct. 18, 2022

(54) HYDROXYAPATITE COMPOSITE FOR USE IN REMOVAL OF CONTAMINANTS FROM EFFLUENTS AND METHODS OF MAKING

(71) Applicant: Solvay SA, Brussels (BE)

(72) Inventors: Thierry Delplanche, Mont-Saint-Guibert (BE); Aziz Mimouni, Brussels (BE); Thierry Le Mercier, Rosny-sous-Bois (FR); Sarah Khirani, Lyons (FR); Lauriane D'Alencon, Issy-les-Moulineaux (FR); Yves Antoinette, Villeneuve (FR); Beatrice Ortego, Woluwe-Saint-Lambert (BE)

(73) Assignee: SOLVAY SA, Brussels (BE)

( * ) Notice: Subject to any disclaimer, the term of this patent is extended or adjusted under 35 U.S.C. 154(b) by 236 days.

(21) Appl. No.: 16/763,999

(22) PCT Filed: Nov. 30, 2018

(86) PCT No.: PCT/EP2018/083209
§ 371 (c)(1),
(2) Date: May 14, 2020

(87) PCT Pub. No.: WO2019/106178
PCT Pub. Date: Jun. 6, 2019

(65) Prior Publication Data
US 2020/0385270 A1 Dec. 10, 2020

(30) Foreign Application Priority Data
Nov. 30, 2017 (EP) ..................... 17204776

(51) Int. Cl.
B01D 53/02 (2006.01)
B01J 20/20 (2006.01)
B01J 20/02 (2006.01)
B01J 20/04 (2006.01)
B01J 20/28 (2006.01)
C01B 25/32 (2006.01)
C02F 1/28 (2006.01)

(52) U.S. Cl.
CPC .............. C01B 25/32 (2013.01); B01D 53/02 (2013.01); B01J 20/0229 (2013.01); B01J 20/048 (2013.01); B01J 20/20 (2013.01); B01J 20/28004 (2013.01); B01J 20/28061 (2013.01); B01J 20/28071 (2013.01); C02F 1/281 (2013.01); B01D 2253/112 (2013.01); C01P 2004/61 (2013.01); C01P 2006/12 (2013.01); C01P 2006/14 (2013.01)

(58) Field of Classification Search
CPC .............. B01D 53/02; B01D 2251/404; B01D 2253/112; B01D 2251/61; B01D 2257/60; B01D 53/64; B01D 2215/00; B01D 2251/604; B01D 2252/10; B01D 2252/60; B01D 2257/602; B01J 20/12; B01J 20/28069; B01J 20/3238; B01J 20/048; B01J 20/324; B01J 20/06; B01J 20/3236; B01J 20/3085; B01J 20/20; B01J 20/28004; B01J 20/0229; B01J 20/3204; B01J 20/28071; B01J 20/18; B01J 20/08; B01J 20/28057; B01J 20/28061; C02F 2101/106; C02F 1/281; C02F 2103/18; C02F 2101/20; C02F 2101/103; C02F 1/283; C01B 25/32; C01P 2004/61; C01P 2006/14; C01P 2006/12
See application file for complete search history.

(56) References Cited

U.S. PATENT DOCUMENTS

2005/0039382 A1  2/2005  Blanchard et al.
2009/0123351 A1  5/2009  Leite et al.

FOREIGN PATENT DOCUMENTS

GB        722863 A      2/1955
WO   WO 2003/053560 A1   7/2003
WO   WO 2015/173437 A1  11/2015
WO   WO 2016/193429 A1  12/2016
WO   WO 2017/109014 A1   6/2017

(Continued)

OTHER PUBLICATIONS

Heavy metals in wastewater and sludge treatment processes; vol. 1, CRC Press Inc; 1987, p. 2.
T.J.Clarke, S.A.Kondrat, S.H.Taylor; Total oxidation of naphtalene using copper manganese oxide catalyst; Catalysis Today; vol. 258, 2015, pp. 610-615.
Gonzales et al., "Sorption kinetic study of selenite and selenate onto a high and low pressure aged iron oxide nanomaterial", 2012, Journal of Hazard Materials, vol. 211-212, p. 138-145.
Onar & Yakinci, Journal of Physics, Conference Series 667, 2016, 012005, International Conference on Magnetic and Superconducting Materials (MSM15), IOP Publishing, doi: 10.1088/1742-6596/667/1/012005.

(Continued)

Primary Examiner — Timothy C Vanoy
(74) Attorney, Agent, or Firm — Osha Bergman Watanabe & Burton LLP

(57) ABSTRACT

A composite comprising a hydroxyapatite and at least one additive which is present during hydroxyapatite synthesis. The additive may be embedded or incorporated into or coated onto the hydroxyapatite. The additive preferably increases the hydroxyapatite porosity, e.g., providing a higher pore volume and/or BET surface area than a hydroxyapatite material without additive. The additive preferably comprises an activated carbon, chitosan, hopcalite, clays, zeolites, sulfur, and/or a metal such as Al, Sn, Ti, Fe, Cu, Zn, Ni, Cu, Zr, La, Ce, in the form of metal, salt, oxide, oxyhydroxide, and/or hydroxide. The hydroxyapatite may be calcium-deficient. The composite is in the form of particles having a D50 of at least 20 µm, a BET surface area of at least 120 m²/g; and/or a total pore volume of at least 0.3 cm³/g. An adsorbent material comprising a composite or a blend of composite with a hydroxyapatite without additive, and its use for removal of contaminants such as Hg, Se, As, and/or B from an effluent.

19 Claims, 4 Drawing Sheets

(56) References Cited

FOREIGN PATENT DOCUMENTS

| WO | WO 2017/173437 A1 | 10/2017 |
| WO | WO 2018/104445 A1 | 6/2018 |
| WO | WO 2018/104446 A1 | 6/2018 |

OTHER PUBLICATIONS

Meng et al., "Orthogonal optimization design for preparation of Fe3O4 nanoparticles via chemical coprecipitation", Applied Surface Science, vol. 280, 2013, p. 679-685.

Pinakidou et al.,"Sn(II) oxy-hydroxides as potential adsorbents for Cr(VI)—uptake from drinking water: An X-ray absorption study"; Science of the Total Environment, vol. 551-552, 2016, pp. 246-253.

Samata H., "Synthesis of lanthanum oxyhydroxide single crystals using anelectrochemical method", Journal of Crystal Growth, vol. 304 (2), 2007, pp. 448-451.

Huijuan Hou et al., "Removal of Congo red dye from aqueous solution with hydroxyapatite/ chitosan composite", Chemical Engineering Journal, vol. 211-212, Oct. 2, 2012, pp. 336-342.

Fernando M Shanika et al., "Synthesis, characterization and application of nanohydroxyapatite and nanocomposite of hydroxyapatite with granular activated carbon for the removal of Pb2+ from aqueous solutions", Applied Surface Science, vol. 351, May 23, 2015, pp. 95-103.

Liu J et al., "The influence of pH and temperature on the morphology of hydroxyapatite synthesized by hydrothermal method", Ceramics International, vol. 29, No. 6, Jan. 1, 2003, pp. 629-633.

U.S. Appl. No. 15/311,396, Patrick Perrin, et al., filed Nov. 15, 2016, Yes, WO 2015/173437*.

U.S. Appl. No. 15/578,865, Thierry Delplanche, et al., filed Dec. 1, 2017, yes, WO 2016/193429*.

U.S. Appl. No. 16/464,067, Thierry Delplanche, et al., filed May 24, 2019, Yes, WO 2018/104445*.

U.S. Appl. No. 16/464,069, Thierry Delplanche, et al., May 24, 2019, No, WO 2018/104446*.

Hydroxyapatite (without additive)

Composite hydroxyapatite / activated carbon

Hydroxyapatite

Hopcalite

Composite Hydroxyapatite / Hopcalite

Composite Hydroxyapatite / Fe(OH)$_3$

Composite Hydroxyapatite / Chitosan

HYDROXYAPATITE COMPOSITE FOR USE IN REMOVAL OF CONTAMINANTS FROM EFFLUENTS AND METHODS OF MAKING

CROSS-REFERENCE TO RELATED APPLICATIONS

The present application is a U.S. national stage entry under 35 U.S.C. § 371 of International Application No. PCT/EP2018/083209 filed Nov. 30, 2018, which claims priority to European application No. 17204776.3 filed Nov. 30, 2017, the whole content of this application being incorporated herein by reference for all purposes.

TECHNICAL FIELD

The invention relates to a process for producing a hydroxyapatite composite comprising a hydroxyapatite and at least one additive which is present during synthesis of the hydroxyapatite. It also relates to an adsorbent comprising the hydroxyapatite composite for treating effluents contaminated by metals and/or non-metals.

BACKGROUND ART

It is common to treat various sources of water in order to remove contaminants. Examples of sources of water for treatment include surface water, ground water, and industrial aqueous waste streams.

The problems posed by the impact of heavy metals in the environment are well known. Numerous industrial processes release liquid or gaseous effluents that are heavily loaded with heavy metals, in particular heavy metal soluble salts, such as cationic form salts. The expression "heavy metals" is understood to mean metals whose density is at least equal to 5 g/cm$^3$, and also beryllium, arsenic, selenium, and antimony, in accordance with the generally accepted definition (Heavy Metals in Wastewater and Sludge Treatment Processes; Vol I, CRC Press Inc; 1987; page 2). Lead or cadmium are particularly significant examples, given their harmful effect on the human body. Nickel is another example thereof due to its allergenic effect.

An example of a problem linked to heavy metals is the combustion of wastes, especially household waste, producing a vaporization of heavy metals, these vapours being entrained in the combustion flue gases. To avoid contaminating the environment, it is necessary to provide flue gas treatment processes capable of carrying out effective scrubbing of heavy metals. The toxic substances removed from the flue gas when it is purified are found in a residue which itself must often be treated before being reused, repurposed or discharged. Indeed such residue, which contains the heavy metals removed from the flue gas, when subjected, for example, to the action of rain that is acidic when discharged, frequently releases some of the heavy metals that it contains into the environment. This can then cause pollution of the subsoil. It is therefore essential that the heavy metals be immobilized in the residue.

Wastewater treatment is one of the most important and challenging environmental problems associated with coal-based power generation. Using wet scrubbers to clean flue gas is becoming more popular worldwide in the electrical power industry. While wet scrubbers can greatly reduce air pollution, toxic metals in the resulting wastewater present a major environmental problem. The industry is preparing to invest billions of dollars in the next decade to meet ever-more stringent environmental regulations; unfortunately, a cost-effective and reliable technology capable of treating such complicated wastewater is still being sought after.

The compositions of flue gas desulfurization (FGD) wastewaters vary greatly, depending not only on the types of coal and limestone used but also on the types of scrubber and processes used. Pretreatment methods and management practices also affect wastewater characteristics. Untreated raw FDG wastewater could have total suspended solids (TSS) of ~10,000 mg/L but after settlement, it falls to ~10 mg/L; the pH typically ranges from 5.8-7.3; sulfate is in the range of 1,000-6,000 mg/L; nitrate-N at level of 50 mg/L is not uncommon; chloride, alkalinity and acidity vary from hundreds to thousands ppm; selenium (Se) exists in various forms, ranging from dozens of ppb to over 5 ppm, among which, selenate could account for more than half of total Se; arsenic (As) ranges from a few ppb to hundreds of ppb; mercury (Hg) ranges from below 1 ppb to hundreds of ppb; and boron (B) can be as high as hundreds of ppm.

It is particularly desirable to remove selenium from wastewater. Selenium is a naturally occurring chemical element in rocks, soils, and natural waters. Although Se is an essential micronutrient for plants and animals, it can be toxic at elevated levels and some Se species may be carcinogenic. In water, selenium exists predominately as the inorganic oxyanion forms: selenite ($SeO_3^{2-}$, where the Se is present as the $Se^{4+}$ ion) and selenate ($SeO_4$, where the Se is present as the $Se^{6+}$ ion). Hexavalent selenium is stable in toxic environments and exists as the selenate ($SeO_4^{2-}$) anion, which is weakly sorbed by mineral materials and generally soluble. Treatment of selenate in wastewater is often considered to be one of the most difficult anions to remove from water. Tetravalent Se is the stable valence state under mildly reducing or anoxic conditions (0.26 V<Eh<0.55 V at pH 7). Selenite ($SeO_3^{2-}$) anion tends to be bound onto mineral surfaces (e.g., Fe and Mn oxides). Selenate and selenite are more toxic than elemental selenium or metallic selenides due to their high bioavailability.

It is also desirable to remove mercury from wastewater. In particular, the future U.S. EPA guideline for total mercury is <12 part per trillion (ppt) or ng/L. Metal sulfide chemistry is well understood and has been used in various ways in water treatment systems to achieve reduction of dissolved toxic metals from water. For example, organosulfide has been used as a water treatment reagent to precipitate mercury and other toxic metals in the water industry. Iron sulfide materials (FeS or $FeS_2$ ores) have been used as adsorbent for toxic metal removal. Conventional sulfide-based toxic metal removal technology has not been able to achieve the desired mercury removal level in many applications. For example, direct application of organosulfide has been found to be unable to achieve mercury removal below 12 ppt in the treated effluent as is required by the new federal or local EPA guidelines.

Hydroxyapatite is an adsorbent mainly used for trapping and immobilizing metals within is structure from contaminated effluents, particularly aqueous effluents. Cationic species such as zinc, copper and lead are preferentially trapped over anionic species such as arsenate (AsO4), selenate (SeO4), or molybdate (MoO4). Furthermore, hydroxyapatite does not exhibit a high affinity for mercury despite being in cationic form. As a result, the use of hydroxyapatite cannot be an all-in-one solution for removing the main contaminants from a wastewater effluent to meet the environmental regulations for safe discharge.

There is a need for an adsorbent effective on effluents of industrial origin and also applicable to water purification in general to remove cationic as well as anionic species of contaminating elements.

It is thus useful to develop a material capable of absorbing and retaining large amounts and varieties of contaminants for treating industrial liquid effluents or wastewaters originating from treatment plants before the release thereof into the natural environment, or even the treatment of natural aquifer waters, some of which are naturally loaded with contaminants such as cations and/or oxyanions of metals like Hg and non-metals, such as As, Se, B.

SUMMARY OF INVENTION

Accordingly, one aspect of the present invention relates to a hydroxyapatite composite which can be effective in trapping simultaneously a large variety of contaminants such as metals and non-metals from a contaminated effluent. The contaminated effluent may be aqueous, and the contaminants may be in cationic and anionic forms.

To enhance the sorption of the hydroxyapatite towards a larger spectrum of contaminants, it has been found that the hydroxyapatite structure can be supplemented or modified by incorporating at least one additive during the synthesis of the hydroxyapatite to yield a hydroxyapatite composite with an improved adsorption affinity and/or efficiency with respect to at least one contaminant, such adsorption affinity and/or efficiency being greater than that of an hydroxyapatite structure not containing the additive.

A precursor of the additive may be used during the synthesis of the composite, and then converted to generate the additive in the final composition of the hydroxyapatite composite. As such the additive may be formed from a precursor during the synthesis of the composite.

Depending on the physical and chemical forms of the additive or precursor thereof which is present during synthesis of the hydroxyapatite structure (e.g., added prior to the hydroxyapatite synthesis or to a vessel where the hydroxyapatite synthesis takes place), the additive in the hydroxyapatite composite may be embedded or incorporated into or coated onto the hydroxyapatite structure, or otherwise associated with the hydroxyapatite structure via cohesive forces. Regardless on how the additive is included in the resulting composite or in what form it is added prior to or during the hydroxyapatite synthesis, its presence during the hydroxyapatite synthesis results in forming the hydroxyapatite composite.

The hydroxyapatite composite is different than a mere physical mixture of a hydroxyapatite and the additive, which in this case would be made after each material (hydroxyapatite and the additive) would be formed separately and then mixed or blended.

One advantage of embedding or incorporating the additive into the hydroxyapatite during its synthesis is to provide a much more stable material (compared to a mere physical mixture of a hydroxyapatite and the additive) which does not release the additive when in use, particularly in an aqueous solution when the hydroxyapatite composite is intended to perform as adsorbent for removal of contaminants from water.

In preferred embodiments, the additive in the hydroxyapatite composite is a co-sorbent.

The additive is preferably selected based on its own particular affinity and/or efficacy to adsorb or trap at least one contaminant that the hydroxyapatite structure (without additive) does not adsorb or weakly adsorbs. The contaminant may be in the form of a cation or an oxyanion. For example, the additive may be selected based on its own particular affinity and/or efficacy to adsorb mercury such as in the form of mercury cation, selenium such as in the form of its oxyanions (selenate and/or selenite), arsenic such as in the form of its oxyanions ($H_2AsO_4^-/HAsO_4^{2-}$) and uncharged $H_3AsO_3$ form of As(III), and/or boron such in the form of borate.

The additive may be further selected based on its ability to increase the porosity of the hydroxyapatite structure. For example, it is preferred that the pore volume and/or the BET surface area of the resulting hydroxyapatite composite synthesized with the additive is higher than that of the hydroxyapatite structure synthesized without the additive.

One advantage of the present invention is improving the sorption affinity of the hydroxyapatite composite for at least one contaminant that would otherwise not be adsorbed or poorly adsorbed from a contaminated effluent by a hydroxyapatite synthesized without the additive. The at least one contaminant may be in the form of a cation or an oxyanion.

Another advantage of the present invention is improving the sorption capacity of the hydroxyapatite composite, for example by increasing its pore volume and/or BET surface area.

When the additive can be used as a sorbent in powder form for water treatment, the inclusion of the additive powder as co-sorbent in the hydroxyapatite composite provides yet another advantage. While the use of a co-sorbent in a loose powder offers large surface area and high adsorption capacity, a loose powder needs specific and costly equipment to be removed from treated water effluents, and solid/liquid separation problems limit reactor configurations that require incorporating large sedimentation basins or filtration. There is therefore a benefit for a powdered co-sorbent to be incorporated into the hydroxyapatite structure to form the hydroxyapatite composite in accordance to the present invention, so the hydroxyapatite composite can be used in practical adsorption processes. The hydroxyapatite synthesis which comprises the presence of the additive powder generates solid particles of larger size than the powder, and these larger particles are easier to separate from a treated water effluent, using a solid/liquid separation technique such as by settling.

One embodiment according to the present invention relates to a hydroxyapatite composite which comprises:
 a hydroxyapatite; and
 at least one additive which is present during the hydroxyapatite synthesis.

The at least one additive or a precursor thereof may be added to a vessel where hydroxyapatite synthesis takes place, prior to or during the synthesis of the hydroxyapatite. That is to say, when the synthesis of the hydroxyapatite takes place in a vessel, the additive or a precursor thereof may be added to the vessel before the synthesis is initiated or while the hydroxyapatite structure is synthetized in this vessel.

A particular embodiment according to the present invention relates to a hydroxyapatite composite which comprises:
 a hydroxyapatite; and
 at least one additive which increases the porosity of the hydroxyapatite.

The at least one additive is present while the hydroxyapatite structure is synthetized. The at least one additive may be added to the vessel before the synthesis is initiated or while the hydroxyapatite structure is synthetized in this vessel.

The hydroxyapatite composite may have a higher total pore volume and/or a higher BET surface area than a hydroxyapatite material made without the additive.

The hydroxyapatite composite according to the present invention is an effective reactant for immobilizing contaminants from water, in particular when employed in dispersed mode in water treatment units.

The hydroxyapatite composite may comprise at least 50 wt % hydroxyapatite, advantageously at least 60 wt %, and more advantageously still at least 70 wt % hydroxyapatite or at least 75 wt % hydroxyapatite, based on the total weight of dry matter.

In some embodiments, the hydroxyapatite composite may comprise a calcium-deficient hydroxyapatite, preferably with a Ca/P molar ratio more than 1.5 and less than 1.67.

In some embodiments, the hydroxyapatite composite may comprise a calcium-deficient hydroxyapatite and has an overall Ca/P molar ratio higher than the calcium-deficient hydroxyapatite.

The hydroxyapatite composite may further comprise, on the basis of total weight of dry matter,
  water, of the order of from 1 wt % to 30 wt %, advantageously from 2 wt % to 25 wt %, or from 2 wt % to 20 wt %, or from 3 wt % to 15 wt %, and/or
  calcium carbonate in an amount of less than 20 wt %, preferably from 1 wt % to 19 wt %, more preferably from 2 wt % to 18 wt %, even preferably from 3 wt % to 15 wt %, yet even more preferably from 4 wt % to 13 wt %, most preferably from 5 wt % to 10 wt %.

The hydroxyapatite composite may further comprise, based on the total weight of dry matter, less than 1 wt % of calcium dihydroxide $Ca(OH)_2$, preferably less than 0.5 wt % calcium dihydroxide, more preferably less than 0.3 wt % calcium dihydroxide, even more preferably less than 0.2 wt % calcium dihydroxide, or even less than 0.1 wt % $Ca(OH)_2$).

The hydroxyapatite composite may comprise a weight ratio of hydroxyapatite to additive (HAP:A) of from 1:0.01 to 1:0.5, preferably from 1:0.02 to 1:0.4 or from 1:0.03 to 1:0.4, preferably from 1:0.04 to 1:0.3, more preferably from 1:0.05 to 1:0.25, yet more preferably from 1:0.05 to 1:0.20.

The hydroxyapatite composite may comprise at most 50 wt %, or at most 40 wt %, or at most 30 wt %, or at most 20 wt % of the additive based on the total weight of dry matter.

The hydroxyapatite composite may be in the form of particles having a mean size (D50) of at least 20 μm, preferably at least 25 μm, more preferably at least 30 μm.

In additional embodiments, the hydroxyapatite composite may be in the form of particles having a specific surface area of at least 120 $m^2/g$, preferably of at least 130 $m^2/g$, more preferably of at least 140 $m^2/g$.

In additional embodiments, the hydroxyapatite composite may be in the form of particles having a total pore volume of at least 0.3 $cm^3/g$, or at least 0.32 $cm^3/g$, or at least 0.35 $cm^3/g$, or at least 0.4 $cm^3/g$.

Another aspect of the present invention relates to a process for producing a hydroxyapatite composite, which may include separate sources of calcium and phosphate or a source of calcium and phosphate and the addition of the additive during the hydroxyapatite synthesis from the separate sources of calcium and phosphate or from the source of calcium and phosphate.

When the process starts with separate sources of calcium and phosphate, the process generally comprises two steps: a reaction of the two sources to obtain a suspension (A) of calcium phosphate, and then an alkaline maturation to form a hydroxyapatite structure.

When the process starts with a source of calcium and phosphate, the process generally comprises an alkaline maturation of the source of calcium and phosphate to form a hydroxyapatite structure.

A preferred embodiment of the process for producing a hydroxyapatite composite according to the present invention comprises:
  in a first step, a source of calcium and a source of phosphate ions are mixed in water in a molar ratio that is adjusted to obtain a Ca/P molar ratio of between 0.5 and 1.6, preferably between 0.7 and 1.3, and reacting the source of calcium with the phosphate ions at a pH of between 2 and 8, in order to obtain a suspension (A) of calcium phosphate,
  in a second step, adding to the suspension (A) an alkaline compound comprising hydroxide ions in order to set a pH of at least 7.5, preferably at least 8, or at least 8.5, or at least 9, or of at least 10; further adding an additional source of calcium in order to obtain a suspension (B) of composite having a Ca/P molar ratio of greater than 1.6, preferably greater than 1.65, and/or less than 1.75, to form a hydroxyapatite structure; and further adding at least one additive or a precursor thereof in the first step, in the second step, or in both the first and second steps.

The second step may be referred to the "alkaline maturation step".

When the additive or precursor thereof is added in the first step, it may be added at the beginning of the first step before the reaction between the source of calcium with the phosphate ions takes place, during the reaction, or after the reaction is completed in the first step (this being preferred).

In some embodiments, the additive or precursor thereof may be added more than once, for example in at least two portions, for example a first portion in the first step and a second portion in the second step.

In some embodiments, two or more additives or precursors thereof may be added. In an example, a first additive or precursor thereof may be added in the first step and a second additive or precursor may be added in the second step.

Alternatively, two or more additives or precursors thereof may be added in the first step or in the second step.

The first step and the second step where hydroxyapatite synthesis takes place may be carried out in a same vessel (preferably), but not necessarily.

When the additive comprises a metal such as Fe, a precursor of the metal may be used such as a salt of the metal (e.g., chloride). Under the conditions of the hydroxyapatite synthesis, the additive in the hydroxyapatite composite may be in the form of a metal at oxidation state 0, an oxyhydroxide, or a hydroxide.

An alternate embodiment of the alternate process for producing the hydroxyapatite composite comprises the following steps:
  forming an aqueous suspension comprising particles of a calcium phosphate compound having a Ca/P molar ratio of 1.5 or less, preferably between 0.50 and 1.35, more preferably particles containing brushite, yet more preferably particles containing >70 wt % brushite, most preferably particles containing >90 wt % brushite;
  adding an alkaline compound comprising calcium and hydroxide ions in order to increase the pH of the suspension to a value of at least 6.5, preferably at least 7, or at least 7.5, or at least 8, or of at most 11 in order to obtain a suspension (B') having a Ca/P molar ratio of greater than 1.6, preferably greater than 1.65, and/or less than 1.75; and further adding at least one additive or precursor thereof to the suspension (B') before, during or after the addition of the alkaline compound, preferably before or during the addition of the alkaline compound, to form the hydroxyapatite composite, wherein said suspension (B') contains from 10 to 35 wt % solids, preferably from 15 to 25 wt % solids.

In preferred embodiments, the alkaline compound comprises calcium hydroxide. The steps of addition of the alkaline compound comprising calcium and hydroxide ions is preferably carried out at a temperature of more than 40° C., or of at least 50° C., or of at least 60° C., and/or less than 90° C.

The additive in the hydroxyapatite composite may be incorporated or embedded into or coated onto the hydroxyapatite structure, or otherwise associated with the hydroxyapatite structure via cohesive forces.

Furthermore, the hydroxyapatite composite generated by this method is different than a mere physical mixture of the additive with a hydroxyapatite material made using the same method but without the additive, in that the additive in the hydroxyapatite composite is not released from the hydroxyapatite structure when agitated in deionized water for at least 5 hours.

The additive may be organic or inorganic, preferably inorganic.

In some embodiments, the additive may comprise at least one activated carbon, chitosan, hopcalite, clays (e.g., bentonite), zeolites, sulfur, a metal in the form of metal of oxidation state 0, salt, oxide, oxyhydroxide, or hydroxide and being selected from the group consisting of aluminium, tin, at least one transition metal selected from Groups 3-12 of the June 2016 IUPAC Periodic Table of Elements, in particular iron (in the form of metal of oxidation state 0, salt, oxide, oxyhydroxide, or hydroxide), or combinations of two or more thereof.

In some embodiments, the transition metal in the form of metal of oxidation state 0, salt, oxide, oxyhydroxide, or hydroxide is preferably selected from the group consisting of iron, titanium, nickel, copper, zinc, zirconium, lanthanum, and cerium, more preferably selected from the group consisting of iron, nickel, copper, zinc, and lanthanum; yet more preferably selected from the group consisting of iron, nickel, and copper. In most preferred embodiments, the transition metal is iron in the form of metal of oxidation state 0, salt, oxide, oxyhydroxide, or hydroxide.

In some embodiments, the additive may comprise at least one activated carbon, chitosan, hopcalite, sulfur, iron (which may be in the form of metal of oxidation state 0, salt, oxide, oxyhydroxide, or hydroxide, preferably oxyhydroxide or hydroxide), or combinations of two or more thereof.

In some embodiments, the composite may comprise at least one activated carbon and sulfur (zero-valent S). The hydroxyapatite composite may comprise a weight ratio of activated carbon to sulfur (AC:S) of from 10:1 to 1:10, preferably from 5:1 to 1:5 or from 3:1 to 1:3, preferably from 1:2 to 2:1. The hydroxyapatite composite may comprise at least 2 wt %, or at least 5 wt % of sulfur ($S^0$) based on the total weight of dry matter. The hydroxyapatite composite may comprise at most 40 wt %, or at most 30 wt %, or at most 20 wt % of sulfur ($S^0$) based on the total weight of dry matter.

In some embodiments, the additive may comprise aluminium (in the form of metal, salt, oxide, oxyhydroxide, or hydroxide), tin (in the form of metal, salt, oxide, oxyhydroxide, or hydroxide), at least one transition metal selected from Groups 3-12 of the IUPAC Periodic Table of Elements (June 2016) (in the form of metal of oxidation state 0, salt, oxide, oxyhydroxide, or hydroxide), preferably selected from the group consisting of iron, titanium, nickel, copper, zinc, zirconium, lanthanum, and cerium; most preferably may be iron in the form of metal of oxidation state 0, salt, oxide, oxyhydroxide, or hydroxide; clays (e.g., bentonite); zeolites; sulfur, or combinations of two or more thereof.

In some preferred embodiments, the composite may comprise at least $Fe^0$ (zero-valent); or $Fe^0$ (zero-valent) and zero-valent sulfur ($S^0$). The hydroxyapatite composite may comprise a weight ratio of $Fe^0$ to $S^0$ ($Fe^0:S^0$) of from 10:1 to 1:10, preferably from 5:1 to 1:5 or from 3:1 to 1:3, preferably from 1:2 to 2:1. The hydroxyapatite composite may comprise at least 2 wt %, or at least 5 wt % of sulfur ($S^0$) based on the total weight of dry matter. The hydroxyapatite composite may comprise at most 40 wt %, or at most 30 wt %, or at most 20 wt % of sulfur ($S^0$) based on the total weight of dry matter.

In preferred embodiments, the additive is inorganic. In such case, the additive may comprise at least one activated carbon, hopcalite, zero-valent sulfur ($S^0$), aluminium (in the form of metal, salt, oxide, oxyhydroxide, or hydroxide), tin (in the form of metal, salt, oxide, oxyhydroxide, or hydroxide), a transition metal selected from Groups 3-12 of the June 2016 IUPAC Periodic Table of Elements (in the form of metal, salt, oxide, oxyhydroxide, or hydroxide), in particular iron (in the form of metal of oxidation state 0, salt, oxide, oxyhydroxide, or hydroxide), clays (e.g., bentonite), zeolites, or combinations of two or more thereof.

Suitable additives or precursors thereof that may be added in the first step in the two-step process include compounds that are stable/compatible under acidic conditions, such as a pH<6.5, or pH<6. Examples of additives or precursors thereof that may be added in the first step are activated carbon and/or chloride salts of the following metals: aluminium, tin, or a transition metal of groups 3-12 of the June 2016 IUPAC Periodic Table, preferably titanium, iron, nickel, copper, zinc, zirconium, lanthanum, and/or cerium; more preferably iron, nickel, copper, and/or lanthanum).

Moreover the hydroxyapatite composite according to the invention, when made in the first step in the two-step process at low temperature (less than 40° C., preferably 20-25° C.), and the second step in the two-step process made at higher temperature (more than 40° C., or of at least 50° C., or of at least 60° C.), has shown particularly high specific surface (at least 120 $m^2/g$, or at least 130 $m^2/g$, or at least 140 $m^2/g$) and particular high adsorption capacity of metals such as Hg or its cations, and non-metals such as Se, As, and/or B or their respective oxyanions.

In some embodiments according to the present invention, the hydroxyapatite composite is in the form of particles that comprise plate-like crystallites, of thickness of a few nano-meters (nm) on their surface, which are coated by smaller particles of the additive. The smaller particles of the additive are likely associated with the hydroxyapatite structure via cohesive forces.

In some embodiments according to the present invention, the hydroxyapatite composite particles may comprise plate-like crystallites, of thickness of a few nano-meters (nm) on their surface, which have rounded edges as the additive is incorporated inside the crystals; this is in contrast with the sharp edges of plate-like crystallites associated with the hydroxyapatite structure without additive.

In some embodiments according to the present invention, the hydroxyapatite composite particles may comprise two distinct types of solid particles, a first type associated with the hydroxyapatite structure with plate-like crystallites, of thickness of a few nano-meters (nm) on their surface, and another type of particles associated with the additive. These distinct types of solid particles are preferably interdispersed. Because the additive is added prior to or during the synthesis of the hydroxyapatite structure, the particles associated with the additive are linked to the first type of particles associated with the hydroxyapatite structure via cohesive forces, because they are not released from the composite after being submerged under agitation in deionized water for at least 5 hours, or if the additive is released, its release is less than what would occur with a same amount of the additive not in a composite.

Another aspect of the present invention further relates to an adsorbent material for removal of contaminants from water, comprising or consisting of:
  an hydroxyapatite composite according to the invention; or
  two or more hydroxyapatite composites according to the invention, wherein the additives in the hydroxyapatite composites are different; preferably wherein at least one of the additives comprises an activated carbon or blend of two or more activated carbons; or
  a blend of a hydroxyapatite without additive and at least one hydroxyapatite composite according to the invention.

Another aspect of the present invention relates to the use of the hydroxyapatite composite according to the present invention or of the adsorbent material according to the present invention for purifying a substance comprising one or more contaminants such as a water or gas effluent, or for removing at least a portion of one or more contaminants from a water or gas effluent, preferably from a water effluent, particularly removing cations such as Hg cations, and/or oxyanions such as those of Se, As and/or B from a water effluent, comprising using the hydroxyapatite composite according to the present invention or of the adsorbent material according to the present invention.

Another aspect of the present invention relates to a method for purifying a contaminated substance comprising one or more contaminants such as a water or gas effluent, or for removing at least a portion of one or more contaminants from a water or gas effluent, preferably from a water effluent, particularly removing cations such as Hg cations, and/or oxyanions such as those of Se, As and/or B from a water effluent, comprising using the hydroxyapatite composite according to the present invention or of the adsorbent material according to the present invention.

The use or the method for purifying or removing one or more contaminants preferably comprises contacting the hydroxyapatite composite or the adsorbent material with the contaminated substance or effluent to remove at least a portion of the one or more contaminants.

DEFINITIONS

Figure 1:
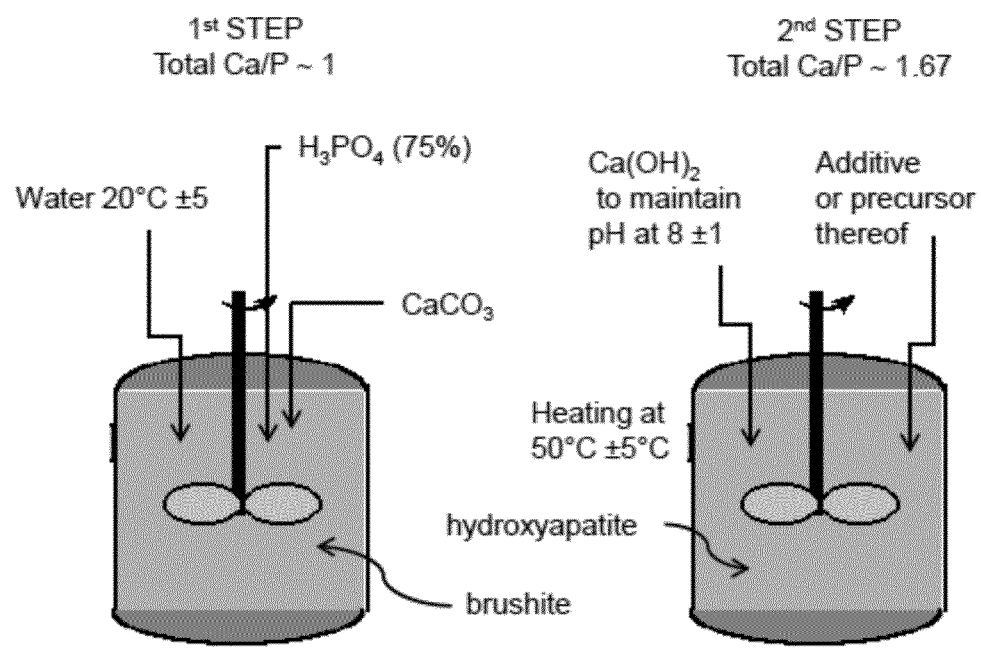
FIG. 1 is a diagram of the two-step process for preparing the hydroxyapatite composite, where the additive (or a precursor thereof) is added in an "alkaline maturation" step while the hydroxyapatite structure is formed.

Unless otherwise specified, all reference to percentage (%) herein refers to percent by weight.

"Fresh" material or sorbent denotes a material which has not been in contact with contaminants, whereas "spent" catalyst denotes a material which has already been in contact with contaminants.

As used herein, the term "upstream" refers to a position situated in the opposite direction from that in which the gas stream to be treated flows.

As used herein, the term "downstream" refers to a position situated in the same direction from that in which the gas stream to be treated flows.

As used herein, the terms "% by weight", "wt %", "wt. %", "weight percentage", or "percentage by weight" are used interchangeably.

As used herein, the term "dry matter" refers to a material which has been subjected to drying at a temperature of 105° C. for at least 1 hour.

As used herein, the term "precursor of the additive" refers to a compound that is converted into the form of the additive present in the composite. For example an iron salt like iron chloride can be converted to iron oxyhydroxide during the making of the composite so that the iron oxyhydroxide is present during the hydroxyapatite synthesis.

As used herein, the BET specific surface area is determined by gas adsorption on a Micromeritics ASAP2020 machine. The measurement is carried out using nitrogen as adsorbent gas at 77° K via the volumetric method, according to the ISO 9277:2010 standard (Determination of the specific surface area of solids by gas adsorption—BET method). The BET specific surface area is calculated in a relative pressure (P/PO) range varying from around 0.05 to 0.20.

In the present specification, the choice of an element from a group of elements also explicitly describes:
- the choice of two or the choice of several elements from the group,
- the choice of an element from a subgroup of elements consisting of the group of elements from which one or more elements have been removed.

In addition, it should be understood that the elements and/or the characteristics of a composition, a method, a process or a use, described in the present specification, can be combined in all ways possible with the other elements and/or characteristics of the composition, method, process, or use, explicitly or implicitly, this being without departing from the context of the present specification.

In the passages of the present specification that will follow, various embodiments or items of implementation are defined in greater detail. Each embodiment or item of implementation thus defined can be combined with another embodiment or with another item of implementation, this being for each mode or item unless otherwise indicated or clearly incompatible when the range of the same parameter of value is not connected. In particular, any variant indicated as being preferred or advantageous can be combined with another variant or with the other variants indicated as being preferred or advantageous.

In the present specification, the description of a range of values for a variable, defined by a bottom limit, or a top limit, or by a bottom limit and a top limit, also comprises the embodiments in which the variable is chosen, respectively, within the value range: excluding the bottom limit, or excluding the top limit, or excluding the bottom limit and the top limit.

In the present specification, the description of several successive ranges of values for the same variable also comprises the description of embodiments where the variable is chosen in any other intermediate range included in the successive ranges. Thus, for example, when it is indicated that "the magnitude X is generally at least 10, advantageously at least 15", the present description also describes the embodiment where: "the magnitude X is at least 11", or also the embodiment where: "the magnitude X is at least 13.74", etc.; 11 or 13.74 being values included between 10 and 15.

The term "comprising" includes "consisting essentially of" and also "consisting of".

In the present specification, the use of "a" in the singular also comprises the plural ("some"), and vice versa, unless the context clearly indicates the contrary. By way of example, "a mineral" denotes one mineral or more than one mineral.

If the term "approximately" or "about" is used before a quantitative value, this corresponds to a variation of 10% of the nominal quantitative value, unless otherwise indicated.

DETAILED DESCRIPTION OF PREFERRED EMBODIMENTS

One embodiment according to the present invention relates to a hydroxyapatite composite which comprises:
- a hydroxyapatite; and
- at least one additive which is present during the hydroxyapatite synthesis.

The hydroxyapatite composite may have a higher total pore volume and/or a higher BET surface area than a hydroxyapatite material made without the additive.

A particular embodiment according to the present invention relates to a hydroxyapatite composite which comprises:
- a hydroxyapatite; and
- at least one additive which increases the porosity of the hydroxyapatite.

The at least one additive or a precursor thereof may be added prior to or during the hydroxyapatite synthesis.

The additive may be added in the form of a precursor, and this precursor takes the form of the additive during the synthesis of the composite for the additive to be present in the final composition of the composite. For example, a precursor of the additive may be a salt of a metal, and during the synthesis of the composite, the salt of a metal is converted to an hydroxide or oxyhydroxide of the metal to generate the additive in the final composition of the hydroxyapatite composite.

With respect to the increases in porosity of the hydroxyapatite, the composite material preferably has a higher total pore volume than a hydroxyapatite material made without the additive.

With respect to the increases in porosity of the hydroxyapatite, the composite material preferably has a higher BET surface area than a hydroxyapatite material made without the additive.

The hydroxyapatite composite is different than a physical mixture of the additive with a hydroxyapatite material made without the additive. The additive in the hydroxyapatite composite is not released from the hydroxyapatite structure when agitated in deionized water for at least 5 hours.

Additive:

In some embodiments, the additive may comprise at least one activated carbon, chitosan, hopcalite, clays (e.g., bentonite), zeolites, sulfur, and/or a metal in the form of metal of oxidation state 0, salt, oxide, oxyhydroxide, or hydroxide being selected from the group consisting of aluminium, tin, a transition metal selected from Groups 3-12 of the June 2016 IUPAC Periodic Table of Elements, and combinations of two or more thereof, preferably a metal in the form of metal of oxidation state 0, salt, oxide, oxyhydroxide, or hydroxide selected from the group consisting of aluminium, tin, titanium, iron, nickel, copper, zinc, zirconium, lanthanum, cerium, and any combination thereof; more preferably a metal in the form of metal of oxidation state 0, salt, oxide, oxyhydroxide, or hydroxide being selected from the group consisting of aluminium, tin, iron, nickel, copper, zinc, lanthanum, and any combination thereof.

The hydroxyapatite composite may comprise more than one additive.

In such embodiments, a first additive may serve as support for a second additive.

In some embodiments, the additive or precursor thereof may be in the form of a solid before it is added at the beginning or during the (second) alkaline maturation step of the process for making the composite.

In some embodiments, the additive or precursor thereof may be in the form of a solid before it is added to at least one of the first and second steps of the two-step process of making the composite.

In some embodiments, when the D50 particle size of the solid additive or precursor thereof is greater than 100 microns may further include grinding or milling the solid to achieve a D50 less than 100 microns or less than 90 microns, preferably less than 75 microns, or more preferably less than 63 microns, before the resulting powder is added to at least one of the first and second steps of the method of making the composite.

In some embodiments, when the additive or precursor thereof may be in the form of a powder (either sold 'as is' or ground before use), the powder of the additive or precursor thereof may be sieved to remove large particles, such as those exceeding a size of 100 microns, or exceeding a size of 90 microns. For example, the powder of the additive or precursor thereof which passes through a sieve No. 170 (under ASTM E11) equivalent to a size of less than 90 microns, or through a sieve No. 200 (under ASTM E11) equivalent to a size of less than 75 microns, or through a sieve No. 230 (under ASTM E11) equivalent to a size of less than 63 microns can be added to at least one of the first and second steps of the two-step process of making the composite, or at the beginning or during the alkaline maturation step of the process for making the composite.

In some embodiments, the hydroxyapatite composite may comprise an activated carbon as a first additive and a metal in the form of zero-valent metal, salt, oxide, oxyhydroxide, or hydroxide as a second additive, wherein the metal may be selected from the group consisting of aluminium, tin, a transition metal selected from Groups 3-12 of the June 2016 IUPAC Periodic Table of Elements, preferably selected from the group consisting of aluminium, tin, titanium, iron, nickel, copper, zinc, zirconium, lanthanum, cerium, and any combination thereof; more preferably selected from the group consisting of aluminium, tin, iron, nickel, copper, zinc, lanthanum, and any combination thereof.

In some embodiments, the hydroxyapatite composite may comprise an activated carbon as a first additive and sulfur (zero-valent) as a second additive. The hydroxyapatite composite may comprise at least 2 wt %, or at least 5 wt % of sulfur ($S^0$) based on the total weight of dry matter. The hydroxyapatite composite may comprise at most 40 wt %, or at most 30 wt %, or at most 20 wt % of sulfur ($S^0$) based on the total weight of dry matter. The hydroxyapatite composite may comprise a weight ratio of activated carbon to sulfur (AC:S) of from 10:1 to 1:10, preferably from 5:1 to 1:5 or from 3:1 to 1:3, preferably from 1:2 to 2:1.

In some embodiments, the hydroxyapatite composite may comprise aluminium in the form of an oxide, oxyhydroxide, or hydroxide as a first additive and another metal in the form of zero-valent metal, salt, oxide, oxyhydroxide, or hydroxide as a second additive, wherein the other metal may be selected from the group consisting of tin, a transition metal selected from Groups 3-12 of the June 2016 IUPAC Periodic Table of Elements, preferably selected from the group consisting of tin, titanium, iron, nickel, copper, zinc, zirconium, lanthanum, cerium, and any combination thereof: more preferably selected from the group consisting of tin, iron, nickel, copper, zinc, lanthanum, and any combination thereof, most preferably selected from the group consisting of iron of zero-valent metal, oxide, oxyhydroxide, or hydroxide. In some embodiments, a boehmite as the first additive may serve support for iron in the form of zero-valent metal, oxide, oxyhydroxide, or hydroxide, as the second additive.

In some embodiments, the hydroxyapatite composite may comprise a clay (such as a bentonite) as a first additive and a metal in the form of zero-valent metal, salt, oxide, oxyhydroxide, or hydroxide, wherein the metal may be selected from the group consisting of aluminium, tin, a transition metal selected from Groups 3-12 of the June 2016 IUPAC Periodic Table of Elements, preferably selected from the group consisting of aluminium, tin, titanium, iron, nickel, copper, zinc, zirconium, lanthanum, cerium, and any combination thereof; more preferably selected from the group consisting of aluminium, tin, iron, nickel, copper, zinc, lanthanum, and any combination thereof, most preferably selected from the group consisting of iron of zero-valent metal, oxide, oxyhydroxide, or hydroxide. In some embodiments, a bentonite as the first additive may serve support for iron in the form of zero-valent metal, oxide, oxyhydroxide, or hydroxide, as the second additive.

When the additive comprises a zeolite, the additive preferably comprises a zeolite selected from the group consisting of ZSM-5 (MFI), faujasites such as X, Y, US-Y, mordenites, chabazite, clinoptilolite, beta-zeolites such as 3A, 4A, 5A, and any combination thereof. The zeolite may be a high silica zeolite with a Si/Al molar ratio greater than 5, such as ZSM-5 (MFI), beta-zeolites such as 3A, 4A, 5A, or combinations thereof. The zeolite may be an intermediate silica zeolite with a Si/Al molar ratio from 2 to 5, such as chabazite, a faujasite, a mordenite, or combinations thereof.

When the additive comprises a clay, the additive may comprise kaolinite, antigonite, berthierines, pyrophyllite, talc, montmorillonite, hectorite, beidellite, saponite, illites, vermiculites, muscovite, phlogopite, margarite, clintonite, sepiolite, bentonite, attapulgite, diatomacous earth, or any combinations thereof; more preferably comprises a clay selected from the group consisting of kaolinite, montmorillonite, vermiculite, bentonite, and any combination thereof.

In some embodiments, the additive may comprise at least one activated carbon, chitosan, hopcalite, sulfur, iron (which may be in the form of metal, salt, oxide, oxyhydroxide, or hydroxide, preferably oxyhydroxide or hydroxide), or combinations of two or more thereof.

In some embodiments, the additive may comprise aluminium (in the form of metal, salt, oxide, oxyhydroxide, or hydroxide), tin (in the form of metal, salt, oxide, oxyhydroxide, or hydroxide), a transition metal (in the form of metal of oxidation state 0, salt, oxide, oxyhydroxide, or hydroxide) selected from the group consisting of titanium, iron, nickel, copper, zinc, zirconium, lanthanum, cerium, and combinations thereof, clays (e.g., bentonite), zeolites, or combinations of two or more thereof.

In some embodiments, the additive may comprise iron (in the form of metal, salt, oxide, oxyhydroxide, or hydroxide), preferably may comprise $Fe^0$, $Fe(OH)_3$ and/or FeOOH.

In some embodiments, the additive may comprise zero-valent iron ($Fe^0$) and zero-valent sulfur ($S^0$). The hydroxyapatite composite may comprise a weight ratio of $Fe^0$ to $S^0$ ($Fe^0:S^0$) of from 10:1 to 1:10, preferably from 5:1 to 1:5 or from 3:1 to 1:3, preferably from 1:2 to 2:1.

The additive may be organic or inorganic.

In preferred embodiments, the additive is inorganic. The additive preferably comprises at least one activated carbon, hopcalite, aluminium, tin, and/or a transition metal selected from Groups 3-12 of the June 2016 IUPAC Periodic Table of Elements, such as titanium, iron, copper, nickel, zirconium, lanthanum, cerium, etc. . . . each metal being in the form of metal of oxidation state 0, salt, oxide, oxyhydroxide, or hydroxide.

In such instance, the additive may comprise at least one activated carbon, hopcalite, sulfur, iron (in the form of metal, salt, oxide, oxyhydroxide, or hydroxide), aluminium (in the form of metal, salt, oxide, oxyhydroxide, or hydroxide), or combinations of two or more thereof, preferably may comprise or consist of an activated carbon, activated carbon+zero-valent sulfur ($S^0$), hopcalite, $Fe(OH)_3$, FeOOH, zero-valent Fe, or zero-valent Fe+zero-valent sulfur ($S^0$).

In some embodiments, the additive may comprise or consists of at least one activated carbon.

Activated carbon may originate from various sources. It can be produced from carbonaceous source materials such as bamboo, coconut husk/shell, willow peat, wood, coir, lignite, coal, petroleum coke, and/or petroleum pitch.

In preferred embodiments, the activated carbon used as additive is in a powder form. Its average particle size is generally in size of less than 1 mm. Preferred average particle size for activated carbon may be at most 500 microns, preferably at most 400 microns, or at most 300 microns, or at most 200 microns, or at most 100 microns, or at most 80 microns, or at most 60 microns. Generally, the average particle size for activated carbon may be at least 5 microns, or at least 10 microns.

In particular embodiments, the average particle size for activated carbon is preferably within +/−50% of the average particle size of the hydroxyapatite which is to be synthesized in the presence of this activated carbon.

In particular preferred embodiments, the average particle size for activated carbon is preferably less than the average particle size of the hydroxyapatite which is to be synthesized in the presence of this activated carbon.

The activated carbon may be selected based at least on the following criteria: the activated carbon yields a pH of at least 5 when dispersed in a suspension at 0.3 wt % in deionized water for 5 hours.

When the additive comprises an activated carbon or blend of two or more activated carbons, the activated carbon or blend of two or more activated carbons is selected so that a 0.3 wt % dispersion of the activated carbon(s) in deionized water provides a pH of 5 or more.

If the selected activated carbon yields a pH of less than 5 when dispersed in a suspension at 0.3 wt % in deionized water for 5 hours, then a blend with another more-alkaline activated carbon may be used in the additive to provide a pH of 5 or more.

The activated carbon may comprise a pore volume of at least 0.25 cm$^3$/g, preferably at least 0.35 cm$^3$/g, more preferably at least 0.4 cm$^3$/g.

The activated carbon may have a BET surface are of at least 500 m$^2$/g, preferably at least 750 m/g.

The activated carbon may have a unique distribution of pore sizes that contributes to the ability of the composite to remove specific contaminants from aqueous systems. In one embodiment, the activated carbon has a porosity of at least about 0.25 cm$^3$/g. The pores diameter of the activated carbon may be at least about 10 and at most about 500 Å (Hg intrusion porosimetry, such as using a Micromeritics model AutoPore-II 9220 porosimeter). In another embodiment, the activated carbon has a porosity of at least about 0.4 cm$^3$/g in pores diameter of at least about 10 and at most about 500 Å.

In some embodiments, the activated carbon has been subjected to a treatment prior to being used into the hydroxyapatite composite synthesis. Such treatment may enhance the sorption capability of the activated carbon and/or modify the porosity of the activated carbon.

For example the activated carbon may be impregnated by sulfur to enhance the sorption of mercury cations. An example of such sulfur-impregnated activated carbon is MerSorb® from NUCON International.

In another treatment example, the activated carbon may be subjected to an acid treatment such as with nitric acid.

Yet in another treatment example, the activated carbon may be subjected to steam, generally to impact its porosity.

In some embodiments, the activated carbon is not treated with acid prior to being used into the hydroxyapatite composite synthesis.

In some embodiments concerning the formulation of the hydroxyapatite composite, the additive may exclude activated carbon.

In some embodiments, the additive may comprise or consist of hopcalite.

The hopealite is a mixture of manganese oxide and copper oxide, which has been used for the capture of mercury in gaseous effluents. A synthesis method is described in the publication of T. J. Clarke, S. A. Kondrat, S. H. Taylor, *Total oxidation of naphtalene using copper manganese oxide catalyst. Catalysis Today* vol 258 (2015) pp. 610-615.

In some embodiments, the additive may exclude hopcalite.

The additive may comprise or consist of an iron-containing additive, preferably in the form of metal of oxidation state 0, salt, oxide, oxyhydroxide, or hydroxide, preferably in the form of metal of oxidation state 0, oxide, oxyhydroxide, or hydroxide. The iron in the additive may be of oxidation state 0, 2 or 3. The iron-containing additive is preferably inorganic. If the additive comprises an iron salt, the iron salt is preferably inorganic.

The additive may comprise or consist of an iron oxide. The iron oxide may be iron(III) oxide or ferric oxide of formula $Fe_2O_3$, iron(II) oxide (FeO), or iron(II,III) oxide ($Fe_3O_4$). The additive may comprise or consist of $Fe_3O_4$. $Fe_3O_4$ can occur naturally as the mineral magnetite or may be synthesized, for example in the form of nanoparticles. Examples of synthesis of $Fe_3O_4$ nanoparticles can be found in Gonzales et al., 2012, *Journal of Hazard Materials*, vol. 211-212, pg. 138-145 using non microwave-assisted or microwave-assisted synthetic techniques or using chemical co-precipitation method similar to previously described in Onar & Yakinci, *Journal of Physics: Conference Series* 667 (2016) 012005, the International Conference on Magnetic and Superconducting Materials (MSM15), IOP Publishing doi:10.1088/1742-6596/667/1/012005, and Meng et al, *Applied Surface Science*, Vol. 280, pg. 679-685.

When the additive comprises iron, the additive more preferably comprises iron(III) hydroxide, and/or iron(III) oxyhydroxide; more preferably comprises iron(III) oxyhydroxide.

Iron(III) hydroxide has the chemical formula $Fe(OH)_3$.

Iron(III) oxyhydroxide has the chemical formula FeOOH. It can be obtained for example by reacting ferric chloride with sodium hydroxide. Alternatively, iron(II) may be oxidized to iron(III) by hydrogen peroxide in the presence of an acid. Furthermore, ferric hydroxide can be prepared as described in WO2003/053560 or can be prepared as described in [0045] of WO2017/109014 using solution of $Fe(NO_3)_3$ and acetic acid and solution of ammonia. Alternatively, commercially available iron(III) oxide-hydroxide may be used. Iron(III) oxide-hydroxide occurs in anhydrous and hydrated forms. Ferrihydrite ($FeOOH.0.4H_2O$) is a hydrous ferric oxyhydroxide mineral which is also suitable for use as additive. Furthermore, iron(III) oxyhydroxide occurs in four different polymorphic forms, known as alpha-, beta-, gamma- and delta-FeOOH. All these forms may be used in the present invention. Goethite is a widespread mineral of formula $\alpha$-FeO(OH) and lepidocrocite is a less common mineral of formula $\gamma$-FeO(OH) with the same chemical composition as goethite but with a different crystal structure.

The iron(III) oxyhydroxide particles may have a median particle size in the range of from about 1 to about 3,000 nm, preferably about 5 to about 2,000 nm, more preferably from about 10 to about 700 nm, even more preferably from about 50 to about 500 nm, such as in the range of from about 100 to about 400 nm. The iron(III) oxyhydroxide may be formed in situ during the synthesis of the hydroxyapatite by adding the Fe precursor and adding a base to form the FeOOH, or FeOOH may be added as an aqueous slurry or solution comprising from at least 1 wt % to at most 20 wt % FeOOH, or from at least 2 wt % to at most 15 wt % FeOOH, or from at least 2 wt % to at most 10 wt % FeOOH.

The iron may be added during the synthesis of the hydroxyapatite in the form of an iron precursor such as a salt. A suitable precursor of iron may be iron chloride, iron nitrate, iron sulfate, or any combination thereof. A base (source of OH⁻) is generally added to this iron precursor to generate iron(III) hydroxide or oxyhydroxide.

When the additive comprises aluminium, the aluminium-containing additive preferably is in the form of metal (oxidation state 0), salt, oxide, oxyhydroxide, or hydroxide; more preferably in the form of oxide, oxyhydroxide, or hydroxide; yet more preferably in the form of oxyhydroxide or hydroxide. The aluminium-containing additive is preferably inorganic. The aluminium salt is preferably inorganic.

The aluminium-containing additive may be in the form of boehmite or pseudoboehmite, bauxite, gibbsite including the bayerite form, and/or alumina (from γ-alumina to α-alumina, also known as 'corundum'). Boehmite has the chemical formula γ-AlO(OH), and gibbsite has the chemical formula γ-Al(OH)$_3$. A pseudo-boehmite refers to a monohydrate of alumina having a crystal structure corresponding to that of boehmite but having low crystallinity or ultrafine particle size.

In some embodiments, the aluminium-containing additive may comprise or be a hydrated aluminium oxide (e.g., γ-alumina) also called 'hydrous aluminium oxide', for example in the form of an amorphous aluminium hydroxide phase such as bayerite.

When the additive comprises tin, the tin-containing additive may be in the form of zero-valent metal, salt, oxide, oxyhydroxide, or hydroxide, preferably tin (II) oxyhydroxide or tin(II) oxide. An example of a suitable tin-containing additive may comprise or consist of Sn(II) oxyhydroxide and/or SnO$_2$, that can be effective in Cr(VI) and Cr(III) removal from water—see Pinakidou et al., *Science of the Total Environment*, vol 551-552 (2016) pp. 246-253.

When the additive comprises lanthanum, the lanthanum-containing additive may be in the form of metal, salt, oxide, oxyhydroxide, or hydroxide, preferably lanthanum(III) hydroxide or oxyhydroxide. Crystals of lanthanum oxyhydroxide (LaOOH) can be made using an electrochemical method (Samata H., *Journal of Crystal Growth*, Vol. 304(2), 2007, pp. 448-451).

The additive may comprise or consist of chitosan. Chitosan is a linear polysaccharide composed of randomly distributed β-(1→4)-linked D-glucosamine (deacetylated unit) and N-acetyl-D-glucosamine (acetylated unit). It is made by treating the chitin shells of shrimp and other crustaceans with an alkaline substance, like sodium hydroxide.

In some embodiments, the additive may exclude a polymer, such as may exclude chitosan and/or polyvinyl alcohol.

In some embodiments, the additive may comprise or consists of a clay. When the additive comprises a clay, the additive preferably comprises kaolinite, antigonite, berthierines, pyrophyllite, talc, montmorillonite, hectorite, beidellite, saponite, illites, vermiculites, muscovite, phlogopite, margarite, clintonite, sepiolite, bentonite, attapulgite, diatomacous earth, or any combinations thereof, more preferably comprises kaolinite, montmorillonite, vermiculites, bentonite, or any combinations thereof. TABLE 1 provides below the chemical formula with key characteristics of suitable clays.

In some embodiment, the clay may be subjected to an acid treatment to make an acidified clay prior to being used to synthesize the hydroxyapatite composite.

In some embodiments, the additive may exclude a clay, such as may exclude an acidified clay.

TABLE 1

| | | Clays suitable for additive in the composite | |
|---|---|---|---|
| Layer | Layer charge/ formula unit | Dioctaedric Clays | Trioctaedric Clays |
| 1:1 | 0 | Kaolinite (Si$_4$)(Al$_4$)O$_{10}$(OH)$_8$ | Antigorite (Si$_4$)(Mg$_3$)O$_{10}$(OH)$_8$ |
| | ≠0 | | Berthierines (Si$_{4-x}$Al$_x$)(Mg$^{2+}_{6-x}$M$^{3+}_x$)O$_{10}$(OH)$_8$ |
| | ≠0 | Pyrophyllite (Si$_8$)(Al$_4$)O$_{20}$(OH)$_4$ | Talc (Si$_8$)(Mg$_6$)O$_{20}$(OH)$_4$ |
| | | SMECTITES | |
| 2:1 | 0.4 α | Montmorillonite (Si$_8$)(Al$_{4-y}$Mg$_y$)O$_{20}$(OH)$_4$M$_y^+$ | Hectorite (Si$_8$)(Mg$_{6-y}$Li$_y$)O$_{20}$(OH)$_4$M$_y^+$ |
| | 1.2 | Beidellite (Si$_{8-x}$Al$_x$)Al$_4$O$_{20}$(OH)$_4$M$_x^+$ | Saponite (Si$_{8-x}$Al$_x$)(Mg$_6$)O$_{20}$(OH)$_4$, M$_x^+$ |
| | 1.2 α 1.8 | Illites (Si$_{8-x}$Al$_x$)Al$_{4-y}$M$^{2+}_y$)O$_{20}$(OH)$_4$K$^+_{x+y}$ | Vermiculites (Si$_{8-x}$Al$_x$)(Mg$_{6-y}$M$^{3+}_y$)O$_{20}$(OH)$_4$K$_{x+y}$ |
| | | MICAS | |
| | 2 | Muscovite (Si$_6$Al$_2$)(Al$_4$)O$_{20}$(OH)$_2$K$^+_2$ | Phlogopite (Si$_6$Al$_2$)(Mg$_6$)O$_{20}$(OH)$_2$K$^+_2$ |
| | 4 | Margarite (Si$_4$Al$_4$)(Al$_4$)O$_{20}$(OH)$_2$Ca$^{2+}_2$ | Clintonite (Si$_4$Al$_4$)(Mg$_6$)O$_{20}$(OH)$_2$Ca$^{2+}_2$ |

In some embodiments, the additive may comprise or consists of at least one zeolite.

When the additive comprises a zeolite, the additive preferably comprises a zeolite selected from the group consisting of ZSM-5 (MFI), faujasites such as X, Y, US-Y, mordenites, chabazite, clinoptilolite, beta-zeolites such as 3A, 4A, 5A, and any combination thereof. The zeolite may be a high silica zeolite with a Si/Al molar ratio greater than 5, such as ZSM-5 (MFI), beta-zeolites such as 3A, 4A, 5A, or combinations thereof. The zeolite may be an intermediate silica zeolite with a Si/Al molar ratio from 2 to 5, such as chabazite, a faujasite, a mordenite, or combinations thereof.

In some embodiments, the additive may exclude a zeolite.

Particle Size of Composite:

The composite material comprises solid particles with a mean diameter D50 of which is greater than 10 μm, in general greater than 20 μm, or even greater than 25 μm, or even at least 30 μm, or even at least 35 μm, and/or preferably less than 200 μm, or even less than 150 μm, or even less than 100 μm. In some preferred embodiments, the composite material comprises solid particles with a mean diameter D50 from 20 microns to 60 microns, or from 25 microns to 60 microns, or from 30 microns to 60 microns. The mean diameter in question is the D50, that is to say the diameter such that 50% by weight of the particles have a diameter less than said value.

The mean particles size D50 is the diameter such that 50% by weight of the particles have a diameter less than said value. The particle size measurement may be measured using laser diffraction, such as using a Beckman Coulter LS 230 laser diffraction particle size analyser (laser of wavelength 750 nm) on particles suspended in water and using a size distribution calculation based on Fraunhofer diffraction theory (particles greater than 10 μm) and on Mie scattering theory (particles less than 10 μm), the particles being considered to be spherical.

Composition of Composite

The hydroxyapatite composite according to the invention in general comprises at least 50 wt % hydroxyapatite, advantageously at least 60 wt % or advantageously still at least 70 wt % hydroxyapatite, still more advantageously at least 75 wt % hydroxyapatite, based on the total weight of dry matter.

The hydroxyapatite composite preferably comprises a weight ratio of hydroxyapatite to additive (HAP:A) of from 1:0.01 to 1:0.5. That is to say, when 100 g of hydroxyapatite in the composite, a minimum of 1 g of additive is present and/or a maximum of 50 g is present in the composite. The weight ratio of is preferably at least 1:0.02 or at least 1:0.03. The weight ratio of is preferably at most 1:0.3, more preferably at most 1:0.25. The hydroxyapatite composite may comprise a weight ratio of hydroxyapatite to additive (HAP:A) of from 1:0.01 to 1:0.5, preferably from 1:0.02 to 1:0.4 or from 1:0.03 to 1:0.4, more preferably from 1:0.04 to 1:0.3, yet more preferably from 1:0.05 to 1:0.25, yet even more preferably from 1:0.05 to 1:0.20.

A range of 5 to 20 g additive per 100 g of hydroxyapatite is particularly suitable.

The hydroxyapatite composite may comprise at least 2 wt %, or at least 3 wt %, or at least 4 wt %, or at least 5 wt %, of the additive based on the total weight of dry matter.

The hydroxyapatite composite may comprise at most 50 wt %, or at most 40 wt %, or at most 30 wt %, or at most 20 wt % of the additive based on the total weight of dry matter.

The hydroxyapatite composite may further comprise: water, of the order of from 0 to 20 wt %, advantageously from 1% to 20 wt %, more advantageously from 2% to 10 wt %, based on the total weight of dry matter.

In some embodiments, the hydroxyapatite composite may comprise water, of the order of from 5 wt % to 20 wt %, advantageously from 6 wt % to 20 wt %, based on the total weight of dry matter.

In some embodiments, the hydroxyapatite composite may comprise, based on the total weight of dry matter, less than 5 wt % water, preferably less than 5 wt % and down to 0.1 wt % or even lower In some embodiments, the hydroxyapatite composite may further comprise, based on the total weight of dry matter, calcium carbonate in an amount of less than 20 wt % and more than 0 wt %, preferably from 1 wt % to 19 wt %, more preferably from 2 wt % to 18 wt %, even more preferably from 5 wt % to 15 wt %, yet even more preferably from 7 wt % to 13 wt %, most preferably from 8 wt % to 12 wt %.

The hydroxyapatite composite may further comprise, based on the total weight of dry matter, calcium dihydroxide $Ca(OH)_2$ from 0 to 20%, advantageously from 0 to 4%, or more advantageously from 0 to 1 wt %, or alternatively more than 0 wt % but at most 4 wt %, or from 1% to 4 wt %.

In some embodiments, the hydroxyapatite composite may comprise less than 1 wt % of calcium dihydroxide $Ca(OH)_2$, preferably less than 0.5 wt % calcium dihydroxide, more preferably less than 0.3 wt % calcium dihydroxide, even more preferably less than 0.2 wt % calcium dihydroxide. In some embodiments, the porous support is substantially free of calcium dihydroxide (i.e., less than 0.1 wt % $Ca(OH)_2$).

In some embodiments, the hydroxyapatite composite may comprise at least 2 wt %, preferably at least 2.5 wt % or at least 3 wt %, more preferably at least 5 wt %, and yet more preferably at least 6 wt % of hydroxide ions.

The particles of hydroxyapatite composite may additionally contain residual compounds originating from the use of the raw materials in the process such as: $CaCl_2$, $Ca(NO_3)_2$, sands or clays; these residual constituents are in general less than 5% by weight, advantageously less than 2% by weight based on the total weight of dry matter.

In some embodiments, the hydroxyapatite composite may comprise, on the basis of the total weight of dry matter,
  water, of the order of from 1 wt % to 20 wt %, advantageously from 2 wt % to 20 wt %, or from 2 wt % to 10 wt %, or from 3 wt % to 8 wt %, and/or
  calcium carbonate in an amount of less than 20 wt % and more than 0 wt %, preferably from 1 wt % to 19 wt %, more preferably from 2 wt % to 18 wt %, even preferably from 3 wt % to 15 wt %, yet even more preferably from 4 wt % to 13 wt %, most preferably from 5 wt % to 10 wt %.

The hydroxyapatite composite may further comprise, based on the total weight of dry matter, less than 1 wt % of calcium dihydroxide $Ca(OH)_2$, preferably less than 0.5 wt % calcium dihydroxide, more preferably less than 0.3 wt % calcium dihydroxide, even more preferably less than 0.2 wt % calcium dihydroxide, or even less than 0.1 wt % $Ca(OH)_2$).

The hydroxyapatite composite may comprise a calcium-deficient hydroxyapatite, preferably with a Ca/P molar ratio more than 1.5 and less than 1.67.

The hydroxyapatite composite may comprise a calcium-deficient hydroxyapatite and has an overall Ca/P molar ratio higher than the calcium-deficient hydroxyapatite.

In some preferred embodiments, the additive may exclude activated carbon and the composite is substantially free of carbon, i.e., less than 0.5 wt % of carbon.

In some other embodiments, the additive may comprise or consist of activated carbon, and the hydroxyapatite composite may comprise carbon for example in an amount of at least 5 wt % carbon but in an amount of at most 20 wt % carbon.

In some preferred embodiments, the hydroxyapatite composite is substantially free of bone char.

In preferred embodiments, the hydroxyapatite composite excludes bone char.

In preferred embodiments, the hydroxyapatite composite does not contain an organic polymer crosslinked network, for example created by in-situ polymerization of at least one polymer during the synthesis of the hydroxyapatite composite.

In some embodiments, the hydroxyapatite composite may exclude a polymer, such as may exclude chitosan and/or a polyvinyl alcohol.

In preferred embodiments, the hydroxyapatite composite is inorganic.

In other embodiments, the hydroxyapatite composite contains less than 1 wt % organics.

In some embodiments, the hydroxyapatite composite may exclude activated carbon.

Hydroxyapatite Component

The term "apatite" denotes a family of mineral compounds, the chemical formula of which can be written in the following general form:

$$Me_{10}(XO_4)_6Y_2$$

In this formula, Me generally represents a divalent cation ($Me^{2+}$), $XO_4$ a trivalent anionic group ($XO_4^{3-}$) and Y a monovalent anion ($Y^-$).

Calcium phosphate hydroxyapatite $Ca_{10}(PO_4)_6(OH)_2$ crystallizes in the space group of the hexagonal system. This structure consists of a close-packed quasi-hexagonal stack of $XO_4$ groups, forming two types of parallel tunnels.

The existence of these tunnels gives apatites chemical properties akin to those of zeolites. Vacancies may also be created either by the departure of anions and cations, or by the presence of cations or anions of different valency. Apatites therefore appear to be particularly stable structures which may tolerate large gaps in their composition.

Hydroxyapatite should not be confused with tricalcium phosphate (TCP), which has a similar weight composition: $Ca_3(PO_4)$ The Ca/P molar ratio of TCP is 1.5 whereas it is 1.67 for hydroxyapatite. Industrial apatites sold as food additives or mineral fillers are, as a general rule, variable mixtures of TCP and hydroxyapatite.

Other salts of calcium and phosphate, including TCP, do not have the same properties as hydroxyapatite. Although TCP can also react with heavy metals, hydroxyapatite is more advantageous as it can enclose metals in the form of an insoluble, and therefore relatively inert, matrix.

Ca-Deficient Hydroxyapatite

The hydroxyapatite in the composite may be deficient in calcium compared to a hydroxyapatite with a Ca/P molar ratio of 1.67. The Ca/P molar ratio of the calcium-deficient hydroxyapatite is preferably more than 1.5 and less than 1.67, more preferably with a Ca/P molar ratio more than 1.54 and less than 1.65.

The hydroxyapatite composite may comprise a calcium-deficient hydroxyapatite and has an overall Ca/P molar ratio higher than the calcium-deficient hydroxyapatite.

In some embodiments, the hydroxyapatite composite comprises:
  a calcium-deficient hydroxyapatite, preferably with a Ca/P molar ratio more than 1.5 and less than 1.67; and
  an additive, wherein said additive is present during the synthesis of such calcium-deficient hydroxyapatite.

Preferably the hydroxyapatite composite has a higher pore volume and/or a higher BET surface area compared to a calcium-deficient hydroxyapatite structure made using the same synthesis method but without the additive.

The at least one additive or a precursor thereof may be added to a vessel where the hydroxyapatite synthesis takes place, prior to or during the synthesis of the hydroxyapatite. That is to say, when the synthesis of the hydroxyapatite takes place in a vessel, the additive or a precursor thereof may be added to the vessel before the synthesis is initiated or while the hydroxyapatite structure is synthetized in this vessel.

The additive is preferably selected from the group consisting of one or more activated carbons, chitosan, a transition metal of groups 3-12 of the June 2016 IUPAC Periodic Table, such as iron, titanium, nickel, copper, zinc, zirconium, lanthanum, and/or cerium (in the form of metal, a salt, oxide, oxyhydroxide, or hydroxide), hopcalite, tin or aluminium (in the form of metal, a salt, oxide, oxyhydroxide, or hydroxide), clays, zeolites, and any combinations of two or more thereof. Various embodiments for the additive suitable for the composite described herein are applicable here.

The additive in the composite is preferably embedded or incorporated into or coated onto the hydroxyapatite structure or otherwise associated with the hydroxyapatite structure via cohesive forces.

Calcium may be and is preferably present in another form (other than the calcium-deficient hydroxyapatite) in the composite. Calcium carbonate may be present in the composite. The weight ratio of the calcium-deficient hydroxyapatite to calcium carbonate is generally equal to or greater than 3, preferably equal to or greater than 4, more preferably equal to or greater than 5, yet more preferably greater than 7, most preferably equal to or greater than 9.

Generally, because of this other form of Ca in the composite, the hydroxyapatite composite generally has an overall Ca/P molar ratio higher than the calcium-deficient hydroxyapatite present in the hydroxyapatite composite. For that reason, in some embodiments, even though the calcium-deficient hydroxyapatite in the composite may have a Ca/P molar ratio less than 1.67, the entire composite may have a Ca/P molar ratio equal to or more than 1.67.

In preferred embodiments, the calcium-deficient hydroxyapatite in the composite may have a Ca/P molar ratio of about 1.55-1.59, while the hydroxyapatite composite may have a Ca/P molar ratio of about 1.60-1.67.

Other salts of calcium and phosphate, including TCP, do not have the same properties as hydroxyapatite or a hydroxyapatite-like structure. Although TCP can also react with metals, a hydroxyapatite of Ca/P=1.67 as well as a calcium-deficient hydroxyapatite (1.5<Ca/P<1.67) are more advantageous because they can enclose or entrap metals in an insoluble form, and therefore relatively inert, matrix.

Process of Making the Composite

Another aspect of the present invention relates to a process for producing a hydroxyapatite composite, which may include separate sources of calcium and phosphate or a source of calcium and phosphate and the addition of the additive during the hydroxyapatite synthesis from the separate sources of calcium and phosphate or from the source of calcium and phosphate.

When the process starts with separate sources of calcium and phosphate, the process generally comprises two steps: a reaction of the two sources to obtain a suspension (A) of calcium phosphate, and then an alkaline maturation to form a hydroxyapatite structure. This process is typically referred to as the "2-step" process.

When the process starts with a source of calcium and phosphate, the process generally comprises an alkaline maturation of the source of calcium and phosphate to form a hydroxyapatite structure. This process is typically referred to as the "1-step" process.

A preferred embodiment of the process for producing a hydroxyapatite composite according to the present invention comprises:

in a first step, a source of calcium and a source of
phosphate ions are mixed in water in a molar ratio that
is adjusted to obtain a Ca/P molar ratio of between 0.5
and 1.6, preferably between 0.7 and 1.3, and reacting
the source of calcium with the phosphate ions at a pH
of between 2 and 8, in order to obtain a suspension (A)
of calcium phosphate, in a second step, adding to the suspension (A) an alkaline
compound comprising hydroxide ions in order to set a
pH of at least 7.5, preferably at least 8, or at least 8.5,
or at least 9, or of at least 10; further adding an
additional source of calcium in order to obtain a
suspension (B) of composite having a Ca/P molar ratio
of greater than 1.6, preferably greater than 1.65 to form
a hydroxyapatite structure; and further adding at least one additive or a precursor thereof
in the first step, in the second step, or in both in the first
and second steps.

When the additive or precursor thereof is added in the first step, it may be added at the beginning of the first step before the reaction takes place, during the reaction, or after the reaction is completed in the first step (this being preferred).

It is envisioned that the additive or precursor thereof may be added not all at once, for example in at least two portions, for example a first portion in the first step and another portion in the second step.

It is also envisioned that two or more additives or precursors thereof may be added. In an example, a first additive or precursor thereof is added in the first step and a second additive or precursor thereof is added in the second step. Alternatively, the first and second additives or precursors thereof may be added in the first step or in the second step.

Examples of additives or precursors thereof that may be added in the first step include activated carbon and/or chloride salts of metals (such as aluminium, tin, or a transition metal of groups 3-12 of the June 2016 IUPAC Periodic Table, preferably iron, titanium, nickel, copper, zinc, zirconium, lanthanum, and/or cerium).

A particular embodiment of the present invention relates to a process for producing the hydroxyapatite composite, comprising:

in a first step, a source of calcium and a source of
phosphate ions are mixed in water in a molar ratio that
is adjusted to obtain a Ca/P molar ratio of between 0.5
and 1.6, preferably between 0.7 and 1.3, and reacting
the source of calcium with the phosphate ions at a pH
of between 2 and 8, in order to obtain a suspension (A)
of calcium phosphate, and in a second step, adding to the suspension (A) an alkaline
compound comprising hydroxide ions in order to set a
pH of at least 7.5, preferably at least 8, or at least 8.5,
or at least 9, or of at least 10; further adding an
additional source of calcium in order to obtain a
suspension (B) of composite having a Ca/P molar ratio
of greater than 1.6, preferably greater than 1.65, and
further adding at least one additive or a precursor
thereof, to form a composite material comprising a
hydroxyapatite structure.

An alternate embodiment of the present invention relates to a process for producing the hydroxyapatite composite, comprising:

in a first step, a source of calcium and a source of
phosphate ions are mixed in water in a molar ratio that
is adjusted to obtain a Ca/P molar ratio of between 0.5
and 1.6, preferably between 0.7 and 1.3, and reacting
the source of calcium with the phosphate ions at a pH
of between 2 and 8, in order to obtain a suspension (A)
of calcium phosphate, further adding at least one additive or a precursor thereof
during the first step, such as at the beginning of the first
step before the reaction takes place, during the reaction,
or after the reaction is completed in the first step (this
being preferred);

in a second step, adding to the suspension (A) an alkaline
compound comprising hydroxide ions in order to set a
pH of at least 7.5, preferably at least 8, or at least 8.5,
or at least 9, or of at least 10; further adding an
additional source of calcium in order to obtain a
suspension (B) of composite having a Ca/P molar ratio
of greater than 1.6, preferably greater than 1.65, to form
a composite material comprising a hydroxyapatite
structure.

Examples of additives or precursors thereof that may be added in the first step include activated carbon and/or chloride salts of metals (such as aluminium, tin, or a transition metal of groups 3-12 of the June 2016 IUPAC Periodic Table, preferably iron, titanium, nickel, copper, zinc, zirconium, lanthanum, and/or cerium).

An alternate process for producing the hydroxyapatite composite does not use an acid attack in the first step as explained above. This alternate process used an alkaline maturation step on particles of a calcium phosphate compound. The calcium phosphate compound preferably has a Ca/P molar ratio of 1.5 or less, preferably between 0.50 and 1.35. This alternate process may comprise the following steps:

forming an aqueous suspension comprising particles of a
calcium phosphate compound having a Ca/P molar
ratio of 1.5 or less, preferably between 0.50 and 1.35,
more preferably particles containing brushite, yet more
preferably particles containing >70 wt % brushite, most
preferably particles containing >90 wt % brushite;

adding an alkaline compound comprising calcium and
hydroxide ions in order to increase the pH of the
suspension to a value of at least 6.5, preferably at least
7, or at least 7.5, or at least 8, or of at most 11 in order
to obtain a suspension (B') having a Ca/P molar ratio of
greater than 1.6, preferably greater than 1.65, and/or
less than 1.75; and further adding at least one additive or precursor thereof to
the suspension (B') before, during or after the addition
of the alkaline compound, preferably before or during
the addition of the alkaline compound, to form the
hydroxyapatite composite, The calcium phosphate material may comprise monocalcium phosphate (MCP) having the weight formula $Ca(H_2PO_4)_2$, dicalcium phosphate (DCP) having the weight formula $CaHPO_4$, or the hydrate thereof, brushite having the weight formula $CaHPO_4 \cdot 2H_2O$, and/or octacalcium having the weight formula $Ca_8H_2(PO_4)_6 \cdot 6.5H_2O$. The Ca/P molar ratios are respectively for these compounds: 0.5 (MCP), 1.0 (DCP and brushite), 1.33 (octacalcium). The calcium phosphate material may comprise particles containing brushite, preferably particles containing >70 wt % brushite, more preferably particles containing >90 wt % brushite.

In a preferred embodiment, the alternate process for producing the hydroxyapatite composite may comprise the following steps:

forming an aqueous suspension comprising particles containing brushite, preferably particles containing >70 wt % brushite, more preferably particles containing >90 wt % brushite;

adding an alkaline compound comprising calcium and hydroxide ions in order to increase the pH of the suspension to a value of at least 6.5, preferably at least 7, or at least 7.5, or at least 8, or of at most 11 in order to obtain a suspension (B') having a Ca/P molar ratio of greater than 1.6, preferably greater than 1.65, and/or less than 1.75; and further adding at least one additive or precursor thereof to the suspension (B') before, during or after the addition of the alkaline compound, preferably before or during the addition of the alkaline compound, to form the hydroxyapatite composite, wherein said suspension (B') contains from 10 to 35 wt % solids, preferably from 15 to 25 wt % solids.

In this alternate process, the alkaline compound comprises calcium hydroxide.

The additive may be added as a precursor of the additive, and this precursor is converted to the form of the additive during the synthesis of the composite in order for the additive to be present in the final composition of the composite. For example, a precursor of the additive may be a salt of a metal, and during the synthesis of the composite, the salt of a metal is converted to an hydroxide or oxyhydroxide of the metal to generate the additive in the final composition of the hydroxyapatite composite.

In some embodiments, the additive or precursor thereof may be in the form of a solution or a slurry before it is added to at least one of the first and second steps of the 2-step process of making the composite or before it is added before or during the alkaline maturation step in the 1-step process of making the composite.

The additive is preferably incorporated or embedded into or coated onto the hydroxyapatite structure, or otherwise associated with the hydroxyapatite structure via cohesive forces.

In some embodiments, the additive or precursor thereof may be in the form of a solid before it is added to at least one of the first and second steps of the 2-step process of making the composite or before it is added before or during the alkaline maturation step in the 1-step process of making the composite.

In some embodiments, when the D50 particle size of the solid additive or precursor thereof is greater than 100 microns, the method of making the composite may further include grinding or milling the solid to achieve a D50 less than 100 microns or less than 90 microns, preferably less than 75 microns, or more preferably less than 63 microns, before the resulting powder is added to at least one of the first and second steps of the method of making the composite.

In some embodiments, when the additive or precursor thereof may be in the form of a powder (either sold 'as is' or ground before use), the method of making the composite may further include sieving the powder of the additive or precursor thereof to remove large particles, such as those exceeding a size of 100 microns, or exceeding a size of 90 microns. For example, the powder of the additive or precursor thereof which passes through a sieve No. 170 (under ASTM E11) equivalent to a size of less than 90 microns, or through a sieve No. 200 (under ASTM E11) equivalent to a size of less than 75 microns, or through a sieve No. 230 (under ASTM E11) equivalent to a size of less than 63 microns can be added to at least one of the first and second steps of the 2-step process of making the composite or before it is added before or during the alkaline maturation step in the 1-step process of making the composite.

In the present invention, the source of calcium in the 2-step process advantageously comprises calcium carbonate, or calcium oxide, or calcium hydroxide, or calcium chloride, or calcium nitrate, or calcium acetate. The source of calcium is more advantageously a limestone, or a mixture of limestone and calcium oxide or hydroxide. More advantageously, the source of calcium is in the form of powder or aqueous suspension of powder and the powder is selected from: calcium carbonate, calcium oxide, calcium hydroxide, or a mixture thereof, and the powder has a mean particle size of less than 300 µm.

It is advantageous in the 2-step process for the source of calcium selected from calcium carbonate, calcium oxide, calcium hydroxide or mixtures thereof to be in the form of a powder or aqueous suspension of powder, and to have a small particle size. In one recommended variant, the mean diameter of the particles of the powder is less than 300 µm, advantageously less than 200 µm and preferably less than 100 µm. The mean diameter in question is the D50, that is to say the diameter such that 50% by weight of the particles have a diameter less than said value.

In the present invention, various sources of phosphate ions in the 2-step process may be used, in particular:

phosphoric acid, or a dihydrogen phosphate salt such as a sodium, potassium or ammonium dihydrogen phosphate salt, preferably a sodium dihydrogen phosphate salt, or a monohydrogen phosphate salt such as a sodium, potassium or ammonium monohydrogen phosphate salt, preferably a sodium monohydrogen phosphate salt.

In the present invention, phosphoric acid in the 2-step process is preferred due to its greater availability and lower cost compared to dihydrogen and monohydrogen phosphate salts.

In the process according to the invention, in the first step in the 2-step process the Ca/P molar ratio is in particular between 0.50 and 1.6, preferably between 0.50 and 1.35, more preferably between 0.70 and 1.30, yet more preferably between 0.80 and 1.20.

During the first step of the 2-step process where calcium and phosphate are used in a Ca/P molar ratio of between 0.5 and 1.6 and where they are reacted at a pH between 2 and 8, the compounds formed in the suspension (A) are a mixture of monocalcium phosphate (MCP) having the weight formula $Ca(H_2PO_4)_2$, of dicalcium phosphate (DCP) having the weight formula $CaHPO_4$, or the hydrate thereof, brushite, having the weight formula $CaHPO_4.2H_2O$, and of octacalcium having the weight formula $Ca_8H_2(PO_4)_6.6.5H_2O$. The Ca/P molar ratios are respectively for these compounds: 0.5 (MCP), 1.0 (DCP and brushite), 1.33 (octacalcium).

In order to promote, in the first step of the 2-step process, the formation of MCP and DCP, a Ca/P ratio of between 0.50 and 1.35, preferably between 0.7 and 1.30, is favored. This Ca/P molar ratio is particularly advantageous when the source of calcium from the first step comprises calcium carbonate, and the source of phosphate is phosphoric acid ($H_3PO_4$) or is a dihydrogen phosphate salt such as a sodium or potassium or ammonium salt. Specifically, this makes it possible to obtain a rapid attack of the calcium carbonate and a rapid degassing of the $CO_2$. In addition to calcium carbonate, the source of calcium may comprise calcium oxide, or calcium hydroxide, or calcium chloride, or calcium nitrate, or calcium acetate.

In other embodiments, in order to promote, in the first step of the 2-step process, the formation of DCP and octacalcium, a Ca/P ratio of between 1.4 and 1.6, preferably between 1.4 and 1.5, is favored. This molar ratio is advantageous when use is made of a source of calcium having less than 30% by weight of carbonate, such as preferably: calcium oxide, or calcium hydroxide, or calcium chloride, or calcium nitrate, or calcium acetate.

In the present invention, in the first step of the 2-step process, the source of calcium and the phosphate ions are in general reacted for at least 0.1 hour, preferably at least 0.5 hour. It is not useful to react the source of calcium and the phosphate ions over excessively long durations.

Advantageously, the source of calcium and the phosphate ions in the 2-step process are reacted for at most 4 hours, more advantageously at most 2 hours, or even at most 1 hour. For example, a duration of 1 hour at pH 5 already enables a good reaction of the calcium and the phosphate ions, and makes it possible to sufficiently release the $CO_2$ when a source of calcium comprising calcium carbonate is used, before moving on to the second step.

In the 1-step or 2-step process according to the present invention, in the (second) alkaline maturation step, the suspension (B) or (B') of the composite in general has a Ca/P molar ratio of at most 5, preferably of at most 3, more preferably still of at most 2, yet more preferably of at most 1.75, most preferably of at most 1.7.

In the present invention, it is advantageous, in the second step of the 2-step process, for the alkaline compound used, that comprises hydroxide ions, to be sodium hydroxide and/or calcium hydroxide.

In the present invention, it is advantageous, in the alkaline maturation step of the 1-step process, for the alkaline compound used that comprises calcium and hydroxide ions, to include or consist of calcium hydroxide.

In the process according to the invention, it is particularly advantageous in the 2-step process for the additional source of calcium to be selected from calcium chloride, calcium nitrate, or calcium acetate, preferably calcium chloride, and for it to be added in addition to the alkaline compound, in order to finely adjust the Ca/P ratio and in order to limit the concentration of phosphorus element in the aqueous solution (C) of the suspension (B) to at most 5 mmol, advantageously to at most 0.5 mmol, more advantageously to at most 0.05 mmol of phosphorus element per litre of aqueous solution (C). Specifically, this makes it possible, coupled with the use of hydroxide ions for setting the pH of the second step, to limit the losses of phosphates in the process waters.

In the present invention, in general, the stirring and the density of suspension (B) or (B'), in the (second) alkaline maturation step and advantageously also of suspension (A) in the first step in the 2-step process, are adjusted in order to avoid the appearance of a calcium phosphate gel having a viscosity of at least 200 cps. The viscosity of the composite suspension (B) or (B') in the (second) alkaline maturation step in the method of making of the present invention is typically about 10 eps (mPa·s). Specifically, the production of a gel, even in the presence of the (second) alkaline maturation step, results in solid particles of small particle size being produced, with weight-average D50 values of less than 10 μm, which is a disadvantage for certain applications of liquid effluents such as those that use a sludge blanket.

The suspended solids density of the suspension (A) in the first step is in general at most 25% by weight.

The suspended solids density of the suspension (B) or (B') in the (second) alkaline maturation step is in general at most 35%, preferably at most 25% by weight. The suspended solids density of the suspension (A) and or of the suspension (B) or (B') is advantageously at least 5 wt %, more advantageously at least 10 wt %, most advantageously at least 15 wt %. A preferred range of suspended solids density of the suspension (B) or (B') in the (second) alkaline maturation step is from 15 wt % to 25 wt %. It has been indeed observed that a too low density of suspension decreases the efficacy of the produced reactant particles in heavy metal adsorption. Moreover a too low density of suspension induces longer time of water separation when decantation or filtration is used in the process.

In the process of the present invention, the stirring of the suspension during the first and (second) alkaline maturation steps corresponds generally to a stirring dissipated energy in the reactors volume of at least 0.2 and at most 1.5 $kW/m^3$, preferably at least 0.5 and at most 1.0 $kW/m^3$.

In a first embodiment of the present invention, the first step in the 2-step process is carried out at a temperature of less than 50° C., preferably at a temperature of at most 45° C., or at a temperature of at most 40° C., more preferably at a temperature of at most 35° C. This makes it possible to obtain a composite at the end of the (second) alkaline maturation step in the form of particles of large to medium particle size and having a high specific surface area.

An embodiment of the present invention further relates to a particle of hydroxyapatite composite,
  having a mean size of at least 20 μm, or at least 25 μm, or at least 30 μm;
  having a specific surface area of at least 120 $m^2/g$, or at least 130 $m^2/g$, at least 140 $m^2/g$; and/or
  having a total pore volume of at least 0.3 $cm^3/g$, at least 0.32 $cm^3/g$. or at least 0.4 $cm^3/g$.

In a second embodiment (less preferred) of the present invention, the first step in the 2-step process is carried out at a temperature of at least 50° C., preferably of at least 55° C., or of at least 60° C. This makes it possible to obtain a composite in the (second) alkaline maturation step in the form of particles of small particle size and having a lower specific surface area. The invention relates in particular to a particle of composite obtained by the process according to this second embodiment, having a mean size of at most 30 μm, preferably of at most 20 μm and having a specific surface area of at least 15 $m^2/g$, preferably of at least 50 $m^2/g$.

In the first or second embodiment of the process of the present invention, it is advantageous for the (second) alkaline maturation step to be carried out at a temperature of at least 45° C., preferably of at least 50° C., more preferably of at least 55° C., or of at least 60° C., or of at least 80° C., and/or of at most 90° C. Specifically, this makes it possible to rapidly convert the calcium phosphate compound of low Ca/P ratio (such as brushite) into the composite comprising a hydroxyapatite of higher Ca/P ratio, with a good fixation of the hydroxide ions at the core and at the surface of the composite, and to more rapidly consume the phosphates from the solution of the suspension (B) or (B'). Advantageously, the (second) alkaline maturation step is carried out for a duration of at least 0.5 hour.

In general, the addition of the alkaline compound comprising hydroxide ions in order to set the pH of the (second) alkaline maturation step, and of the additional source of calcium in order to obtain a suspension (B) of composite having a Ca/P molar ratio of greater than 1.6 last no more than 6 hours, advantageously no more than 4 hours, or no more than 2.5 hours; at higher temperature such as at 50 or at 60° C. a duration of generally one to 2 hours is sufficient, as at 40° C. the duration for alkaline compound addition to set the pH of the (second) alkaline maturation step is generally longer: and about 2 to 2.5 hours are needed.

Preferably, the alkaline compound addition is stopped when the pH remains at the set value for at least 15 minutes.

It is to be understood that the time for reaction in the (second) alkaline maturation step is generally dependent of the end pH of the (second) alkaline maturation step, and it may be impacted by the size of the equipment that is used to make the composite. It was observed for example that, when using the same temperature for the (second) alkaline maturation step, for a 3-L or 5-L reactor, the reaction time needed to reach the pH of about 8 to 9 in the second step was generally from 1 hour to 3 hours, whereas in a 200-L reactor, the reaction time needed to reach the pH of about 8 to 9 in the second step was generally from 2 hours to 6 hours The addition of hydroxide ions for setting the pH of the (second) alkaline maturation step, and the addition of the additional source of calcium can be carried out by using calcium hydroxide to provide both hydroxide ions and additional source of calcium.

Advantageously, the addition of the additive or a precursor thereof may be carried out once the addition of hydroxide ions for setting the pH of the (second) alkaline maturation step and the addition of the additional source of calcium are completed.

Alternatively, the addition of the additive or a precursor thereof may be carried out before or during the addition of hydroxide ions for setting the pH of the (second) alkaline maturation step.

In a particular preferred embodiment, the method takes place in two steps, a first step called "acid attack" and a second step, called "lime maturation". The first step includes the decarbonation of calcium carbonate (as source of calcium) by the addition of phosphoric acid (as source of phosphate ions). Carbonic acid formed by this acid attack decomposes into water and carbon dioxide, as soon as the maximum solubility of $CO_2$ in the aqueous phase is reached. Calcium hydrogenphosphate ($CaHPO_4.2H_2O$, also known as brushite) formed in the first step of the 2-step process has a Ca/P molar ratio of 1. However, the Ca/P molar ratio of a stoichiometric hydroxyapatite is 1.67. So there is a calcium deficit that has to be filled by the second step. In the second step "lime maturation", the addition of lime ($Ca(OH)_2$) as an additional source of calcium to the brushite contributes the calcium necessary to approach a stoichiometric hydroxyapatite. But this addition of lime also allows the addition of hydroxide anions necessary for the structure of the hydroxyapatite and the neutralization of $H^+$ hydrogenphosphate. This method has the advantage that it allows the synthesis of hydroxyapatite from relatively inexpensive reagents, compared to other methods, and uses relatively mild conditions of synthesis (temperature and pH).

In some embodiment, the synthetized hydroxyapatite in the composite approaches the molar Ca/P hydroxyapatite stoichiometry of 1.67 but generally comprises a Ca/P more than 1.5 and less than 1.67, that is to say, the synthetized hydroxyapatite in the composite is deficient in calcium compared to the stoichiometry. Some of the calcium source (e.g., calcium carbonate when it is used in the first step) which is not utilized in the hydroxyapatite would remain inside the hydroxyapatite composite composition.

In this particular preferred method, the first step is to attack limestone with phosphoric acid at a temperature of from 20 to 25° C. to make a brushite type structure. At the end of the addition of acid, the second step is initiated by heating the mixture up to at least 50° C. A suspension of $Ca(OH)_2$ (such as 25 wt %) is then added to maintain the pH of the suspension at a maximum 8.9. The second step preferably uses an overall Ca/P molar ratio of about 1.67.

The goal of this second step is to convert the brushite type structure created in the first step to a hydroxyapatite structure in the second step.

During the synthesis of apatite structure and more precisely during the second step corresponding to the addition of the hydroxide ions, the pH reaches 8-8.5 to a maximum of 8.9, and this addition becomes more difficult, if not impossible without raising the pH too much. This moment is called "plateau".

The plateau is where the additive is preferably added out at one time, although the addition of additive may be carried out in several increments. However, it is to be understood that the addition of the additive in the (second) alkaline maturation step may be carried out during the same period of time when the hydroxide ions are added (that is to say, before the pH plateau is reached), such as a one-time addition, in several increments, or in a continuous manner.

The additive needs to be present during the hydroxyapatite synthesis but its addition does not have to necessarily take place at the time of the hydroxyapatite synthesis. The additive or a precursor thereof may be added prior to the plateau in the (second) alkaline maturation step, or even before the conversion of the low Ca/P calcium-phosphate compound (such as brushite of Ca/P=1), either used as a source of calcium and phosphate in the 1-step process or formed in the first step in the 2-step process, to the hydroxyapatite structure formed in the (second) alkaline maturation step. For example, the additive or a precursor thereof may be added before the addition of the hydroxide ions is initiated in the (second) alkaline maturation step. The additive or a precursor thereof may be added even during the first step, particularly if the additive or precursor thereof is compatible with the pH condition of the first step, which is generally less than 7, or less than 6.5, or even less than 6. "Compatible" here means that the additive or precursor thereof added in the first step is not degraded/reacted or otherwise rendered ineffective as an additive for making a hydroxyapatite composite in the (second) alkaline maturation step.

The suspension (B) or (B') may be left to cool for 1 to 24 hours, preferably at least 10 hours, down to ambient temperature (generally 20-25° C.). This makes it possible to mature the composite and to reduce the residues of MCP/DCP or brushite, or of octacalcium (e.g., precipitated during the first step), into hydroxyapatite and into calcium phosphate and calcium hydroxide complexes, within the suspension (B) or (B').

In preferred embodiments, the process of making the hydroxyapatite composite does not comprise an in-situ polymerization of at least one polymer during the synthesis of the hydroxyapatite composite. It is preferred that the hydroxyapatite composite does not contain an organic polymer crosslinked network, for example created by polyvinyl alcohol.

When two or more additives are used in the making of the hydroxyapatite composite, the two or more additives may be added at the same time. Or two or more additives may be added at different times during the hydroxyapatite synthesis. Preferably two or more additives are added at the beginning or during the (second) alkaline maturation step.

Optionally, in the process of making the composite according to the present invention, at the end of the (second) alkaline maturation step, the suspension (B) or (B') comprises an aqueous solution (C) and composite particles, and in a third step, a portion of the aqueous solution (C) is separated from the suspension (B) or (B') in order to obtain an aqueous suspension (D) comprising at least 18% and at most 50% of composite particles, or in order to obtain a wet solid (D') comprising at least 50% and at most 80% of composite particles, or a pulverulent solid (D") comprising at least 80% and at most 95% of composite particles and at least 5% and at most 20% of water.

In a third step, the separation may comprise a dewatering step which increases the solids content. The separation may comprise for example a filter, such as a filter press. This type of separation may provide an aqueous suspension (D) or a wet solid (D') of higher solids content than the suspension (B) or (B') taken out of the reactor.

In some embodiments, the method for making the hydroxyapatite composite particles may further comprise drying the suspension (B) or aqueous suspension (D) or wet solid (D') at a temperature between 50 to 180° C., preferably from 80 to 130° C., or more preferably from 90 to 120° C., most preferably from 95 to 115° C.

Drying may comprise any suitable technique suitable for decreasing the water content of the suspension (B) or (B') or aqueous suspension (D) or wet solid (D'), such as, but not limited to, spray drying, flash drying, and/or drying in a fluidized bed.

In some embodiments, the method for making the hydroxyapatite composite particles may comprise spray drying the suspension (B) or (B') or aqueous suspension (D) to provide a pulverulent solid (D").

Consequently, the present invention also relates to an aqueous suspension (D) comprising at least 25%, preferably at least 40% and at most 50% of composite particles obtained by the present method, or to a wet solid (D') comprising at least 50% and at most 80% of composite particles obtained by the present method, or a pulverulent solid (D") comprising at least 70%, preferably at least 80%, and at most 95% of composite particles obtained by the present process and at least 5% and at most 20% of water.

The composite obtained according to the present invention is effective for treating substances contaminated by metallic and/or non-metallic elements, for example in the form of cations and/or oxyanions, in particular contaminated by Hg or its cation, As, Se, and/or B or their respective oxyanions.

Adsorbent

Consequently another embodiment of the present invention relates to an adsorbent material for removal of contaminants from a water or gas effluent, comprising:
  one hydroxyapatite composite;
  two or more hydroxyapatite composites, wherein the additives in the hydroxyapatite composites are different; preferably wherein at least one of the additives comprises an activated carbon or blend of two or more activated carbons, or iron in the form of metal, salt, oxyhydroxide, or oxide; or
  a blend of a hydroxyapatite without additive and at least one hydroxyapatite composite.

Use of Hydroxyapatite Composite or Sorbent

The present invention also relates to the use of the hydroxyapatite composite or the adsorbent material comprising at least one hydroxyapatite composite for removing at least a portion of one or more contaminants, for example in the form of metals, non-metals, their cations and/or oxyanions, particularly metallic contaminants such as Hg or its cation, and non-metallic contaminants such as As, B, and/or Se, or their respective oxyanions, from a substance, such as water or gas effluent.

The present invention also relates to a method for treating a substance to be treated such as water or gas effluent or for removing at least a portion of one or more contaminants from a substance to be treated, for example contaminants in the form of metals, non-metals, their cations and/or oxyanions, particularly Hg or its cation, As, B, and/or Se, or their respective oxyanions, comprising contacting the hydroxyapatite composite or the adsorbent material comprising at least one hydroxyapatite composite with the substance to be treated.

The present invention also relates to a method for removing at least a portion of Hg (in the form of cation) from a water or gas effluent, in which the hydroxyapatite composite or the adsorbent material comprising at least one hydroxyapatite composite contacts the water or gas effluent to remove at least a portion of Hg. In preferred embodiments, the composite comprises at least one activated carbon, chitosan, hopcalite, sulfur, at least one iron in the form of $Fe^0$, iron(III) hydroxide and/or iron(III) oxyhydroxide, or combination thereof; preferably comprises at least one activated carbon, S, at least one iron in the form of $Fe^0$, iron(III) hydroxide and/or iron(III) oxyhydroxide, or combination thereof; more preferably comprises at least one activated carbon, an activated carbon+$S^0$, $Fe^0$, $S^0$+$Fe^0$, iron(III) hydroxide, iron(III) oxyhydroxide (FeOOH), or combination thereof.

The present invention also relates to a method for removing at least a portion of selenium oxyanions from a water effluent, in which the hydroxyapatite composite or the adsorbent material comprising at least one hydroxyapatite composite contacts the water effluent to remove at least a portion of selenium oxyanions. In preferred embodiments the composite comprises activated carbon, iron in the form of $Fe^0$, $S^0$+$Fe^0$, iron(III) hydroxide and/or iron(III) oxyhydroxide, or combination thereof.

The present invention also relates to a method for removing at least a portion of borate ions from a water effluent, in which the hydroxyapatite composite or the adsorbent material comprising at least one hydroxyapatite composite contacts the water effluent to remove at least a portion of borate. In preferred embodiments, the composite comprises at least one activated carbon.

The present invention also relates to a method for removing at least a portion of As oxyanions from a water effluent, in which the hydroxyapatite composite or the adsorbent material comprising at least one hydroxyapatite composite contacts the water effluent to remove at least a portion of As oxyanions. In preferred embodiments, the composite comprises at least one iron in the form of $Fe^0$, iron(III) hydroxide and/or iron(III) oxyhydroxide, or $S^0$+$Fe^0$.

The present invention also relates to a process for purifying a substance contaminated by metallic and/or non-metallic contaminants, for example in the form of metals, non-metals, their cations and/or oxyanions, according to which the substance is brought into contact with the hydroxyapatite composite of the present invention, whether it be in the form of the suspension (D) or the wet solid (D') or the pulverulent solid (D"), in order that at least a portion of the contaminants is adsorbed by the composite.

In the purification or removal process according to the invention, the contaminated substance or effluent may be a flue gas containing metallic and/or non-metallic contaminants such as Al, Ag, As, Ba, Be, Bi, Ce, Co, Cd, Cu, Cr, Fe, Hf, Hg, La, Li, Mg, Mn, Mo, Ni, Pb, Pd, Rb, Sb, Se, Sn, Sr, Th, Ti, U, V, Y, Zn, and/or Zr, preferably Cd, Pb, Zn, Hg, Se, and/or As and according to which the hydroxyapatite composite or an adsorbent comprising at least one hydroxyapatite composite, whether it be in the form of the aqueous suspension (D) or the wet solid (D') or the pulverulent solid (D"), is dispersed in the flue gases, the flue gases being at a temperature of at least 100° C., or of at least 120° C., or of at least 150° C., and preferably not more than 1100° C., or of at most 300° C., of at most 250° C., or of at most 200° C., the resulting mixture then being subjected to a separation in order to obtain a resulting solid and a flue gas partially purified of metallic and/or non-metallic elements.

In the purification or removal process according to the invention, the contaminated substance or effluent may be a liquid effluent containing metallic contaminants, such as: Al, Ag, Ba, Be, Ce, Co, Cd, Cu, Cr, Fe, Hg, La, Li, Mo, Ni, Pb, Pd, Rb, Sb, Sn, Th, Ti, U, V, Y, Zn and/or non-metallic elements such as As, B, F, Se, whether these elements may be in the form of cations and/or anions, such as oxyanions, according to which the hydroxyapatite composite or an adsorbent material comprising the hydroxyapatite composite (preferably in suspension form) is mixed into the liquid effluent for a sufficient time so that the hydroxyapatite composite adsorbs at least a portion of the metallic and/or non-metallic contaminants and the mixture is subjected to a clarification in order to produce a liquid partially purified of metallic and/or non-metallic contaminants, on the one hand, and the composite loaded with metallic and/or non-metallic elements that is removed from the mixture. Preferably, the composite is used with the liquid effluent in a contact reactor, such as a sludge blanket reactor or a fluidized bed. The contact time between the composite and the liquid effluent is in general at least one minute, advantageously at least 15 minutes, more advantageously at least 30 minutes, even more advantageously at least one hour. In one particularly advantageous embodiment of the invention, the liquid effluent is introduced into a sludge blanket contact reactor in which the composite is present at a weight concentration of at least 0.5% by weight and in general at most 10% by weight; a liquid is recovered as overflow from the sludge blanket reactor; a flocculant is added to the recovered liquid in order to form a mixture comprising particles of the hydroxyapatite composite entrained out of the contact reactor and flocculated; said mixture is then introduced into a settling tank where the mixture is separated into:

the liquid partially purified of metallic elements and/or of non-metallic elements, and said liquid is recovered as overflow from the settling tank, and into an underflow from the settling tank comprising flocculated and settled particles of composite recovered as underflow from the settling tank; and at least one portion of the underflow from the settling tank containing flocculated and settled particles of composite is recycled to the sludge blanket contact reactor. The effectiveness of the treatment of metallic elements and/or non-metallic elements may be monitored by comparing the concentrations of the elements upstream (in the liquid effluent) and downstream of the treatment (in the partially treated liquid), for example by an automatic analyser or by sampling and analysis. The composite charge of the contact reactor is in general regularly renewed in portions. For example, by partial purging of the composite loaded with metallic and/or non-metallic elements at the underflow from the settling tank, and by adding fresh composite to the contact reactor. Such a process thus ensures a "chemical polishing" of the liquid effluents. The process is particularly advantageous in the case where the liquid partially purified of metallic elements and/or non-metallic elements is then treated in a biological treatment plant producing sewage sludges. This makes it possible to reduce the concentrations of such elements of said sewage sludges and to reutilize them, for example in agriculture or in land development.

In the purification process according to the invention, the contaminated substance may be a solid residue or a soil contaminated by metallic elements such as Al, Ag, Ba, Be, Ce, Co, Cd, Cu, Cr, Fe, Hg, La, Li, Mo, Ni, Pb, Pd, Rb, Sb, Sn, Th, Ti, U, V, Y, Zn and/or non-metallic elements such as As, B, F, Se, according to which the composite or the adsorbent material comprising the composite (for example in the form of the aqueous suspension (D) or the wet solid (D') or the pulverulent solid (D") of the composite) is injected into the solid residue or the soil in the vicinity of the metallic and/or non-metallic elements for a sufficient contact time so that the composite adsorbs at least a portion of the metallic and/or non-metallic elements.

In particular the present invention relates to the following embodiments:

ITEM 1. A hydroxyapatite composite which comprises:
    a hydroxyapatite; and
    at least one additive which is present during synthesis of the hydroxyapatite.

ITEM 2. The hydroxyapatite composite according to ITEM 1, wherein at least one additive increases the porosity of the hydroxyapatite, preferably so that the hydroxyapatite composite has a higher total pore volume and/or has a higher BET surface area than a hydroxyapatite material made without the additive.

ITEM 3. The hydroxyapatite composite according to any of the preceding ITEMS, wherein the at least one additive which is present during synthesis of the hydroxyapatite is added before the synthesis of the hydroxyapatite is initiated or during the synthesis of the hydroxyapatite.

ITEM 4. The hydroxyapatite composite according to any of the preceding ITEMS, comprising a weight ratio of hydroxyapatite to additive (HAP:A) of from 1:0.01 to 1:0.5, preferably from 1:0.02 to 1:0.4 or from 1:0.03 to 1:0.4, more preferably from 1:0.04 to 1:0.3, yet more preferably from 1:0.05 to 1:0.25, yet even more preferably from 1:0.05 to 1:0.20; or comprising at least 2 wt %, or at least 4 wt %, of the additive based on the total weight of dry matter and/or at most 50 wt %, or at most 40 wt %, or at most 30 wt %, or at most 20 wt % of the additive based on the total weight of dry matter.

ITEM 5. The hydroxyapatite composite according to any of the preceding ITEMS, comprising at least 50 wt % hydroxyapatite, advantageously at least 60 wt % and more advantageously still at least 70 wt % hydroxyapatite or at least 75 wt % hydroxyapatite based on the total weight of dry matter.

ITEM 6. The hydroxyapatite composite according to any of the preceding ITEMS, comprising, based on the total weight of dry matter:
    water, of the order of from 1 wt % to 20 wt %, advantageously from 2 wt % to 20 wt %.

ITEM 7. The hydroxyapatite composite according to any of the preceding ITEMS, comprising, based on the total weight of dry matter:
    calcium carbonate in an amount of less than 20 wt % and more than 0 wt %, preferably from 1 wt % to 19 wt %, more preferably from 2 wt % to 18 wt %, based on the total weight of dry matter.

ITEM 8. The hydroxyapatite composite according to any of the preceding ITEMS, comprising, based on the total weight of dry matter:
    less than 1 wt % of calcium dihydroxide $Ca(OH)_2$, preferably less than 0.5 wt % calcium dihydroxide, more preferably less than 0.3 wt % calcium dihydroxide, even more preferably less than 0.2 wt % calcium dihydroxide, or even less than 0.1 wt % $Ca(OH)_2$).

ITEM 9. The hydroxyapatite composite according to any of the preceding ITEMS, wherein the hydroxyapatite is a calcium-deficient hydroxyapatite, preferably with a Ca/P molar ratio more than 1.5 and less than 1.67, more preferably with a Ca/P molar ratio more than 1.54 and less than 1.65.

ITEM 10. The hydroxyapatite composite according to any of the preceding ITEMS, wherein the at least one additive in the composite is embedded or incorporated into the hydroxyapatite or coated onto the hydroxyapatite.

ITEM 11. The hydroxyapatite composite according to any of the preceding ITEMS, wherein the additive or the hydroxyapatite composite excludes a polymer, such as excludes chitosan and/or polyvinyl alcohol.

ITEM 12. The hydroxyapatite composite according to any of the preceding ITEMS, wherein the additive or the hydroxyapatite composite excludes activated carbon.

ITEM 13. The hydroxyapatite composite according to any of the preceding ITEMS, being inorganic.

ITEM 14. The hydroxyapatite composite according to any of the ITEMS 1-10, wherein the at least one additive comprises at least one activated carbon; chitosan; hopcalite; clays (e.g., bentonite); zeolites; sulfur; a metal in the form of metal of oxidation state 0, salt, oxide, oxyhydroxide, or hydroxide being selected from the group consisting of aluminium, tin, a transition metal selected from Groups 3-12 of the June 2016 IUPAC Periodic Table of Elements, and mixtures thereof; or combinations of two or more thereof; the metal in the form of metal of oxidation state 0, salt, oxide, oxyhydroxide, or hydroxide being preferably selected from the group consisting of aluminium, tin, iron, titanium, nickel, copper, zinc, zirconium, lanthanum, cerium, and mixtures thereof: the metal in the form of metal of oxidation state 0, salt, oxide, oxyhydroxide, or hydroxide being more preferably selected from the group consisting of aluminium, tin, iron, nickel, copper, zinc, lanthanum, cerium, and mixtures thereof; or wherein the at least one additive comprises activated carbon, chitosan, hopcalite, iron in the form of metal, salt, oxide, oxyhydroxide, or hydroxide, or combinations of two or more thereof; or wherein the at least one additive comprises chitosan, hopcalite, iron in the form of metal, salt, oxide, oxyhydroxide, or hydroxide, or combinations of two or more thereof; or wherein the at least one additive comprises activated carbon, hopcalite, iron in the form of metal, salt, oxide, oxyhydroxide, or hydroxide, preferably in the form oxyhydroxide, or hydroxide, or combinations of two or more thereof; or wherein the at least one additive comprises at least one activated carbon, sulfur, iron in the form of zero-valent metal, oxide, oxyhydroxide, or hydroxide, or combinations of two or more thereof, preferably comprises at least one activated carbon, sulfur, iron in the form of metal and/or hydroxide, or combinations of two or more thereof, more preferably comprises at least sulfur and iron in the form of metal and/or hydroxide.

ITEM 15. The hydroxyapatite composite according to any of the ITEMS 1-10, wherein the at least one additive comprises iron in the form of metal, salt, oxide or hydroxide, or combinations of two or more thereof, preferably wherein the iron in the additive is in the oxidation state 0, 2 or 3.

ITEM 16. The hydroxyapatite composite according to any of the ITEMS 1-10, wherein the additive comprises an activated carbon or blend of two or more activated carbons, wherein said activated carbon or blend of two or more activated carbons is selected when a 0.3 wt % dispersion in deionized water provides a pH of 5 or more.

ITEM 17. The hydroxyapatite composite according to any of the preceding ITEMS, being in the form of particles, and further having at least one of the following:
having a mean size of at least 20 µm, or at least 25 µm, or at least 30 µm; and/or
having a specific surface area of at least 120 m²/g, or at least 130 m²/g, or at least 140 m/g; and/or
having a total pore volume of at least 0.3 cm³/g, or at least 0.32 cm³/g, or at least 0.4 cm³/g.

ITEM 18. The hydroxyapatite composite according to any of the preceding ITEMS, being in the form of particles
having a mean particle size of at least 20 µm and at most 60 µm, preferably at least 25 µm and at most 60 µm, more preferably at least 30 µm and at most 60 µm.

ITEM 19. The hydroxyapatite composite according to any of the preceding ITEMS, wherein the hydroxyapatite composite does not contain an organic polymer crosslinked network, for example created by in-situ polymerization of at least one polymer during the synthesis of the hydroxyapatite composite.

ITEM 20. Process for producing a hydroxyapatite composite of any of the ITEMS 1-19, according to which:
in a first step, a source of calcium and a source of phosphate ions are mixed in water in a molar ratio that is adjusted to obtain a Ca/P molar ratio of between 0.5 and 1.6, preferably between 0.7 and 1.3, and reacting the source of calcium with the phosphate ions at a pH of between 2 and 8, in order to obtain a suspension (A) of calcium phosphate,
in a second step, adding to the suspension (A) an alkaline compound comprising hydroxide ions in order to set a pH of at least 7.5, preferably at least 8, or at least 8.5, or at least 9, or of at least 10; further adding an additional source of calcium in order to obtain a suspension (B) of composite having a Ca/P molar ratio of greater than 1.6, preferably greater than 1.65 to form a hydroxyapatite structure; and
further adding at least one additive or a precursor thereof in the first step, in the second step, or in both in the first and second steps preferably in the second step.

ITEM 21. Process for producing a hydroxyapatite composite of any of the ITEMS 1-19, according to which:
in a first step, mixing a source of calcium and a source of phosphate ions in water, in a molar ratio adjusted to obtain a Ca/P molar ratio of between 0.5 and 1.6, and reacting the source of calcium with the phosphate ions at a pH of between 2 and 8, to obtain a suspension (A) of calcium phosphate, and
in a second step, adding to the suspension (A) an alkaline compound comprising hydroxide ions to set a pH of at least 7.5, preferably at least 8, or at least 8.5, or at least 9, adding an additional source of calcium and adding the additive or a precursor thereof in order to obtain a suspension (B) of the hydroxyapatite composite.

ITEM 22. Process for producing a hydroxyapatite composite of any of the ITEMS 1-19, according to which:
in a first step, a source of calcium and a source of phosphate ions are mixed in water in a molar ratio that is adjusted to obtain a Ca/P molar ratio of between 0.5 and 1.6, preferably between 0.7 and 1.3, and reacting the source of calcium with the phosphate ions at a pH of between 2 and 8, in order to obtain a suspension (A) of calcium phosphate,
further adding at least one additive or a precursor thereof in the first step, such as at the beginning of the first step before the reaction takes place, during the reaction, or after the reaction is completed in the first step (this being preferred);

in a second step, adding to the suspension (A) an alkaline compound comprising hydroxide ions in order to set a pH of at least 7.5, preferably at least 8, or at least 8.5, or at least 9, or of at least 10; further adding an additional source of calcium in order to obtain a suspension (B) of composite having a Ca/P molar ratio of greater than 1.6, preferably greater than 1.65, to form a composite material comprising a hydroxyapatite structure ITEM 23. Process for producing a hydroxyapatite composite of ITEM 20, according to which:

when the additive or precursor thereof is added in the first step, it is added at the beginning of the first step before the reaction between the source of calcium and the phosphate ions takes place, during the reaction, or after the reaction is completed in the first step (this being preferred).

ITEM 24. Process for producing a hydroxyapatite composite of ITEM 20 or 22, according to which:

when the additive or precursor thereof added in the first step includes activated carbon and/or chloride salts of metals (such as aluminium, tin, or a transition metal of groups 3-12 of the June 2016 IUPAC Periodic Table, preferably iron, titanium, nickel, copper, zinc, zirconium, lanthanum, and/or cerium).

ITEM 25. Process according to any of the ITEMS 20 to 24, wherein the source of calcium comprises calcium carbonate.

ITEM 26. Process according to any of the ITEMS 20 to 25, wherein the source of phosphate ions comprises phosphoric acid.

ITEM 27. Process according to any of the ITEMS 20 to 26, wherein in the second step, the alkaline compound used that comprises hydroxide ions is sodium hydroxide and/or calcium hydroxide.

ITEM 28. Process according to any of the ITEMS 20 to 27, wherein the stirring and the density of suspension, in the second step and advantageously also in the first step, are adjusted in order to avoid the appearance of a calcium phosphate gel having a viscosity of at least 200 cps.

ITEM 29. Process according to any of ITEMS 20-28 wherein the first step is carried out at a temperature of less than 40° C., preferably less than 35° C. and wherein the second step is carried out at a temperature of at least 40° C., preferably of at least 45° C., more preferably of at least 50° C.

ITEM 30. Process according to any of ITEMS 20-29 characterized in that it does not comprise an in-situ polymerization of at least one polymer during the synthesis of the hydroxyapatite composite.

ITEM 31. Process according to any of ITEMS 20-30 characterized in that the hydroxyapatite composite does not contain an organic polymer crosslinked network, for example created by polyvinyl alcohol.

ITEM 32. Process for producing a hydroxyapatite composite of any of the ITEMS 1-19, comprising the following steps:

forming an aqueous suspension comprising particles of a calcium phosphate compound having a Ca/P molar ratio of 1.5 or less, preferably between 0.50 and 1.35, more preferably comprising particles containing brushite, yet more preferably particles containing >70 wt % brushite, most preferably particles containing >90 wt % brushite;

adding an alkaline compound comprising calcium and hydroxide ions in order to increase the pH of the suspension to a value of at least 6.5, preferably at least 7, or at least 7.5, or at least 8, or of at most 10 in order to obtain a suspension (B') having a Ca/P molar ratio of greater than 1.6, preferably greater than 1.65, and/or less than 1.75; and further adding at least one additive or a precursor thereof to the suspension (B') before, during or after the addition of the alkaline compound, preferably before or during the addition of the alkaline compound, to form the hydroxyapatite composite, wherein said suspension (B') contains from 10 to 35 wt % solids, preferably from 15 to 25 wt % solids.

ITEM 33. Process according to ITEM 32 characterized in that the alkaline compound comprises calcium hydroxide.

ITEM 34. Process according to ITEM 32 or 33, characterized in that the stirring and the density of suspension (B') are adjusted in order to avoid the appearance of a calcium phosphate gel having a viscosity of at least 200 cps.

ITEM 35. Process according to any of ITEMS 32-34 characterized in that the step of addition of the alkaline compound comprising calcium and hydroxide ions is carried out at a temperature of more than 40° C., or of at least 45° C., or of at least 50° C., and/or at most 90° C.

ITEM 36. Process according to any of ITEMS 32-35 characterized in that it does not comprise an in-situ polymerization of at least one polymer during the synthesis of the hydroxyapatite composite, ITEM 37. Process according to any of ITEMS 32-36 characterized in that the hydroxyapatite composite does not contain an organic polymer crosslinked network, for example created by polyvinyl alcohol.

ITEM 38. An adsorbent material for removal of contaminants from an effluent, such as water or gas effluent, comprising:

an hydroxyapatite composite according to any of ITEMS 1-19.

ITEM 39. An adsorbent material for removal of contaminants from an effluent, such as water or gas effluent, comprising:

two or more hydroxyapatite composites according to Claims 1-19, wherein the additives in the hydroxyapatite composites are different; preferably wherein at least one of the additives comprises an activated carbon or blend of two or more activated carbons.

ITEM 40. An adsorbent material for removal of contaminants from an effluent, such as water or gas effluent, comprising:

a blend of a hydroxyapatite without additive and at least one hydroxyapatite composite according to any of Claims 1-19.

ITEM 41. Use of the hydroxyapatite composite of any of the ITEMS 1-19 or of the adsorbent material of any of ITEMS 38-40 for purifying a substance comprising one or more contaminants such as a water or gas effluent, or for removing at least a portion of one or more contaminants from a water or gas effluent, preferably from a water effluent, particularly removing cations such as Hg cations, and/or oxyanions such as those of Se, As and/or B from a water effluent, comprising contacting the hydroxyapatite composite with the substance or effluent to remove at least a portion of the one or more contaminants.

ITEM 42. Use of the hydroxyapatite composite of any of the ITEMS 1-19 or of the adsorbent material of any of ITEMS 38-40 for removing at least a portion of Hg from a gas or water effluent, particularly Hg cations from a water effluent, wherein the hydroxyapatite composite comprises at least one activated carbon, chitosan, hopcalite, sulfur, at least one iron in the form of $Fe^0$, iron(III) hydroxide and/or iron(III) oxyhydroxide, or combination thereof; preferably comprises at least one activated carbon, at least one iron in the form of $Fe^0$, iron(III) hydroxide and/or iron(III) oxyhydroxide, or combination thereof; more preferably comprises at least one activated carbon, activated carbon+$S^0$, $Fe^0$, iron(III) oxyhydroxide (FeOOH), $Fe^0$+$S^0$, or combination thereof.

ITEM 43. Use of the hydroxyapatite composite of any of the ITEMS 1-19 or of the adsorbent material of any of ITEMS 38-40 for removing at least a portion of selenium oxyanions from a water effluent, wherein the hydroxyapatite composite comprises activated carbon, activated carbon+$S^0$, $Fe^0$, $Fe^0$+$S^0$, iron in the form of iron(III) hydroxide and/or iron(III) oxyhydroxide, or combination thereof.

ITEM 44. Use of the hydroxyapatite composite of any of the ITEMS 1-19 or of the adsorbent material of any of ITEMS 38-40 for removing at least a portion of boron ions such as borate from a water effluent, wherein the hydroxyapatite composite comprises at least one activated carbon, or combination thereof.

ITEM 45. Use of the hydroxyapatite composite of any of the ITEMS 1-19 or of the adsorbent material of any of ITEMS 38-40 for removing at least a portion of As oxyanions from a water effluent, wherein the hydroxyapatite composite comprises at least one iron in the form of $Fe^0$, iron(III) hydroxide and/or iron(III) oxyhydroxide, or $Fe^0$+$S^0$.

ITEM 46. A method for purifying a substance comprising one or more contaminants such as a water or gas effluent, or for removing at least a portion of one or more contaminants from a water or gas effluent, preferably from a water effluent, particularly for removing cations such as Hg cations, and/or oxyanions such as those of Se, As and/or B from a water effluent, the method comprising contacting the hydroxyapatite composite of any of the ITEMS 1-19 or the adsorbent material of any of ITEMS 38-40 with the substance or effluent to remove at least a portion of the one or more contaminants.

EXAMPLES

The examples, the description of which follows, serve to illustrate the invention.

In these examples the pH measurements were made using a WTW Sentix 41 electrode (pH 0-14, temperature: 0° C.-80° C.), a pH meter WTW pH3110. The calibration of the equipment was made using three buffer solutions: at pH 4.0 (batch Dulco test-0032) Prominent, a WTW pH 7.0 (WTW D-82362) and at pH 10.01 Hach (cat 27702). Note: If multiple sample measurements were to be made with the same electrode, the electrode was rinsed with deionized water between each measurement.

The measurement of the residual water was performed using an infrared analyser Ref. MA150C from Sartorius. For this, 1.0 to 2.0 g of sample are dried at 105° C. till a constant weight is obtained during at least 5 minutes.

The particle size measurement was carried out on a Beckman Coulter LS 230 laser diffraction particle size analyser (laser of wavelength 750 nm) on particles suspended in water and using a size distribution calculation based on Fraunhofer diffraction theory (particles greater than 10 μm) and on Mie scattering theory (particles less than 10 μm), the particles being considered to be spherical.

The BET specific surface area was determined by gas adsorption on a Micromeritics ASAP2020 machine. Before the analysis, the samples (0.7 to 1 g) are pretreated under vacuum at 250° C. until a stable vacuum of 4-5 μbar has been achieved. The measurements were carried out using nitrogen as adsorbent gas at 77° K via the volumetric method, according to the ISO 9277: 2010 standard (Determination of the specific surface area of solids by gas adsorption—BET method). The BET specific surface area was calculated in a relative pressure (P/PO) range varying from around 0.05 to 0.20.

Example 1 (not in Accordance with the Invention)

Hydroxyapatite Material (without Additive)

1a. 2-Step Preparation of Hydroxyapatite Material (without Additive) from Calcium Carbonate, Phosphoric Acid and Calcium Hydroxide In this example, a hydroxyapatite material HAP1 was made under similar conditions as those described in example 1b of WO2015/173437 patent application. The process used two steps as illustrated in FIG. 1, except that the additive is not added in this synthesis. In the first step, limestone was dispersed in water at 20-25° C. in a 3-liter reactor (with baffles). Then $H_3PO_4$ (75%) was added to this suspension and the mixture was stirred at 400 rpm using a 4-blade impeller. The first step used an overall Ca/P molar ratio of about 1. The goal of this first step was to attack the limestone to make a brushite type structure. At the end of the addition of acid, the second step was initiated by heating the mixture up to about 50° C. A 25 wt % suspension of $Ca(OH)_2$ was then added to maintain the pH of the suspension at a maximum 8.9. The second step used an overall Ca/P molar ratio of about 1.67. The goal of this second step was to convert the brushite type structure created in the first step to a hydroxyapatite structure in the second step. The reaction time was 120 minutes (2.0 hrs). After the reaction time, the suspension was continually stirred at half the stirring speed than was used in the first step to allow it to cool down to 20-25° C.

The final solid content in aqueous suspension was 18% by weight (solid weight reported to total weight of the aqueous suspension).

Another hydroxyapatite sample HAP2 (without additive) was made similarly to the sample HAP1, except in a baffled 5-L reactor with a rotation speed of 700 rpm. The temperature of the second step was 50° C.

Another hydroxyapatite sample HAP3 (without additive) was made similarly to the sample HAP1, except in a baffled 200-L reactor with a rotation speed using 15 Hz. The temperature of the second step was 50° C.

1b. Porosity and Particle Size after Drying of the Hydroxyapatite Material (without Additive)

The porosity characteristics were determined after a heat treatment at 110° C. under vacuum overnight (about 16 hours). The BET specific surface area was determined by gas adsorption on a Micromeritics ASAP2020 machine. Before the analysis, the samples (0.7 to 1 g) are pretreated under vacuum at 110° C. until a stable vacuum of 4-5 μbar has been achieved. The measurements were carried out using nitrogen as adsorbent gas at 77° K via the volumetric method, according to the ISO 9277: 2010 standard (Determination of the specific surface area of solids by gas adsorption—BET method). The BET specific surface area was calculated in a relative pressure (P/PO) range varying from around 0.05 to 0.20.

The mean particles size D50 was also measured. The mean diameter D50 is the diameter such that 50% by weight of the particles have a diameter less than said value. The particle size measurement was carried out on a Beckman Coulter LS 230 laser diffraction particle size analyser (laser of wavelength 750 nm) on particles suspended in water and using a size distribution calculation based on Fraunhofer diffraction theory (particles greater than 10 μm) and on Mie scattering theory (particles less than 10 μm), the particles being considered to be spherical.

The results can be found in TABLE 2.

TABLE 2

| Ref. No. | solid suspension wt % | Temp. $2^{nd}$ step | Reactor | Particle size D50 μm | Pore Volume cm³/g | $S_{BET}$ m²/g |
|---|---|---|---|---|---|---|
| HAP1 | 18 | 50° C. | 3-L; 400 rpm | 41.5 | 0.39 | 116 |
| HAP2 | 18 | 50° C. | 5-L; 700 rpm | 41.4 | 0.39 | 118 |
| HAP3 | 18 | 50° C. | 200-L | 25.8 | 0.45 | 140 |

Figure 3:
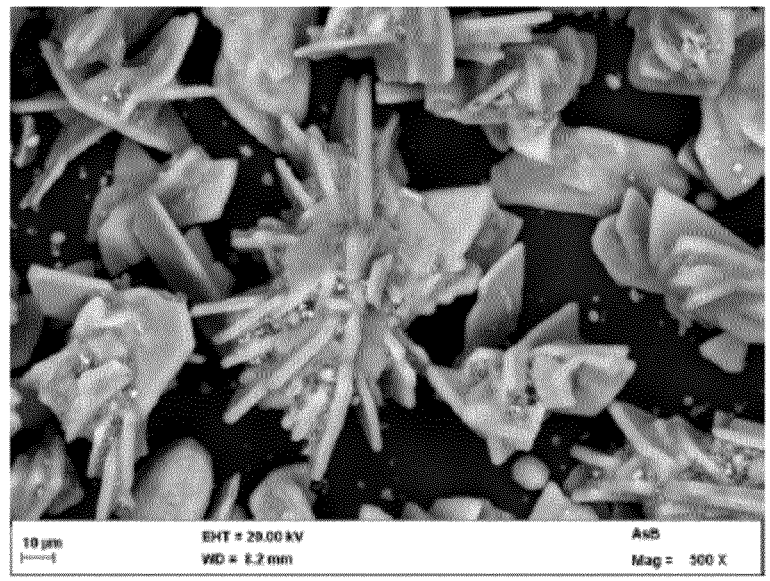
FIG. 3 is a scanning electron microscope (SEM) picture at magnification of 500 of a particulate hydroxyapatite made according to the same method used for making the hydroxyapatite composite according to the present invention, except that no additive is added during the hydroxyapatite synthesis (not according to the invention).
Figure 5:
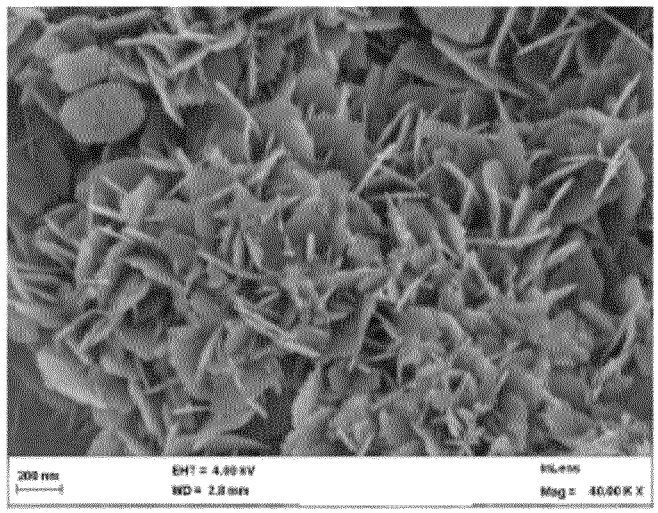
FIG. 5 is a scanning electron microscope (SEM) picture at magnification of 40,000 of a particulate hydroxyapatite made without additive added during the hydroxyapatite synthesis showing the surface of particles covered with plate-like crystallites (not according to the invention).

Pictures on SEM microscope, given on FIG. 3 (500×) & FIG. 5 (40,000×), show that the obtained particles (example 1) without additive are covered with plate-like crystallites.

Example 2 (in Accordance with the Invention)

Hydroxyapatite Composite with Activated Carbon Made from Calcium Carbonate, Phosphoric Acid and Calcium Hydroxide
2.a Selection of Activated Carbon for Removal of Selenium and Mercury Different activated charcoal powders ("A.C.") have been identified as potential candidates according to different origins and suppliers (see TABLE 3).

TABLE 3

| Vendor | Product Name for A.C. | Form of A.C | pH of a 0.3 wt % A.C. in deionized water |
|---|---|---|---|
| Chemviron carbon | Pulsorb FG4 | Fine powder | 10.1 |
| Chemviron carbon | Pulsorb C | Fine powder | 7.2 |
| Cabot | Norit ® GLZ 50 | Fine powder | 4.7 |
| Powder Technology Inc | Milled Classified coarse | Fine powder | 3.4 |
| Powder Technology Inc | Anticromos ® | Very fine powder | 9 |
| Desotec | Organosorb ® 200-1 | Fine powder | 6.5 |
| Desotec | Organosorb ® 20 | Fine powder | 8.9 |
| Nucon International | Mersorb ® | Pellet | 4.5 |

The activated carbons were all powdered (for ease and feasibility of production) from different companies. They provided different pH when dispersed at 0.3 wt % in deionized water. These activated carbons were Pulsorb C, Pulsorb FG4, Norit® GLZ50, PTI's Milled Classified coarse (hereinafter "PTI"), Anticromos®, Organosorb® 200-1, Organosorb® 20, and Mersorb®.

The activated carbons were tested for their efficiency in removing selenium, in particular in selenate form, and mercury. The activity of these 6 activated carbons was studied on a synthetic water concentrated in selenium—1.2 ppm selenate (TABLE 4) using 0.5 wt % of the different activated carbons (about 0.15 g in 30 mL of water) with a time of contact of 1 hour.

TABLE 4

Efficiency of various activated carbons in removing selenate

| Matrix | Product Name for A.C. | Remaining content (mg/L) | Activity (%) | Initial pH at t = 0 |
|---|---|---|---|---|
| Synthetic water ($Na_2SeO_4$) 1.2 ppm selenate | Control | 1.2 | | 7.5 |
| | Pulsorb C | 0.01 | 99.1 | 9.68 |
| | Pulsorb FG4 | 0.5 | 58.3 | 10.33 |
| | Norit ® GLZ 50 | 0.61 | 49.2 | 5.43 |
| | "PTI" | 0.002 | 99.8 | 4.18 |
| | Anticromos ® | 0.82 | 31.7 | 9.82 |
| | Organosorb ® 200-1 | 0.66 | 45.0 | 7.45 |

The activity of the various activated carbons was also studied on synthetic water concentrated in mercury—1.2 ppm $HgCl_2$ (TABLE 5) using 0.5 wt % of the different activated carbons (about 0.25 g in 50 mL of water) with a time of contact of 1 hour.

TABLE 5

Efficiency of various activated carbons in removing mercury

| Matrix | Product Name for A.C. | Remaining content (mg/L) | Activity (%) | Initial pH at t = 0 |
|---|---|---|---|---|
| Synthetic water ($HgCl_2$) 1.2 ppm Hg | Control | 1.2 | | 4.98 |
| | Pulsorb C | 0.0006 | >99.9 | 8.7 |
| | Pulsorb FG4 | 0.0001 | >99.9 | 10.32 |
| | Norit ® GLZ 50 | 0.0001 | >99.9 | 6.57 |
| | "PTI" | 0.0006 | >99.9 | 3.58 |
| | Anticromos ® | 0.00027 | >99.9 | 9.73 |
| | Organosorb ® 200-1 | 0.0001 | >99.9 | 7.42 |

The efficacy tests on selenium and mercury in particular (see TABLES 4 & 5) showed that the 6 activated carbons provided excellent results for removal of synthetic mercury. With respect to Se removal from synthetic water, two of the six activated carbons, namely Pulsorb C and Milled classified coarse of the Powder Technology Inc. brand labelled "PTI", were shown to be superior to the other four (especially for selenates). Both of these activated carbons were to make samples of hydroxyapatite composites.

However, due to the relatively acidic pH of the PTI activated carbon, which may have an impact on the apatite structure and the comparatively more advantageous price of Pulsorb C, the choice was made to use the hydroxyapatite composite made with Pulsorb C activated carbon for testing on removal of key elements from several industrial waters.
2.b. Two-Step Synthesis of Hydroxyapatite Composite with Activated Carbon "BHAP" from Calcium Carbonate, Phosphoric Acid and Calcium Hydroxide Some samples of hydroxyapatite composite with activated carbon were made from calcium carbonate, phosphoric acid and calcium hydroxide and using Pulsorb C from Chemviron as the source of activated carbon and labelled "BHAP-C". The proportion of activated carbon in the apatite composite ranged from 5% to 20% by weight.

A sample was made from calcium carbonate, phosphoric acid and calcium hydroxide and using the PTI activated carbon and labelled "BHAP-PTI". The proportion of activated carbon in this apatite composite was 20% by weight.

A sample was made from calcium carbonate, phosphoric acid and calcium hydroxide and using the Mersorb® activated carbon and labelled "BHAP-Mersorb®". The proportion of activated carbon in this apatite composite was 10% by weight.

A sample was made from calcium carbonate, phosphoric acid and calcium hydroxide and using the Organosorb® 20 activated carbon and labelled "BHAP-Organosorb®". The proportion of activated carbon in this apatite composite was 10% by weight.

The preparation of the composite samples with activated carbon (BHAP) was carried out in a similar manner as in the Example 1, except that the activated carbon was added during the synthesis of the hydroxyapatite during the lime addition step ($2^{nd}$ step) after the pH had risen to about 8-9 and after the reaction medium was heated to +/−50° C. This is illustrated in FIG. 1. The activated carbon was added in the form of a powder. Three types of reactors were used: a baffled 3-L reactor with a rotational speed of 400 ppm and 4-blade stirrer; a baffled 5-L reactor with a rotational speed of 700 ppm and with 4-blade stirrer; and a 200-L reactor with two 3-blades stirrers operated at 17 Hz rotational speed. No significant change during the synthesis of the composites (compared to the synthesis as described in Example 1) is noted apart from this addition of activated carbon during the pH plateau in the $2^{nd}$ step.

The solid portion of the suspension in the second step remained the same, at about 18%-24 wt % by weight. The pH used for the making of the composite samples was similar to that of apatite without additive, namely a range between pH 6.5 and 12, and preferred being maintained between 8 and 9. For the BHAP samples, the temperature for the first step was 20° C. and the temperature for the second step was maintained at 50° C.

The synthesis conditions are reported in TABLE 6.

TABLE 6

| Ref. No. | Wt* % A.C. | Temp. $2^{nd}$ step | Reactor | % solids in suspension | End pH | Time $2^{nd}$ step (hr) |
|---|---|---|---|---|---|---|
| BHAP-C5 | 5 | 50° C. | 3-L; 400 rpm | 19% | 8.6 | 2 h 15 |
| BHAP-C20 | 20 | 50° C. | 3-L; 400 rpm | 23% | 7.7 | 2 h 13 |
| BHAP-C16.7 | 16.7 | 50° C. | 5-L; 700 rpm | 21% | 8.9 | 2 h 50 |
| BHAP-C15 | 15 | 50° C. | 200-L | 22% | 7.8 | 5 hr 45 |
| BHAP-C10a | 10 | 50° C. | 200-L | 22% | 7.5 | 5 h 20 |
| BHAP-C10b | 10 | 50° C. | 200-L | 22% | 8.9 | 3 h |
| BHAP-C10c | 10 | 50° C. | 200-L | 23.7% | 7.85 | 4 h 10 |
| BHAP-PTI20 | 20 | 50° C. | 5-L; 700 rpm | 23% | 8.5 | 3 h 00 |
| BHAP-Mersorb ® 10 | 10 | 50° C. | 5-L; 700 rpm | 20% | 7.8 | 2 h 37 |
| BHAP-Organosorb ® 10 | 10 | 50° C. | 5-L; 700 rpm | 20% | 8 | 2 h 10 |

*Theorical content of activated carbon in the composite

These BHAP composite samples were analyzed by X-Ray, porosity, and their efficacy for removal of specific elements from water was tested.

2c. Porosity and Particle Size

The porosity characteristics of the BHAP composite samples are reported in TABLE 7, as well as the Pulsorb C, PTI, Mesosorb®, Organosorb® 20 activated carbons and the HAP samples (without additive) for comparison purposes.

TABLE 7

| Ref. No. | Wt* % A.C. | Temp. $2^{nd}$ step | Reactor | Particle size D50 μm | Pore Volume cm³/g | $S_{BET}$ m²/g |
|---|---|---|---|---|---|---|
| HAP1 | 0 | 50° C. | 3-L; 400 rpm | 41.5 | 0.39 | 116 |
| BHAP-C5 | 5 | 50° C. | 3-L; 400 rpm | 35.0 | 0.42 | 144 |

TABLE 7-continued

| Ref. No. | Wt* % A.C. | Temp. $2^{nd}$ step | Reactor | Particle size D50 μm | Pore Volume cm³/g | $S_{BET}$ m²/g |
|---|---|---|---|---|---|---|
| BHAP-C20 | 20 | 50° C. | 3-L; 400 rpm | 41.2 | 0.45 | 283 |
| BHAP-C16.7 | 16.7 | 50° C. | 5-L; 700 rpm | 45.5 | — | 291 |
| BHAP-C15 | 15 | 50° C. | 200-L | 37.8 | 0.33 | 172 |
| BHAP-C10a | 10 | 50° C. | 200-L | 36.8 | 0.32 | 159 |
| BHAP-C10b | 10 | 50° C. | 200-L | 49.2 | 0.42 | 192 |
| BHAP-C10c | 10 | 50° C. | 200-L | 43.8 | 0.43 | 168 |
| HAP2 | 0 | 50° C. | 5-L; 700 rpm | 41.4 | 0.39 | 118 |
| Pulsorb C | 100 | — | — | 39.4 | 0.5 | 929 |
| BHAP-PTI20 | 20 | 50° C. | 5-L; 700 rpm | 58.5 | — | 302 |
| PTI | 100 | — | — | 33.7 | 0.42 | 1103 |
| BHAP-Mersorb ® 10 | 10 | 50° C. | 5-L; 700 rpm | 33.1 | 0.47 | 169 |
| Mersorb ® | 100 | — | — | 421.3 | 0.23 | 516 |
| BHAP-Organosorb ® 10 | 10 | 50° C. | 5-L; 700 rpm | 29.8 | 0.4 | 164 |
| Organosorb ® 20 | 100 | — | — | 126.1 | 0.37 | 839 |

*Theorical content of activated carbon in the BHAP composites

It was noted that the hydroxyapatite composite samples made with activated carbon have a higher pore volume and BET surface area than the hydroxyapatite samples made without additive.

For the size determination, a median of 35 to 49 μm (TABLE 7) and an average of 38 to 48 mare observed for BHAPs made with Pulsorb C activated carbon. These values vary according to the content of activated carbon. It is also noted that with the use of different activated charcoal, i.e., the D50 can reach up to 58 m.

2d. Composition of BHAP Composite

The compositions of some of the BHAP samples were determined via TGA analysis and are reported in TABLE 8.

TABLE 8

| Ref. No. | Wt %** water | Wt %** CaCO3 | Wt %** additive (A.C.) | Wt %** HAP |
|---|---|---|---|---|
| BHAP-C15 | 3.2% | 2.5% | 11.1% | 83.2% |
| BHAP-C10a | 5.1% | 2.1% | 7.3% | 85.5% |
| BHAP-C10b | 5.2% | 2.0% | 7.4% | 85.4% |
| BHAP-C10c | 4.7% | 2.0% | 7.4% | 85.9% |

**actual wt % measured by TGA analysis based on dry matter

2e. Comparison of BHAP Composite Versus Physical Blend of Activated Carbon and HAP (without Additive)

The activated carbon Pulsorb C was added to the composite as explained above during the synthesis of hydroxyapatite. For comparison, a physical blend (Blend) by mixing activated carbon (Pulsorb C) with an already-formed hydroxyapatite (HAP without additive) was made to obtain 5 wt % activated carbon with hydroxyapatite.

Activated charcoal release tests were performed in a plastic container to find out that the activated carbon was well incorporated into the hydroxyapatite structure in the composite sample BHAP-C5 containing 5 wt % activated carbon. The BHAP-C5 was diluted in water and stirred at 10 rpm for 5 hours.

As a control, the same test was also carried out on a synthesized HAP in which a similar proportion of activated carbon (5 wt %) was mixed.

Both suspensions in water had similar pH values: pH=7.1 for the BHAP-C5 composite and pH=7.4 for the blend.

Figure 2:
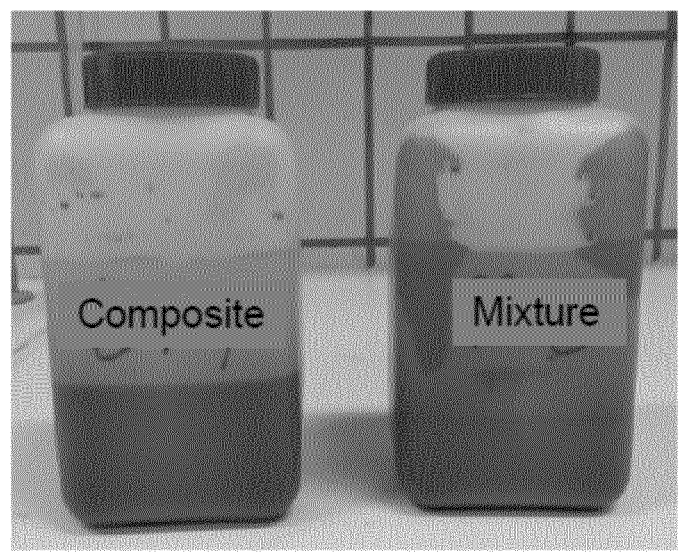
FIG. 2 illustrates the release of activated carbon from a physical mixture of activated carbon and hydroxyapatite particles made without additive (not according to the invention) compared to the hydroxyapatite composite (according to the invention) which showed little release of activated carbon after agitation in deionized water for 5 hours.

FIG. 2 shows a very marked release of activated carbon, bonded to the walls of the container, labelled "mixture", while nothing is noticeable for the container, labelled "Composite".

Additionally, a decantation test was performed in which the two aqueous suspensions were left to decant in a glass beaker. A clear delimitation between water and composite sample BHAP-C5 was observed for a showing of a normal decantation. Unlike the suspension of the composite sample BHAP-C5, the decanting with the suspension made with the blend was very poor due to the release of fine particles of activated carbon in the blend suspension.

This experiment demonstrates to the non-feasibility of synthesis of the composite by simple physical mixing of the additive with the already-formed hydroxyapatite in solid form. This test also shows the advantage of embedding or incorporating the additive (here activated carbon) into the hydroxyapatite during its synthesis. It provides a much more stable material which does not release the additive when in use in an aqueous solution particularly when it is intended to perform as an adsorbent for removal of contaminants from water.

2f. SEM Analysis

Figure 4:
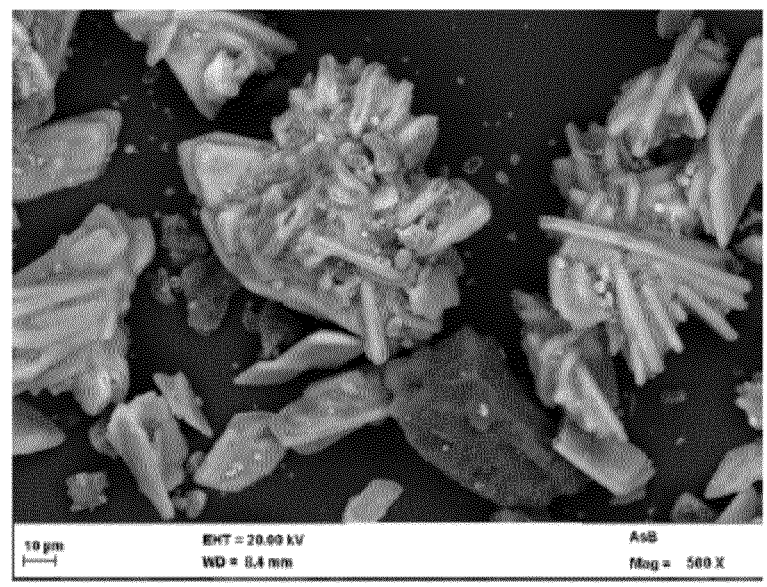
FIG. 4 is a scanning electron microscope (SEM) picture at magnification of 500 of a particulate hydroxyapatite composite comprising activated carbon as the additive (according to the invention).

A picture on SEM microscope for hydroxyapatite composite made with 20 wt % activated carbon (BHAP-C20) is given on FIG. 4 (500×) and compared with the SEM picture FIG. 3 (500×) obtained for the hydroxyapatite particles without additive (example 1). The hydroxyapatite particles in the composite BHAP-C20 in FIG. 4 maintained their plate-like crystallites, similar to what was observed with the HAP without additive (see FIG. 3).

The SEM analysis reveals two grains populations perceived by chemical contrast (apatite+activated carbon). Since the two populations, of different densities, do not separate in water (as explained above), there seems to be presence of cohesive forces for the two populations remaining linked to each other. Without wishing to be bound by this theory, it is believed that there is formation of solid bridges which maintain the composite structure intact even when submerged and moved through water, because the release of activated carbon is either nonexistent or if it exists it is very weak.

2 g. Efficiency for Adsorption of Contaminants from Water

The effectiveness of the composite BHAP with activated carbon was confirmed but variable depending on the elements to be removed from water, the initial concentration of these elements and the water matrices (as there were different speciations in the actual industrial samples compared to the synthetic waters). The description of the various industrial water samples WW1 to WW4 are provided in TABLE 9.

TABLE 9

| Wastewater sample No | Industry | Contaminants | Typical content (mg/l) |
|---|---|---|---|
| WW1a | melting and recycling of metals; large production of metal alloys and zinc | Ba | 0.14 |
| | | Cd | 0.4 |
| | | Hg | <0.04 |
| | | Mn | 84 |
| | | Se | 1.1 |
| | | Zn | 0.34 |
| | | pH | 7.2 |

TABLE 9-continued

| Wastewater sample No | Industry | Contaminants | Typical content (mg/l) |
|---|---|---|---|
| WW1b | Same source as WW1a | Ba | 0.12 |
| | | Cd | <0.002 |
| | | Mn | 0.005 |
| | | Se | 0.38 |
| | | Zn | 0.023 |
| | | pH | 7.2 |
| WW1c | Same source as WW1a | Se | 0.42 |
| | | pH | 7.2 |
| WW1d | Same source as WW1a | Se | 0.19 |
| | | pH | 7.2 |
| WW2 | Coal power plant using wet flue gas treatment; generating wastewaters containing Se and heavy metals e.g., Hg | Al | 0.21 |
| | | Ba | 0.2 |
| | | Cd | 0.04 |
| | | Cr | 0.067 |
| | | Hg | 0.44 |
| | | Mn | 23 |
| | | Ni | 0.69 |
| | | Se | 1.8 |
| | | Zn | 2.2 |
| | | Sr | 8.5 |
| | | pH | 7.22 |
| WW3 | Well water contaminated with metals | As | 1.6 |
| | | B | 0.98 |
| | | pH | 9 |
| WW4 | Metallurgy handling aluminium, copper, sulfuric acid | As | 0.11 |
| | | Cd | 0.003 |
| | | Cr | <0.005 |
| | | Cu | 0.067 |
| | | Hg | 0.045 |
| | | Ni | <0.01 |
| | | Se | 0.34 |
| | | Sn | <0.07 |
| | | Zn | 0.016 |
| | | pH | 6.69 |

In the efficacy tests, a suspension of 5 wt % of the composite or HAP samples were used and for control, 0.5 or 1 wt % of activated carbon was used.

The efficacy of the BHAP (composites with activated carbon) was measured with respect to Hg, B, Se and As removal from synthetic waters and from 3 of the wastewater samples WW1 to WW3. Results are provided in TABLE 10 (for Hg), TABLE 11 (for B), TABLE 12 (for Se), and TABLE 13 (for As).

Test on Mercury Removal:

The four types of activated carbon Pulsorb C, PTI, Mersorb® and Organosorb® 20 excelled at capturing mercury, as it was demonstrated with tests carried out on synthetic water and one type of wastewater WW2. All tests show almost total efficacy (greater than 99%).

Some results are marked ">95%" due to a concentration that was too low and below the limit of detection of the analytical device, these samples were not passed in ICP-MS but in view of the other results they would appear to be of the same order.

Moreover, while the activity of the hydroxyapatite material without additive (HAP) was very poor (2.3%), the activity of the composites with activated carbon (BHAP) was very similar to that of activated carbon, with reductions of more than 99%, whatever the water matrix.

TABLE 10

Test on Hg removal

| Ref. No. | Synthetic water HgCl2 | | WW2 | |
|---|---|---|---|---|
| | Initial →final [Hg] | % removal | Initial →final [Hg] | % removal |
| HAP (5 wt %) | — | — | 0.44 →0.43 | 2.3 |
| BHAP-C16.7 (5 wt %) | — | — | 0.44 →0.02 | >95.5 |
| BHAP-C5 (5 wt %) | 1.1 →0.0001 | 99.9 | 0.4 →0.0015 | 99.7 |
| BHAP-C20 (5 wt %) | 1.1 →0.007 | 99.4 | 0.4 →0.0005 | 99.9 |
| Pulsorb C (0.5 wt %) | 1.1 →0.0006 | 99.9 | 0.45 →0.0005 | 99.9 |
| BHAP-PTI20 (5 wt %) | — | — | 0.44 →0.02 | >95.5 |
| PTI (1 wt %) | — | — | 0.44 →0.02 | >95.5 |
| PTI (0.5 wt %) | — | — | 0.45 →0.001 | 99.8 |
| BHAP-Mersorb ® 10 (5 wt %) | 1.1 →0.02 | >98 | 0.43 →0.02 | >95 |
| BHAP-Organosorb ® 10 (5 wt %) | 1.1 →0.02 | >98 | 0.43 →0.02 | >95 |

Test on Boron Removal:

Since the effectiveness of apatite on this metal was limited (on the order of 12-230 reduction), the efficacy of the BHAP composite was comparatively much better (between 80 and 90% on the same wastewater sample WW3) and even greater than the reduction obtained with the activated carbon alone (68%).

TABLE 11

Test on boron (B) removal

| Ref. No. | WW3 | |
|---|---|---|
| | Initial →final [B] | % removal |
| HAP (5 wt %) | 0.98 →0.75 | 23.5 |
| | 0.98 →0.86 | 12.2 |
| BHAP-C16.7 (5 wt %) | 0.98 →0.18 | 81.6 |
| BHAP-PTI20 (5 wt %) | 0.98 →0.11 | 88.8 |
| PTI (1 wt %) | 0.98 →0.31 | 68.4 |

Test on Se Removal:

Concerning selenium, the impact of matrix, but especially of speciation (selenite versus selenate) was much more felt. Indeed, even if the four activated carbons (Pulsorb C, PTI, Mersorb® and Organosorb® 20) were very effective on removing selenate from synthetic water (greater than 97%), the BHAP composites were less effective, with % removal varying between 25 and 90%, depending mainly on the amount of activated carbon used and the initial concentration of Se, as well as the type of activated carbon used in the formation of the composite. However, the BHAP composites remain more effective than the hydroxyapatite HAP (alone without additive).

TABLE 12 (below) showed an increase in the metal removal (observed especially for selenates) when the amount of activated carbon in the hydroxyapatite composite was increased. This difference was not very important for selenium of water sample WW1a,b,c,d due to the possibility of Se speciation rather in the form of selenites which should be captured by the hydroxyapatite and not by the activated carbon additive in the composite (0% adsorption in this wastewater matrix).

The tests on industrial waters provided a view of the impact of the matrix on % removal, as the results obtained for synthetic and actual wastewater samples were quite different. While one of the activated carbons had a very good removal activity on selenium (above 93% removal), the other activated carbon had no activity. The composite made with the effective activated carbon produced quite satisfactory results (up to 90% and down to 0.008 ppm Se remaining in the water), while the composite made from the ineffective activated carbon resulted in a removal from 15 and 80% at initial water concentrations (with final concentrations between 0.23 and 0.18 ppm). The hydroxyapatite (without additive) had a removal % between 9 and 19% (decreasing to 0.21 ppm Se). It is believed that the very different results were due to the fact that the tested waters had different initial concentrations in Se and difference in selenite/selenate contents and their proportions were unknown. The presence of selenites therefore played a role on the removal Se % observed and resulted in different effectiveness for these compounds on the part of the activated carbons tested.

TABLE 12

Test on Se removal

| Ref. No. | Synthetic water Na$_2$SeO$_4$ (for selenate) | | WW1a/WW1b/WW1c/WW1d | |
|---|---|---|---|---|
| | Initial →final [Se] | % removal | Initial →final [Se] | % removal |
| HAP (5 wt %) | 1.2 →0.97 | 19.2 | 1.1 →1 | 9.1 |
| BHAP-C16.7 (5 wt %) | 1.2 →0.30 | 75 | 1.1 →0.18 | 83.6 |
| BHAP-C5 (5 wt %) | 0.99 →0.37 | 62.6 | 0.42 →0.23 | 45.2 |
| BHAP-C20 (5 wt %) | 0.99 →0.074 | 92.5 | 0.42 →0.23 | 47.6 |
| Pulsorb C (0.5 wt %) | 1.2→0.01 | 99.1 | 0.19 →0.19 | 0 |
| BHAP-PTI20 (5 wt %) | 1.2→0.78 | 35 | 1.1 →0.11 | 90 |
| | 0.87→0.64 | 26.4 | 0.38→0.008 | 97.9 |
| PTI (1 wt %) | 0.87→0.02 | 97.7 | 1.1 →0.07 | 93.6 |
| PTI (0.5 wt %) | — | — | 0.19→0.01 | 95 |
| BHAP-Mersorb ® 10 (5 wt %) | 1.0→0.39 | 61 | — | — |
| BHAP-Organosorb ® 10 (5 wt %) | 1.0→0.32 | 68 | — | — |

Test on as Removal:

Very little capture of As from the BHAP composites was observed. This was not surprising considering that the HAP hydroxyapatite alone (removal of less than 200%) as well as the activated carbon has very little activity on arsenic removal from wastewater (see WW3).

TABLE 13

Test on As removal

| | WW3 | |
|---|---|---|
| Ref. No. | Initial →final [As] | % removal |
| HAP | 1.6 → 1.3 | 18.8 |
| (5 wt %) | 1.6 → 1.4 | 12.5 |
| BHAP-C16.7 | 1.6 → 1.3 | 18.8 |
| (5 wt %) | | |
| BHAP-PTI20 | 1.6 → 1.3 | 18.8 |
| (5 wt %) | | |
| PTI | 1.6 → 1.6 | 0 |
| (1 wt %) | | |
| BHAP-Mersorb ® 10 | 1.6 → 1.3 | 18.8 |
| (5 wt %) | | |
| BHAP-Organosorb ® 10 | 1.6 → 1.3 | 18.8 |
| (5 wt %) | | |

Example 3 (in Accordance with the Invention)

Hydroxyapatite Composite with Hopcalite (CuMn2O4)
3a. Two-Step Synthesis of Hydroxyapatite Composite with Hopcalite from Calcium Carbonate, Phosphoric Acid and Calcium Hydroxide The hopealite is a mixture of manganese oxide and copper oxide, which has been used for the capture of mercury in gaseous effluents. It was synthesized following the method in the publication of T. J. Clarke, S. A. Kondrat, S. H. Taylor, *Total oxidation of naphtalene using copper manganese oxide catalyst. Catalysis Today* vol 258 (2015) pp. 610-615.

A sample of hydroxyapatite composite with hopcalite (HAP-hop) was made in a similar manner as in the Example 2 using the 3-L reactor with a rotation speed of 400 rpm, except that the hopcalite replaced the activated carbon. The second step was carried out at 50° C. using 18% solids in the suspension and the reaction was stopped after 1 h 47 min with a final pH of 8.6. The proportion of hopealite in this apatite composite was 5% by weight.

The HAP-hop composite sample was analyzed for porosity, and its efficacy for removal of specific elements from water was tested.
3b. Porosity and Particle Size The porosity characteristics of the HAP-hop composite sample were determined as explained in section 1b and are reported in TABLE 14, as well as the HAP sample (without additive) for comparison purposes.

TABLE 14

| Ref. No. | Wt % hopcalite | Temp. $2^{nd}$ step | Reactor | Particle size D50 μm | Pore Volume cm$^3$/g | $S_{BET}$ m$^2$/g |
|---|---|---|---|---|---|---|
| HAP1 | 0 | 50° C. | 3-L; 400 rpm | 41.5 | 0.39 | 116 |
| HAP-Hop composite | 5 | 50° C. | 3-L; 400 rpm | 34.3 | 0.56 | 153 |
| Hopcalite | 100 | — | — | 23.8 | 0.17 | 35 |

The particle size of the HAP-Hop composite had a median D50 of 34.3 m, a slightly higher population than that of hopealite alone (23.8 m). This particle size was also closer to the HAP range. This may provide a confirmation that deposition of the finer grains of hopealite may have taken place on the hydroxyapatite structure. See discussion concerning the SEM analysis in section 3c.

Figure 6:
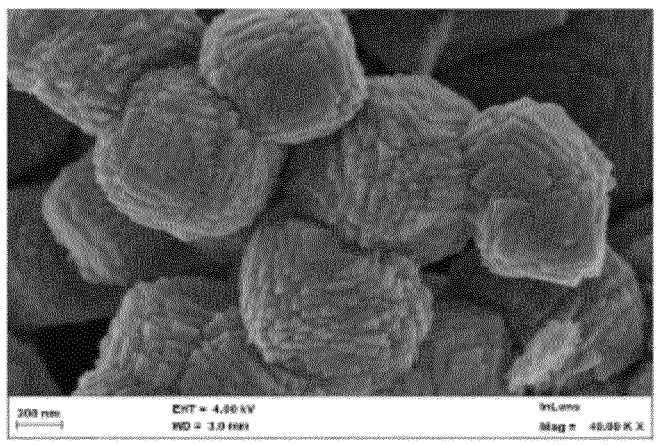
FIG. 6 is a scanning electron microscope (SEM) picture at magnification of 40,000 of hopcalite showing the surface covered with cubic rounded-shaped crystallites (not according to the invention).
Figure 7:
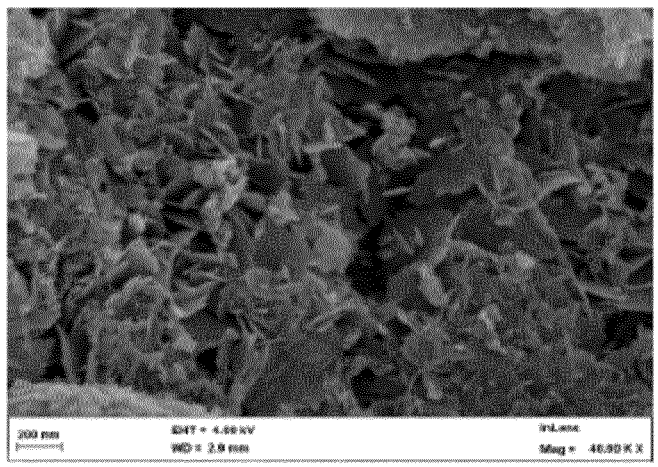
FIG. 7 is a scanning electron microscope (SEM) picture at magnification of 40,000 of a particulate hydroxyapatite composite comprising hopcalite as the additive (according to the invention) showing the surface of particles covered with plate-like crystallites but with less sharp edges compared to the hydroxyapatite crystals shown in FIG. 5.

For the HAP-Hop composite, a much larger pore volume was observed compared to that of the HAP apatite (without additive), namely 0.56 cm$^3$/g. This result was quite surprising considering that the pore volume of the hopcalite was very low, 0.17 cm$^3$/g. Similarly for the BET surface area of the HAP-Hop composite was rather high, 153 m$^2$/g (compared to 116 m$^2$/g for the HAP apatite sample using the same method but without additive), while BET surface area of the hopcalite was also very low: 35 m$^2$ g.
3c. SEM Analysis A picture on SEM microscope for hydroxyapatite composite made with 5 wt % hopcalite is given on FIG. 7 (40,000×) and compared with the SEM picture FIG. 5 (40,000×) obtained for the hydroxyapatite particles without additive (example 1) and with the SEM picture FIG. 6 (40,000×) obtained for the hopcalite particles.

Electron microscopy revealed a quite particular and different structure of the hopcalite. Unlike the BHAP composite, there was no physical mixture with the presence of the two distinct populations in the apatite/hopcalite composite, but rather an intermediate structural form. The hydroxyapatite particles in the composite BHAP-hop in FIG. 7 maintained their plate-like crystallites, similar to what was observed with the HAP without additive (see FIG. 5). But while the HAP apatite material had a more plate-like shape, with sharp crystals, hopcalite is more in the form of aggregate, cubic, with rounded crystals. The HAP-Hop composite had crystals resembling those of HAP apatite material, but less well defined. This more rounded appearance of the plate-like crystals may possibly result from a coating of the hopealite on the hydroxyapatite (hypothesizing that there may be 2 populations, one finer covering the other) or the formation of intermediate form crystals (1 population different from the 2 mother populations).
3d. Tests for Removal of Specific Elements from Water In the efficacy tests, a suspension of 5 wt % of the composite HAP-Hop sample was used and for a control, a suspension of 0.5 wt % of hopcalite was used.

The efficacy of the HAP-Hop (composites with hopcalite) was measured with respect to Hg and As removal from synthetic waters and from 2 of the wastewater samples WW2 and WW3. Results are provided in TABLE 15 (for Hg), and TABLE 16 (for As).

Test on Hg Removal:

TABLE 15

Test on Hg removal

| | Synthetic water HgCl2 | | WW2 | |
|---|---|---|---|---|
| Ref. No. | Initial →final [Hg] | % removal | Initial →final [Hg] | % removal |
| HAP (5 wt %) | — | — | 0.44 →0.43 | 2.3 |
| HAP-hop (5 wt %) | 1.1 →0.0004 | 99.6 | 0.460 →0.390 | 15.2 |
| Hopcalite (0.5 wt %) | 1.1 →0.013 | 98.8 | 0.460 →0.430 | 6.5 |

The HAP-hop composite has very good activity on synthetic HgCl$_2$ water, but it was observed that there is a rather limited activity on the actual wastewater samples. This discrepancy can be explained due to effect of matrix or speciation effects. Indeed the hopcalite alone had no effect on customer WW2 water, but a very good activity on synthetic water.

But overall, the HAP-hop composite still performed better in removal of Hg in actual wastewaters than the two HAP and hopcalite materials alone.

The characterizations showed that the combination of the two materials, namely hopcalite and apatite gave a composite with very surprising results. This assembly in fact increased certain properties which may explain why the composite was more effective than the two HAP and hopcalite materials alone.

Test on as Removal:

TABLE 16

Test on As removal

| Ref. No. | Synthetic water Na2HAsO4 | | WW3 | |
|---|---|---|---|---|
| | Initial →final [As] | % removal | Initial →final [As] | % removal |
| HAP (5 wt %) | — | — | 1.6 → 1.3 1.6 → 1.4 | 18.8 12.5 |
| HAP-hop (5 wt %) | 1.1 →0.11 | 90 | 1.5 →1.2 | 20 |

The HAP-hop composite had good activity on synthetic arsenic water, but became rather ineffective for removal of arsenic in industrial water sample WW3.

Test on Se Removal:

It was observed that there was a very low activity on selenium in synthetic or industrial waters (<20%) with the HAP-hop composite.

Example 4 (in Accordance with the Invention)

Hydroxyapatite Composites with $Fe(OH)_3$ or with FeOOH

4a. Two-Step Synthesis of Hydroxyapatite Composite with Iron Hydroxide from Calcium Carbonate, Phosphoric Acid and Calcium Hydroxide A sample of hydroxyapatite composite with iron hydroxide (HAP-$Fe(OH)_3$) was made in a similar manner as in the Example 2 using the 3-L reactor with a rotation speed of 400 rpm, except that iron chloride (a precursor of iron) replaced the activated carbon while sodium hydroxide was added in the second step of the preparation while preserving a neutral pH (about 8) and as a result of these conditions, $Fe(OH)_3$ co-precipitated while the hydroxyapatite formed. The proportion of iron (or $Fe(OH)_3$) in the apatite composite was 5.5% by weight.

Another sample of hydroxyapatite composite with iron hydroxide (HAP-$Fe(OH)_3$) was made in a similar manner as described above but using the 200-L reactor. The proportion of iron (or $Fe(OH)_3$) in this apatite composite was 6 wt % by weight.

The HAP-$Fe(OH)_3$ composite samples were analyzed for porosity, and their efficacy for removal of specific elements from water was tested.

4. Synthesis of Hydroxyapatite Composite with Iron Oxyhydroxide FeOOH

A sample of hydroxyapatite composite with iron oxyhydroxide (HAP-FeOOH) was made in a similar manner as in the Example 2 using the 5-L reactor with a rotation speed of 700 rpm, except that a solution of FeOOH was added in the second step of the preparation while maintaining a neutral pH (about 7.15-8.6) and as a result of these conditions, FeOOH was incorporated while the hydroxyapatite formed. The proportion of FeOOH in this apatite composite was 4.5% by weight.

The synthesis conditions for HAP-$Fe(OH)_3$ and HAP-FeOOH are reported in TABLE 17.

TABLE 17

| Ref. No. | Wt % A.C. | Temp. $2^{nd}$ step | Reactor | % solids in suspension | End pH | Time $2^{nd}$ step (hr) |
|---|---|---|---|---|---|---|
| HAP-$Fe(OH)_3$ 5.5% | 5.5 | 50° C. | 3-L; 400 rpm | 18 | 7 | 1 h 10 |
| HAP-$Fe(OH)_3$ 6% | 6 | 50° C. | 200-L | 21.3 | 7.15 | 2 h 30 |
| HAP-FeOOH 4.5% | 4.5 | 50° C. | 5-L; 700 rpm | 18 | 7.7 | 2 h |

4c. Porosity and Particle Size

The porosity characteristics of the HAP-$Fe(OH)_3$ and HAP-FeOOH composite samples were determined as explained in section 1b and are reported in TABLE 18, as well as the HAP sample (without additive) for comparison purposes.

TABLE 18

| Ref. No. | Wt % Fe | Temp. $2^{nd}$ step | Reactor | Particle size D50 μm | Pore Volume $cm^3/g$ | $S_{BET}$ $m^2/g$ |
|---|---|---|---|---|---|---|
| HAP1 | 0 | 50° C. | 3-L; 400 rpm | 41.5 | 0.39 | 116 |
| HAP-$Fe(OH)_3$ 5.5% | 5.5 | 50° C. | 3-L; 400 rpm | 33.4 | 0.43 | 187 |
| HAP-$Fe(OH)_3$ 6% | 6 | 50° C. | 200-L | 31.1 | 0.35 | 101 |
| HAP-FeOOH 4.5% | 4.5 | 50° C. | 5-L; 700 rpm | 26.1 | 0.47 | 162 |

The particle size for this HAP-$Fe(OH)_3$ 5.5% composite corresponds to a median of 33.4 μm. A particle size comparable to the range of apatite confirms in SEM that the finest particles seen on hydroxyapatite crystals do not necessarily correspond to an overlap by iron and therefore no distinction of 2 populations (not necessarily a finer population covering the other). On the other hand, an increase in the pore volume and the specific surface area for the HAP-$Fe(OH)_3$ 5.5% composite compared to the hydroxyapatite HAP without additive (HAP1 manufactured under same conditions) was observed.

4d. SEM Analysis

Figure 8:
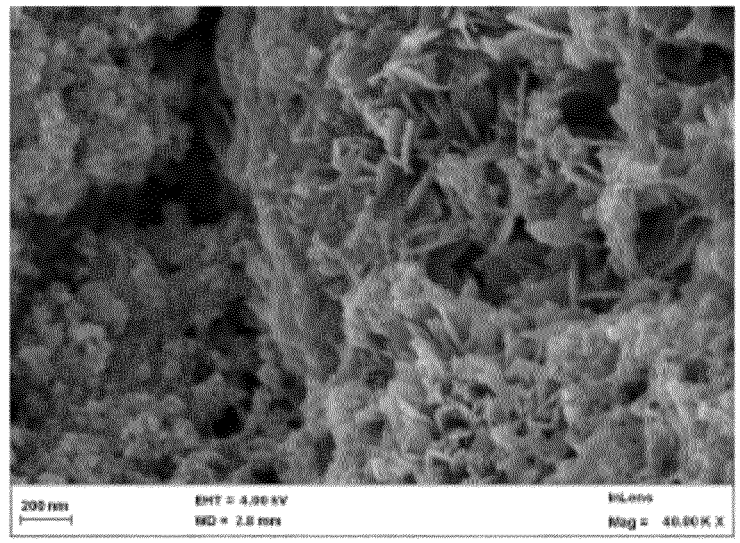
FIG. 8 is a scanning electron microscope (SEM) picture at magnification of 40,000 of a particulate hydroxyapatite composite comprising iron hydroxide as the additive (according to the invention).

A picture on SEM microscope for hydroxyapatite composite (HAP-$Fe(OH)_3$ 5.5%) made with 5.5 wt % Fe is given on FIG. 8 (40,000×) and compared with the SEM picture FIG. 5 (40,000×) obtained for the hydroxyapatite particles without additive (example 1).

The shape of the apatite crystals was still recognizable, with a coating of finer particles, which may be either apatite or iron hydroxide. There does not seem to be a differentiation of the two distinct populations of particles, suggesting that the HAP-$Fe(OH)_3$ 5.5% composite resulted from a single population of particles composed of the two materials.

4e. Tests for Removal of Specific Elements from Water

In the efficacy tests, a suspension of 5 wt % of the composite HAP-$Fe(OH)_3$ 5.5% sample was used. The efficacy of the HAP-$Fe(OH)_3$ (composite with Fe) was measured with respect to As removal from synthetic waters and from the wastewater sample WW3 containing arsenic and selenium. Results are provided in TABLE 19 (for As).

Good activity was observed in industrial water with arsenic. It was observed a 69% removal of As from WW3 with suspension of 5 wt % of the composite HAP-Fe(OH)$_3$ 5.5% compared to 12.5% and 18.8% for a suspension of 5 wt % of the HAP material without additive (see result in TABLE 16).

Selenium removal tests were very low (<25%) with the composite HAP-Fe(OH)$_3$ 5.5% sample.

Test on as Removal:

TABLE 19

Test on As removal

| Ref. No. | Synthetic water | | WW3 | |
| --- | --- | --- | --- | --- |
| | Initial →final [As] | % removal | Initial →final [As] | % removal |
| HAP-Fe(OH)$_3$ 5.5% (5 wt %) | 1.02 →0.03 | >97 | 1.6 →0.5 | 69 |

In the efficacy tests, a suspension of 5 wt % of the composite HAP-FeOOH 4.5% sample was used. The efficacy of the HAP-FeOOH 4.5% (composite with FeOOH) was measured with respect to Se and As removal from synthetic waters and from 2 of the wastewater sample WW3 and WW4 containing selenium and arsenic. Results are provided in TABLES 20 and 21.

Test on Se Removal:

TABLE 20

Test on Se removal

| Ref. No. | Synthetic water Na$_2$SeO$_4$ (for selenate) | | WW1a | | WW4 | |
| --- | --- | --- | --- | --- | --- | --- |
| | Initial →final [Se] | % removal | Initial →final [Se] | % removal | Initial →final [Se] | % removal |
| HAP (5 wt %) | 1.2 →0.97 | 19.2 | 1.1 →1 | 9.1 | — | — |
| HAP-FeOOH (5 wt %) | 1.0 →0.40 | 60 | — | — | 0.35 →0.30 | 14 |

Test on As Removal

TABLE 21

Test on As removal

| Ref. No. | WW3 | |
| --- | --- | --- |
| | Initial →final [As] | % removal |
| HAP (5 wt %) | 1.6 → 1.3 | 18.8 |
| | 1.6 → 1.4 | 12.5 |
| HAP-FeOOH (5 wt %) | 1.6→1.1 | 31 |

Example 5 (in Accordance with the Invention)

Hydroxyapatite Composite with Chitosan

5a. Two-Step Synthesis of Hydroxyapatite Composite with Chitosan

A sample of hydroxyapatite composite (HAP-Chi) with chitosan (Aldrich medium molecular weight, n° 448877, lot #STBG8451) was made in a similar manner as in the Example 2 using the 3-L reactor with a rotation speed of 400 rpm, except that chitosan replaced the activated carbon. The chitosan used is of industrial origin, it is a polysaccharide derived from chitin, a polymer present in shells of crustaceans and insects. The proportion of chitosan in this apatite composite was 10% by weight.

The HAP-Chi composite sample was analyzed for porosity, and its efficacy for removal of specific elements from water was tested.

5b. Porosity and Particle Size

The porosity characteristics of the HAP-Chi composite sample were determined as explained in section 1b and are reported in TABLE 22, as well as the HAP sample (without additive) for comparison purposes.

TABLE 22

| Ref. No. | Wt % chitosan | Temp. 2$^{nd}$ step | Reactor | Particle size D50 μm | Pore Volume cm$^3$/g | $S_{BET}$ m$^2$/g |
| --- | --- | --- | --- | --- | --- | --- |
| HAP1 | 0 | 50° C. | 3-L; 400 rpm | 41.5 | 0.39 | 116 |
| HAP-Chi composite | 10 | 50° C. | 3-L; 400 rpm | 39.9 | 0.55 | 147 |

5c. SEM Analysis

Figure 9:
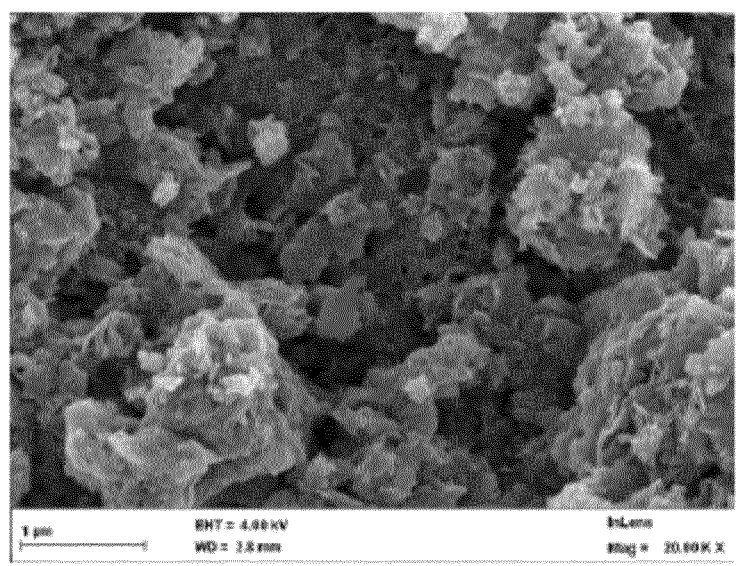
FIG. 9 is a scanning electron microscope (SEM) picture at magnification of 20,000 of a particulate hydroxyapatite composite comprising chitosan as the additive (according to the invention).

A picture on SEM microscope for hydroxyapatite composite made with 10 wt % chitosan is given on FIG. 9 (20,000×).

Characterization by Electron Microscopy analysis of the HAP-Chi composite revealed grains very different from those of HAP hydroxyapatite, no acute or plate crystals, and compact aggregates with no particular shape. The presence of one or two populations could not be determined by this analysis.

5d. Tests for Removal of Specific Elements from Water

In the efficacy tests, a suspension of 5 wt % of the composite HAP-Chi sample was used. The efficacy of the HAP-Chi (composite with chitosan) was measured with respect to As removal from synthetic waters and from the wastewater sample WW3 containing arsenic and selenium. Results are provided in TABLE 23 (for As).

Activity on arsenic was rather limited in industrial waters. Much better results were obtained in synthetic waters. The activity on selenium was very low (<25%).

Test on as Removal:

TABLE 23

Test on As removal

| Ref. No. | Synthetic water | | WW3 | |
| --- | --- | --- | --- | --- |
| | Initial →final [As] | % removal | Initial →final [As] | % removal |
| HAP-Chi (5 wt %) | 1.02 →0.03 | >97 | 1.6 →1.3 | 19 |

Example 6 (in Accordance with the Invention)

Hydroxyapatite Composite with Activated Carbon Made from Brushite and Calcium Hydroxide 6.a. One-Step Synthesis of Hydroxyapatite Composite with Activated Carbon "BHAP-BRU" from Brushite and Calcium Hydroxide A sample of hydroxyapatite composite with activated carbon labelled "BHAP-BRU" was made from brushite ($CaH_5O_6P$, no. AC389830010 from Acros), calcium hydroxide and Pulsorb C from Chemviron as the source of activated carbon. The proportion of activated carbon in the resulting apatite composite was 10% by weight.

The preparation of the composite sample "BHAP-BRU" was carried out as follows. About 1,062 g of a suspension of $Ca(OH)_2$ (25 wt %) was added to a mass of 3,973 g of a suspension of brushite (23.4 wt %) heated to +/−50° C. in a baffled 5-L reactor with a rotational speed of 700 ppm and with 4-blade stirrer. The activated carbon Pulsorb C (90 g)—see TABLE 4—was added at the same time as the lime addition was started at the beginning of the synthesis of the hydroxyapatite composite.

The solid portion of the suspension after 280 minutes was about 21.2 wt % apatite by weight. The pH used for the making of the composite sample started at pH 7.09 to end at a pH of 11.2. For this composite sample, the temperature for the synthesis was maintained at about 51-52° C.

6b. Cationic Standard Test for Performance Evaluation on Selected Metallic cations 6b.1 Preparation of Mother Solutions for Each Metallic Cation:

A mother solution for each of the metals from the following metal salts containing M=Cd, Cr, Cu, Mn, Ni, Pb, Zn, Hg, as shown in TABLE 24 is prepared by adding the salt of each metal in deionized water to reach 1 g M/L content.

TABLE 24

| metal M | metal MW* (g/mol) | metal precursor | metal precursor MW* (g/mol) | [cations] [g/l] | metal precursor [g/l] (mass to weigh) |
|---|---|---|---|---|---|
| Cd (II) | 112.41 | $CdCl_2 \cdot 5H_2O$ | 273.31 | 1 | 2.43 |
| Cr (III) | 51.99 | $Cr(NO_3)_9 \cdot 9H_2O$ | 400.2 | 1 | 7.70 |
| Cu (II) | 63.55 | $CuSO_4 \cdot 5H_2O$ | 249.68 | 1 | 3.93 |
| Hg (II) | 200.59 | $HgCl_2$ | 271.49 | 1 | 1.35 |
| Ni (II) | 58.69 | $NiCl_2$ | 129.62 | 1 | 2.21 |
| Pb (II) | 207.2 | $Pb(NO_3)_2$ | 331.23 | 1 | 1.60 |
| Zn (II) | 65.41 | $ZnCl_2$ | 136.29 | 1 | 2.08 |

*MW = molecular weight 6b.2 Preparation of a Standard Solution for the Cationic Standard Test:

A standard solution containing 5 mg/L (5 ppm) of cations for Cd, Cr, Cu, Mn, Ni, Pb, Zn and 1 mg/L (1 ppm) Hg cation was prepared from the 7 mother solutions as follows: with the aid of a micropipette, add 5 mL of each of the mother liquors containing Cd, Cr, Cu, Mn, Ni, Pb, Zn and 1 mL of the mother liquor containing Hg into a flask and add water to reach a total volume of 1 liter.

6b.3 Measure of the Dry Mater Content for Each Material Sample for the Cationic Standard Test:

Dry approximately 2-3 g of a composite sample for 3 hours, stirring every 30 minutes in an oven at 80° C. to obtain a representative homogeneous sample; and Determine the dry matter content (wt % DM) of the dried sample using a moisture meter such as a thermal balance sold by Sartorius.

6b.4 Steps for the Cationic Standard Test on Performance Evaluation:

Take a 100-ml initial sample from the standard solution at time 0 (before adding the apatic material to start the test)

Measure the mass of the wet material sample (not dried) in order to achieve a suspension containing 0.03 wt % of dry matter in a given volume of the standard solution in a container using the following formula:

$$\text{Mass (wet sample)}(g) = \frac{0.03 \text{ wt \%} * \text{volume of standard (mL)}}{\text{wt \% DM}};$$

Shake the suspension mechanically for 1 hour in the container at 250 rpm;

Take a 100-ml sample from the suspension after 1 hour and filter it on a 0.45-μm filter to remove solids;

Stabilize the two 100-ml samples taken at time=0 and time=1 hour by adding 1 ml of concentrated nitric acid (65% HNO3); and Send to ICP-OES for analysis to determine the contents of metals: Cd, Cr, Cu, Mn, Ni, Pb, Zn, Hg.

6b.5 Method ICP-EOS:

Scandium (as internal standard) and optionally gold (to stabilize Hg when Hg determination is required) to an aliquot of each water sample which is slightly acidified with concentrated nitric acid. The solution is then brought to volume with ultrapure water in order to obtain a 5-time dilution. The final diluted solution typically contains 2% to 5% $HNO_3$, 1 or 2 mg/l scandium and, where appropriate, 1 or 2 mg/l gold.

The determination of contents of specific elements such as Al, As, B, Ba, Ca, Cd, Co, Cr, Cu, Fe, Ga, Hg, K, Mg, Mn, Mo, Na, Nb, Ni, P, Pb, Sb, Se, Sn, Ta, V, W and Zn in the water samples are done by ICP-OES (Inductively Coupled Plasma—Optical Emission Spectrometry) with axial and observation of the plasma and CCD detector. The solutions to be measured are nebulized and transported in the plasma with argon as a carrier gas. In the plasma, the different elements emit light with a wavelength specific to each element and with an intensity directly proportional to their concentration.

The measurements of the emitted light intensity by each element used in the standard test are evaluated against an external calibration established between 0 and 5 mg/l for each element to be measured. This calibration consists of seven (7) solutions: a calibration blank and six (6) solutions of increasing concentrations (0.1 mg/l, 0.2 mg/l, 0.5 mg/l, 1 mg/l, 2 mg/l and 5 mg/l of each element). All the calibration solutions also contain the same concentration of $HNO_3$, scandium and gold as the diluted sample solutions.

6c. Results of the Cationic Standard Test for the Composite BHAP-BRU

The cationic standard test (see Section 6.b) was carried out with the composite sample BHAP-BRU whose preparation is described in section 6.a. The % removal for the 7 metallic cations during the cationic standard test are provided in TABLE 25.

For comparison, the same cationic standard test was carried on a sample of a BHAP composite with activated carbon (10 wt % Pulsorb C) made using the 2-step process starting from calcium carbonate and phosphoric acid in 1st step and calcium hydroxide in $2^{nd}$ step (similar to Example 2—section 2.b) and a HAP sample (without activated carbon) also using the 2-step process.

TABLE 25

| Ref. No. | % removal | | | | | | |
|---|---|---|---|---|---|---|---|
| | Cd | Cr | Cu | Hg | Ni | Pb | Zn |
| BHAP-BRU 10% | 75% | 96% | 99% | 27% | 17% | 99% | 75% |
| BHAP-C10[vi] 10% | 52% | 75% | 99% | 32% | 11% | 100% | 57% |
| HAP[vii] | 56% | 88% | 83% | 6% | 2% | 99% | 45% |

[vi]Composite with activated carbon (10 wt % Pulsorb C) using the 2-step process
[vii]Hydroxyapatite produced with the 2-step process As observed for both of composites with activated carbon, the performance for removal of Hg, Ni, and Zn was improved compared to the apatite material (without activated carbon). In addition, the performance in Cd, Cr, Zn, Ni removal was increased with the composite BHAP-BRU which was prepared with the one-step process from brushite, compared to the composite BHAP-C10 which was prepared with the two-step process from calcium carbonate and phosphoric acid using the same amount of Pulsorb C activated carbon.

6d. Anionic Standard Test for Performance Evaluation on Selected Metallic Anions 6d.1 Preparation of Mother Solutions for Each Metallic Anion:

A mother solution for each of the metals from the following metal salts containing M=Arsenic(V), Molybdum (VI), Selenium(VI) and Vanadium(V), as shown in TABLE 26 was prepared by adding the salt of each metal in deionized water to reach 1 g M/L content.

TABLE 26

| metal M | metal MW* (g/mol) | metal precursor | metal precursor MW* (g/mol) | [cations] [g/l] | metal precursor [g/l] (mass to weigh) |
|---|---|---|---|---|---|
| As (V) | 74.92 | $Na_3AsO_4 \cdot 7H_2O$ | 311.91 | 1 | 4.16 |
| Mo (VI) | 95.94 | $Na_2MoO4$ | 205.92 | 1 | 2.15 |
| Se (VI) | 188.94 | $Na_2SeO4$ | 78.96 | 1 | 2.39 |
| V (V) | 183.91 | $Na_3VO_4$ | 50.94 | 1 | 3.61 |

*MW = molecular weight 6d.2 Preparation of a Standard Solution for the Anionic Standard Test:

A standard anionic solution containing 1 mg/L (1 ppm) of anions for As (V), Mo (VI), Se (VI) and V (V), was prepared from the 4 mother solutions as follows: with the aid of a micropipette, add 1 mL of each of the 4 mother liquors containing As (V), Mo (VI), Se (VI) and V (V) into a flask and add water to reach a total volume of 1 liter.

6d.3 Measure of the Dry Mater Content for Each Material Sample for the Standard Test:

Dry approximately 2-3 g of a composite sample for 3 hours, stirring every 30 minutes in an oven at 80° C. to obtain a representative homogeneous sample; and Determine the dry matter content (wt % DM) of the dried sample using a moisture meter such as a thermal balance sold by Sartorius.

6d.4 Steps for the Anionic Standard Test on Performance Evaluation:

Take a 100-ml initial sample from the standard solution at time 0 (before adding the apatic material to start the test)

Measure the mass of the wet material sample (not dried) in order to achieve a suspension containing 0.5 wt % of dry matter in a given volume of the standard solution in a container using the following formula:

$$\text{Mass (wet sample)}(g) = \frac{0.5 \text{ wt \%} * \text{volume of standard solution (mL)}}{\text{wt \% } DM};$$

Shake the suspension mechanically for 1 hour in the container at 250 rpm;

Take a 100-ml sample from the suspension after 1 hour and filter it on a 0.45-μm filter to remove solids;

Stabilize the two 100-ml samples taken at time=0 and time=1 hour by adding 1 ml of concentrated nitric acid (65% HNO3); and Send to ICP-OES as described in Section 6b.5 for analysis to determine the contents of the following metals: As (V), Mo (VI), Se (VI) and V (V).

6e. Results of the Anionic Standard Test for the Composite BHAP-BRU

The anionic standard test (see Section 6.b) was carried out with the composite samples BHAP-BRU whose preparation is described in section 6a. The % removal for the 4 metallic anions during the anionic standard test are provided in TABLE 27.

For comparison, the same anionic standard test was carried on a HAP sample (without activated carbon) made using the 2-step process.

TABLE 27

| Ref. No. | % removal | | | |
|---|---|---|---|---|
| | % As | % Mo | % Se | % V |
| BHAP-BRU 10% | 30% | 11% | 1% | 79% |
| HAP[vii] | 14% | 8% | 0% | 80% |

[vii]Hydroxyapatite produced with the 2-step process

The performance for As (V) removal with the composite BHAP-BRU with activated carbon made with the 1-step process was improved compared to the apatite material (without activated carbon).

Example 7 (in Accordance with the Invention)

Hydroxyapatite composites with Fe and $Fe^0+S^0$

7a. Two-Step Synthesis of Hydroxyapatite Composite with Zero-Valent Iron Fe(0) and with Fe(0)+S(0)

Three hydroxyapatite composites with zero-valent iron Fe(0) were made using a Fe(0) from Aldrich and 2 Fe(0) from Rio Tinto (ref No. H2OMET56 and H2OMET86) labelled "HAP-Fe[0]". The content of zero-valent iron Fe(0) in the apatite composites was 20% or 40% by weight.

Three hydroxyapatite composites with zero-valent iron Fe(0) and zero-valent sulfur S(0) were made using a Fe(0) from Aldrich and a S(0) from Acros. The total content of the Fe(0) and S(0) in these apatite composites was 20% by weight, but the relative weight proportions of Fe(0):S(0) were different with 50:50, 75:25 and 25:75.

The preparation of the composite samples with Fe(0) and with Fe(0)+S(0) was carried out in a similar manner as in the Example 1, except that the Fe(0) et S(0) were added after the reaction medium was heated to +/−50° C. in a baffled 5-L reactor with a rotational speed of 700 ppm and with 4-blade stirrer during the lime addition step ($2^{nd}$ step) after the pH had risen to about 8-9. The additives Fe(0) and S(0) were added in the form of a powder.

The solid portion of the suspensions in the second step remained the same, at about 20% by weight. The pH used for the making of the composite samples was similar to that of apatite without additive, namely a range between pH 6.5 and 12, and preferred being maintained between 8 and 9. For these composite samples, the temperature for the first step was 20° C. and the temperature for the second step was maintained at 50° C.

The synthesis conditions are reported in TABLE 28.

As observed for both of composites with $Fe^0$ and $Fe^0+S^0$, the performance for removal of Cd, Cr, Ni and Zn was greatly improved compared to the apatite material (without additive). In addition, the performance in Hg removal was increased with the composite with $Fe^0+S^0$ compared to the apatite material (without additive) and also to the composite with $Fe^0$. The presence of $S^0$ greatly increased the removal efficiency of the hydroxyapatite composite.

It was also observed that not only the performance on removal of Cd, Cr, Ni and Zn and also of Hg was improved and also there was no negative impact on the already high efficiency (>95% up to 99%) of removal of Cu and Pb for both of composites with $Fe^0$ and $Fe^0+S^0$.

TABLE 28

| Ref. No. | Wt % | Temp. $2^{nd}$ step | Reactor | % solids in suspension | End pH | Time $2^{nd}$ step (hr) |
|---|---|---|---|---|---|---|
| HAP-Fe(0)$^i$ 20% | 20 Fe(0) | 50° C. | 5-L; 700 rpm | 20 | 8.3 | 1 hr 33 |
| HAP-Fe(0)$^{ii}$ 40% | 40 Fe(0) | 50° C. | 5-L; 700 rpm | 20 | 8.8 | 1 hr 40 |
| HAP-Fe(0)$^{iii}$ 40% | 40 Fe(0) | 50° C. | 5-L; 700 rpm | 20 | 8.6 | 1 hr 47 |
| HAP-Fe(0)$^i$ + S(0)$^{iv}$ (50:50) 20% | 10 Fe(0) 10 S(0) | 50° C. | 5-L; 700 rpm | 20 | 8.9 | 2 hr 30 |
| HAP-Fe(0)$^i$ + S(0)$^{iv}$ (75:25) 20% | 15 Fe(0) 5 S(0) | 50° C. | 5-L; 700 rpm | 20 | 8.1 | 2 hr 18 |
| HAP-Fe(0)$^i$ + S(0)i$^v$ (25:75) 20% | 5 Fe(0) 15 S(0) | 50° C. | 5-L; 700 rpm | 20 | 9.3 | 3 hr 40 |

$^i$Fe(0) from Aldrich
$^{ii}$Fe(0) H2OMET56 from Rio Tinto
$^{iii}$Fe(0) H2OMET86 from Rio Tinto
$^{iv}$S(0) from Acros 7b. Results of the Standard Test for the Composites HAP-Fe(0) and HAP-Fe(0)+S(0)

The cationic standard test (see Section 6.d) was carried out with the composite samples HAP-Fe(0) and HAP-Fe(0)+S(0) shown in TABLE 28 and also HAP without additive as a control. In the efficacy tests, a suspension of 1 wt % of the composites was used. The % removal for the 7 metallic cations during the standard test are provided in TABLE 29.

TABLE 29

| | % removal | | | | | | |
|---|---|---|---|---|---|---|---|
| Ref. No. | Cd | Cr | Cu | Hg | Ni | Pb | Zn |
| HAP-Fe(0)$^i$ 20% | 58 | 89 | 95 | 16 | 11 | 99 | 54 |
| HAP-Fe(0)$^{ii}$ 40% | 51 | 84 | 99 | 24 | 18 | 99 | 63 |
| HAP-Fe(0)$^{iii}$ 40% | 57 | 89 | 96 | 21 | 13 | 99 | 54 |
| HAP-Fe(0)$^i$ + S(0)$^{iv}$ (50:50) 20% | 75 | 97 | 99.6 | 77 | 18 | 99 | 77 |
| HAP | 25 | 67 | 99 | 15 | 8 | 99 | 39 |

$^i$Fe(0) from Aldrich
$^{ii}$Fe(0) H2OMET56 from Rio Tinto
$^{iii}$Fe(0) H2OMET86 from Rio Tinto
$^{iv}$S(0) from Acros 7c. Efficiency for Removal of Contaminants (Hg, Se, as) from Industrial Waters Using a Composite HAP-$Fe^0+S^0$.

The effectiveness of the composite HAP-Fe(0)+S(0)(75:25) with 15 wt % $Fe^0$ and 5 wt % $S^0$ was confirmed but variable depending on the elements to be removed from water, the initial concentration of these elements and the water matrices. The description of the various industrial water samples WW5 to WW7 are provided in TABLE 30.

TABLE 30

| Wastewater sample No | Industry | Contaminants | Typical content (mg/l) |
|---|---|---|---|
| WW5 | Coal power plant using wet flue gas treatment; generating wastewaters containing Se and heavy metals e.g., Hg | Hg | 0.465 |
| | | Se (VI) | 1.09 |
| | | pH | 8.47 |
| WW6 | Chemical plant | Hg | 0.994 |
| | | Se (IV) | 1.04 |
| | | pH | 7.91 |
| WW7 | Well water contaminated with metals | As | 0.23 |
| | | pH | 8.53 |

The % removal for the metallic contaminants using the composite HAP-Fe(0)+S(0)(75:25) with 15 wt % Fe⁰ and 5 wt % S⁰ are provided in TABLE 31.

TABLE 31

| Ref. No. | % removal Treated water | | | | |
|---|---|---|---|---|---|
| | WW5 | | WW6 | | WW7 |
| | Hg | Se (VI) | Hg | Se (IV) | As |
| HAP-Fe(0) + S(0) (75:25) 20% | 99.1 | 8.3 | 99.9 | 86.5 | 78 |

As observed for the composite with Fe⁰+S⁰, the performance for removal of Hg was very high (>99%) and was greatly improved compared to what is generally observed with an apatite material (without additive).

In addition, the performance in As removal was increased with the composite with Fe⁰+S⁰ compared to what is generally observed with an apatite material (without additive).

As for selenium removal, the composite with Fe⁰+S⁰ had a much higher efficiency of removal of Se(IV) which was 86% compared to Se(VI) which was only 8%.

The disclosure of all patent applications, and publications cited herein are hereby incorporated by reference, to the extent that they provide exemplary, procedural or other details supplementary to those set forth herein.

Should the disclosure of any of the patents, patent applications, and publications that are incorporated herein by reference conflict with the present specification to the extent that it might render a term unclear, the present specification shall take precedence.

In the present application, where an element or component is said to be included in and/or selected from a list of recited elements or components, it should be understood that in related embodiments explicitly contemplated here, the element or component can also be any one of the individual recited elements or components, or can also be selected from a group consisting of any two or more of the explicitly listed elements or components. Any element or component recited in a list of elements or components may be omitted from such list. Further, it should be understood that elements, embodiments, and/or features of processes or methods described herein can be combined in a variety of ways without departing from the scope and disclosure of the present teaching, whether explicit or implicit herein.

Accordingly, the scope of protection is not limited by the description set out above, but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention.

While preferred embodiments of this invention have been shown and described, modifications thereof can be made by one skilled in the art without departing from the spirit or teaching of this invention. The embodiments described herein are exemplary only and are not limiting. Many variations and modifications of systems and methods are possible and are within the scope of the invention.

The invention claimed is:

1. A hydroxyapatite composite which comprises:
   a hydroxyapatite; and
   at least one additive which is present during the hydroxyapatite synthesis,
   wherein the hydroxyapatite composite comprises at least 50 wt % hydroxyapatite, based on the total weight of dry matter.

2. The hydroxyapatite composite according to claim 1, wherein the at least one additive increases the porosity of the hydroxyapatite.

3. The hydroxyapatite composite according to claim 2, having a higher total pore volume and/or has a higher BET surface area than a hydroxyapatite material synthesized without the additive.

4. The hydroxyapatite composite according to claim 1, comprising a weight ratio of hydroxyapatite to additive (HAP:A) of from 1:0.01 to 1:0.5.

5. The hydroxyapatite composite according to claim 1, comprising at least 60 wt % hydroxyapatite, based on the total weight of dry matter.

6. The hydroxyapatite composite according to claim 1, comprising, based on the total weight of dry matter:
   water, of the order of from 1 wt % to 20 wt %; and/or
   calcium carbonate in an amount of less than 20 wt %; and/or
   less than 1 wt % of calcium dihydroxide $Ca(OH)_2$.

7. The hydroxyapatite composite according to claim 1, wherein the hydroxyapatite is a calcium-deficient hydroxyapatite with a Ca/P molar ratio more than 1.5 and less than 1.67.

8. The hydroxyapatite composite according to claim 1, wherein the at least one additive in the composite is embedded or incorporated into or coated onto the hydroxyapatite.

9. The hydroxyapatite composite according to claim 1, wherein the at least one additive comprises at least one activated carbon; chitosan; hopcalite; clays; zeolites; sulfur; a metal in the form of metal of oxidation state 0, salt, oxide, oxyhydroxide, or hydroxide being selected from the group consisting of aluminium, tin, a transition metal selected from Groups 3-12 of the June 2016 IUPAC Periodic Table of Elements, and mixtures thereof; or combinations of two or more thereof.

10. The hydroxyapatite composite according to claim 1, wherein the at least one additive comprises at least one activated carbon, chitosan, hopcalite, sulfur, iron in the form of metal, salt, oxide, oxyhydroxide, or hydroxide, or combinations of two or more thereof.

11. The hydroxyapatite composite according to claim 1, wherein the additive comprises an activated carbon or blend of two or more activated carbons, wherein said activated carbon or blend of two or more activated carbons is selected such that a 0.3 wt % dispersion in deionized water provides a pH of 5 or more.

12. The hydroxyapatite composite according to claim 1, wherein the at least one additive comprises at least one activated carbon, sulfur, iron in the form of zero-valent metal, oxide, oxyhydroxide, or hydroxide, or combinations of two or more thereof.

13. The hydroxyapatite composite according to claim 1, being in the form of particles
   having a mean size of at least 20 µm, and/or
   having a specific surface area of at least 120 m²/g; and/or
   having a total pore volume of at least 0.3 cm³/g.

14. A process for producing the hydroxyapatite composite of claim 1, according to which:

in a first step, a source of calcium and a source of phosphate ions are mixed in water in a molar ratio that is adjusted to obtain a Ca/P molar ratio of between 0.5 and 1.6, and reacting the source of calcium with the phosphate ions at a pH of between 2 and 8, in order to obtain a suspension (A) of calcium phosphate, in a second step, adding to the suspension (A) an alkaline compound comprising hydroxide ions in order to set a pH of at least 7.5; further adding an additional source of calcium in order to obtain a suspension (B) of composite having a Ca/P molar ratio of greater than 1.6 to form a hydroxyapatite; and at least one additive or a precursor thereof is further added in the first step, in the second step, or in both the first and second steps.

15. The process according to claim 14, wherein the source of calcium comprises calcium carbonate, wherein the source of phosphate ions is phosphoric acid, and wherein in the second step, the alkaline compound used that comprises hydroxide ions is sodium hydroxide and/or calcium hydroxide.

16. A process for producing the hydroxyapatite composite of claim 1, comprising the following steps:

forming an aqueous suspension comprising particles of a calcium phosphate compound having a Ca/P molar ratio of 1.5 or less, said particles containing brushite;

adding an alkaline compound comprising calcium and hydroxide ions in order to increase the pH of the suspension to a value of at least 6.5, or of at most 10 in order to obtain a suspension (B') having a Ca/P molar ratio of greater than 1.6; and further adding at least one additive or a precursor thereof to the suspension (B') before, during or after the addition of the alkaline compound, to form the hydroxyapatite composite, wherein said suspension (B') contains from 10 to 35 wt % solids.

17. Process according to claim 16, wherein the alkaline compound comprises calcium hydroxide.

18. An adsorbent material for removal of contaminants from an effluent, comprising:

a hydroxyapatite composite comprising
a hydroxyapatite; and
at least one additive which is present during the hydroxyapatite synthesis; or two or more of said hydroxyapatite composites, wherein the additives in the hydroxyapatite composites are different; or a blend of a hydroxyapatite without additive and at least one said hydroxyapatite composite, wherein the hydroxyapatite composite comprises at least 50 wt % hydroxyapatite, based on the total weight of dry matter.

19. A process for purifying a substance, or for removing at least a portion of one or more contaminants in the form of cations and/or oxyanions from a water effluent, or for removing at least a portion of Hg from a gas effluent, comprising using the hydroxyapatite composite according to claim 1.

* * * * *